United States Patent [19]
Kumazaki et al.

[11] Patent Number: 5,325,474
[45] Date of Patent: Jun. 28, 1994

[54] GRAPHIC OUTPUT DEVICE INCLUDING ANTIALIASING CAPABILITY GOVERNED BY DECISIONS REGARDING SLOPE OF EDGE DATA

[75] Inventors: Hitomi Kumazaki, Koshigaya; Masaki Sano, Yokohama; Yoshiaki Hanyu, Tokyo; Kan Tomita, Tokyo; Naomi Inoue, Tokyo; Akira Ohori, Yokohama, all of Japan

[73] Assignee: Ricoh Company, Ltd., Japan

[21] Appl. No.: 781,739

[22] Filed: Oct. 23, 1991

[51] Int. Cl.⁵ ............................................. G06F 15/62
[52] U.S. Cl. .................................... 395/133; 395/143
[58] Field of Search ............... 395/107, 108, 133, 139, 395/140–143, 150, 151; 358/298

[56] References Cited

U.S. PATENT DOCUMENTS

| | | | |
|---|---|---|---|
| 4,847,641 | 7/1989 | Tung | 346/154 |
| 5,134,495 | 7/1992 | Frazier et al. | 358/298 |

FOREIGN PATENT DOCUMENTS 0199502  4/1986  European Pat. Off. ...... G09G 1/16

OTHER PUBLICATIONS

Computer Graphics Principles and Practice Foley et al. (1990) pp. 132–143.

Primary Examiner—Gary V. Harkcom
Assistant Examiner—Almis Jankus
Attorney, Agent, or Firm—Mason, Fenwick & Lawrence

[57] ABSTRACT

A graphic output device for removing the aliases of the edges of a vector image by an antialiasing procedure and effectively outputting image data undergone such processing. Whether or not the inclination of an input vector is greater than 45 degrees is determined. In the event of outputting the result of antialiasing processing, a pulse width modulation system (vertically long dot diameter) is selected if the inclination of the vector is greater than 45 degrees, or a power modulation system (horizontally long dot diameter) is selected if it is smaller than 45 degrees.

11 Claims, 64 Drawing Sheets

Fig. 6A
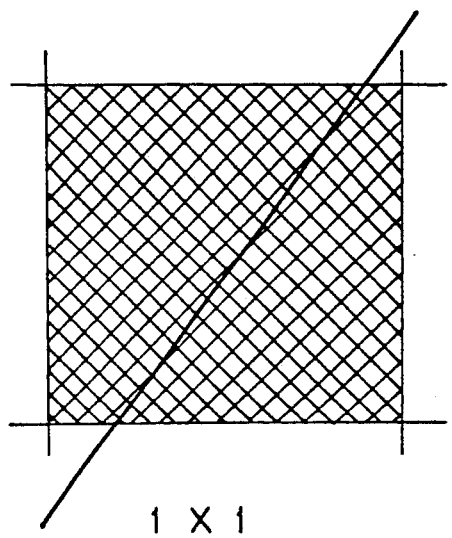
1 X 1
Kid = 255
Fig. 6B
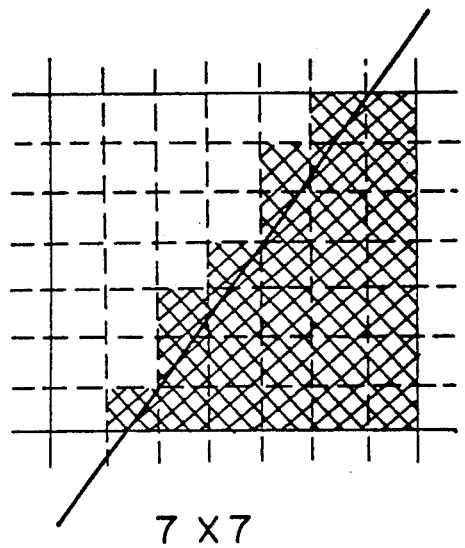
7 X 7
Kid = 255 X 28/49
Fig. 7A
CONE FILTER
| 2 | 4 | 5 | 6 | 5 | 4 | 2 |
|---|---|---|---|---|---|---|
| 4 | 6 | 8 | 9 | 8 | 6 | 4 |
| 5 | 8 | 11 | 12 | 11 | 8 | 5 |
| 6 | 9 | 12 | 16 | 12 | 9 | 6 |
| 5 | 8 | 11 | 12 | 11 | 8 | 5 |
| 4 | 6 | 8 | 9 | 8 | 6 | 4 |
| 2 | 4 | 5 | 6 | 5 | 4 | 2 |
7 X 7
Fig. 7B
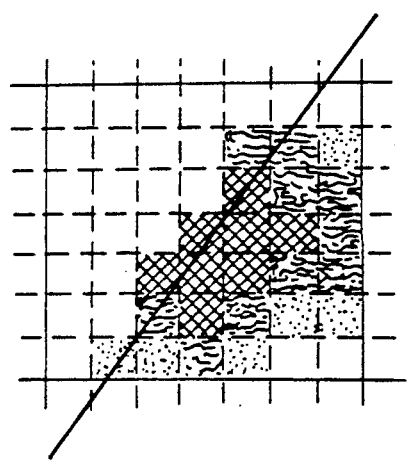
Kid = 255 X 199/336

Fig. 8A

CYLINDRICAL FILTER

| 1 | 1 | 1 | 1 | 1 | 1 |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |

Fig. 8B

CONE FILTER

| 1 | 3 | 4 | 4 | 3 | 1 |
|---|---|---|---|---|---|
| 3 | 5 | 6 | 6 | 4 | 3 |
| 4 | 6 | 9 | 9 | 6 | 4 |
| 4 | 6 | 9 | 9 | 6 | 4 |
| 3 | 5 | 6 | 6 | 4 | 3 |
| 1 | 3 | 4 | 4 | 3 | 1 |

Fig. 8C

GOUSSION FILTER

| 2 | 3 | 4 | 4 | 3 | 2 |
|---|---|---|---|---|---|
| 3 | 5 | 6 | 6 | 5 | 3 |
| 4 | 7 | 9 | 9 | 7 | 4 |
| 4 | 7 | 9 | 9 | 7 | 4 |
| 3 | 5 | 6 | 6 | 5 | 3 |
| 2 | 3 | 4 | 4 | 3 | 2 |

Fig. 8D

HAMMING FILTER

| 1 | 3 | 4 | 4 | 3 | 1 |
|---|---|---|---|---|---|
| 3 | 5 | 6 | 6 | 5 | 3 |
| 4 | 6 | 9 | 9 | 6 | 4 |
| 4 | 6 | 9 | 9 | 6 | 4 |
| 3 | 5 | 6 | 6 | 5 | 3 |
| 1 | 3 | 4 | 4 | 3 | 1 |

Fig. 11A
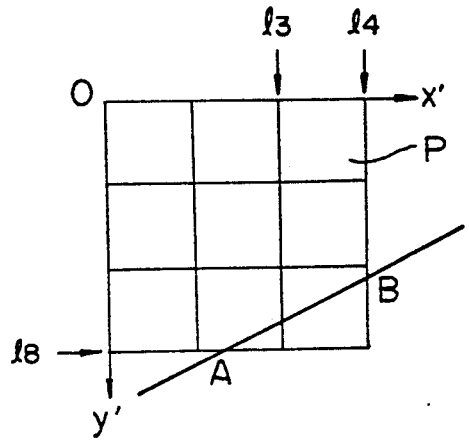
Fig. 11B
| | EDGE PLAG | | DIVISION FLAG | | | | | | | | APROX AREA RATIO |
|---|---|---|---|---|---|---|---|---|---|---|---|
| | LEFT EDGE | RIGHT EDGE | $l_1$ | $l_2$ | $l_3$ | $l_4$ | $l_5$ | $l_6$ | $l_7$ | $l_8$ | |
| D1 | 1 | 1 | 0 | 0 | 0 | 0 | 0 | 0 | 0 | 1 | 1/9 |
| D2 | 1 | 0 | 0 | 0 | 0 | 0 | 0 | 0 | 1 | 1 | 2/9 |
| | | | | | | ⋮ | | | | | ⋮ |
Fig. 11C
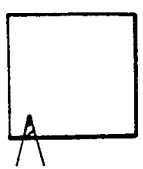 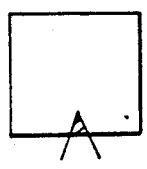 ...
Fig. 11D
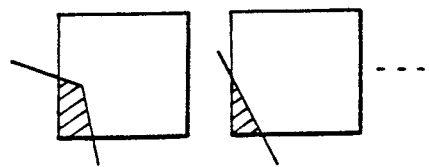

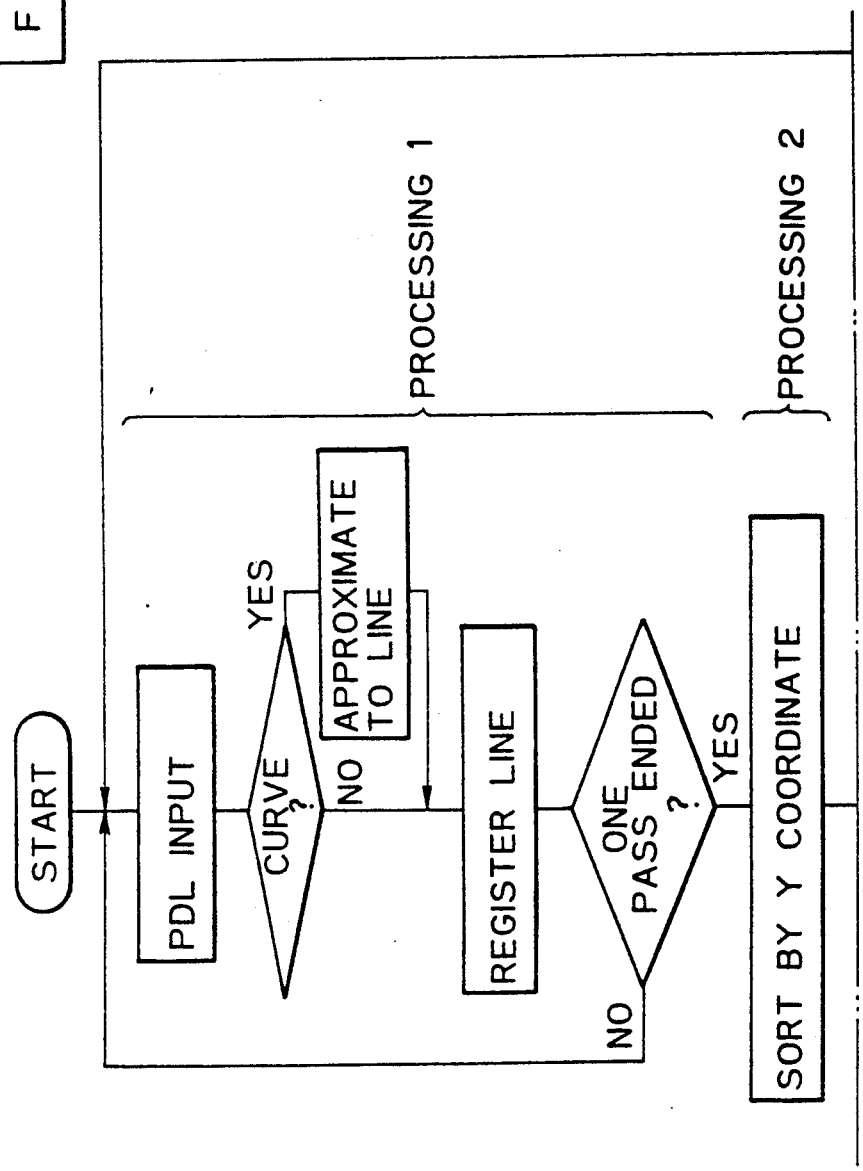

Fig. 24

| A | B | C | Y |
|---|---|---|---|
| 0 | 0 | 0 | D0 |
| 1 | 0 | 0 | D1 |
| 0 | 1 | 0 | D2 |
| 1 | 1 | 0 | D3 |
| 0 | 0 | 1 | D4 |
| 1 | 0 | 1 | D5 |
| 0 | 1 | 1 | D6 |
| 1 | 1 | 1 | D7 |

Fig. 25

| A | B | Y |
|---|---|---|
| 0 | 0 | D0 |
| 1 | 0 | D1 |
| 0 | 1 | D2 |
| 1 | 1 | D3 |

Fig. 26

| A | Y |
|---|---|
| 0 | D0 |
| 1 | D1 |

Fig. 30

| PPWD2 | PPWD1 | PPWD0 | Id | LATENT IMAGE |
|---|---|---|---|---|
| 0 | 0 | 0 | 0 | |
| 0 | 0 | 1 | Id 1 | LEVEL 1 |
| 0 | 1 | 0 | Id 2 | LEVEL 2 |
| 0 | 1 | 1 | Id 3 | LEVEL 3 |
| 1 | 0 | 0 | Id 4 | LEVEL 4 |
| 1 | 0 | 1 | Id 5 | LEVEL 5 |
| 1 | 1 | 0 | Id 6 | LEVEL 6 |
| 1 | 1 | 1 | Id 7 | LEVEL 7 |

$Id_0 < Id_1 < Id_2 < Id_3 < Id_4 < Id_5 < Id_6 < Id_7$

| PWD2 | PWP1 | PWD0 | LATENT IMAGE | Td |
|---|---|---|---|---|
| 0 | 0 | 0 | | |
| 0 | 0 | 1 | LEVEL 1 | Tdw 1 |
| 0 | 1 | 0 | LEVEL 2 | Tdw 2 |
| 0 | 1 | 1 | LEVEL 3 | Tdw 3 |
| 1 | 0 | 0 | LEVEL 4 | Tdw 4 |
| 1 | 0 | 1 | LEVEL 5 | Tdw 5 |
| 1 | 1 | 0 | LEVEL 6 | Tdw 6 |
| 1 | 1 | 1 | LEVEL 7 | Tdw 7 |

Fig. 35

| PPD2 | PPD1 | PPD0 | Td | LATENT IMAGE |
|---|---|---|---|---|
| 0 | 0 | 0 | 0 | LEVEL 0 |
| 0 | 0 | 1 | Tdp 1 | LEVEL 1 |
| 0 | 1 | 0 | Tdp 2 | LEVEL 2 |
| 0 | 1 | 1 | Tdp 3 | LEVEL 3 |
| 1 | 0 | 0 | Tdp 4 | LEVEL 4 |
| 1 | 0 | 1 | Tdp 5 | LEVEL 5 |
| 1 | 1 | 0 | Tdp 6 | LEVEL 6 |
| 1 | 1 | 1 | Tdp 7 | LEVEL 7 |

Fig. 37A

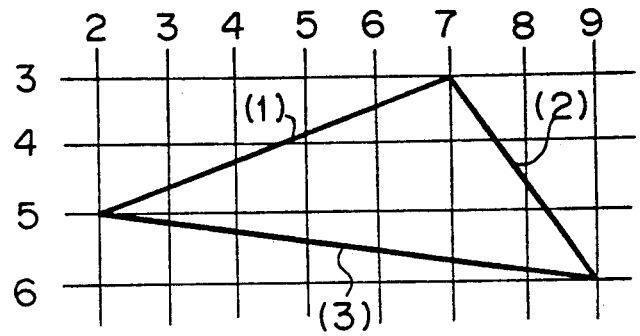

Fig. 37B

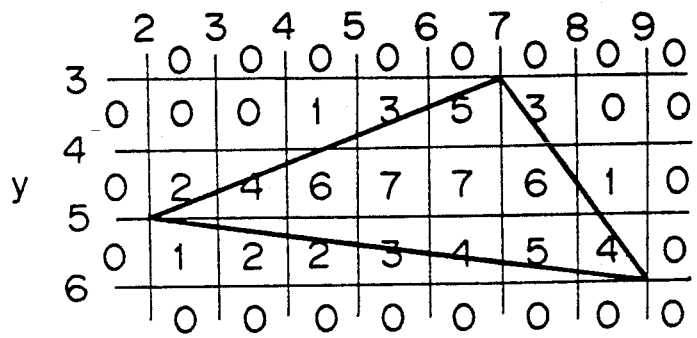

Fig. 37C

| | 2 | 3 | 4 | 5 | 6 | 7 | 8 | 9 |
|---|---|---|---|---|---|---|---|---|
| 3 | nn=0<br>mm=0<br>xx=0 | nn=0<br>mm=0<br>xx=0 | nn=1<br>mm=7<br>xx=0 | nn=3<br>mm=7<br>xx=0 | nn=5<br>mm=7<br>xx=0 | nn=7<br>mm=3<br>xx=0 | nn=0<br>mm=0<br>xx=0 | |
| 4 | nn=2<br>mm=7<br>xx=0 | nn=4<br>mm=7<br>xx=0 | nn=6<br>mm=7<br>xx=0 | nn=7<br>mm=7<br>xx=0 | nn=7<br>mm=7<br>xx=0 | nn=7<br>mm=6<br>xx=0 | nn=7<br>mm=1<br>xx=0 | |
| 5 | nn=1<br>mm=7<br>xx=0 | nn=2<br>mm=7<br>xx=0 | nn=2<br>mm=7<br>xx=0 | nn=3<br>mm=7<br>xx=0 | nn=4<br>mm=7<br>xx=0 | nn=5<br>mm=7<br>xx=0 | nn=7<br>mm=4<br>xx=0 | |
| 6 | | | | | | | | |

Fig. 48D

|   | 2 | 3 | 4 | 5 | 6 | 7 | 8 | 9 |
|---|---|---|---|---|---|---|---|---|
| 3 | nn=0<br>mm=0<br>XX=0 | nn=0<br>mm=0<br>XX=0 | nn=0<br>mm=0<br>XX=0 | nn=3<br>mm=7<br>XX=0 | nn=5<br>mm=7<br>XX=0 | nn=7<br>mm=3<br>XX=0 | nn=0<br>mm=0<br>XX=0 | |
| 4 | nn=3<br>mm=7<br>XX=0 | nn=6<br>mm=7<br>XX=0 | nn=9<br>mm=7<br>XX=0 | nn=7<br>mm=7<br>XX=0 | nn=7<br>mm=7<br>XX=0 | nn=7<br>mm=6<br>XX=0 | nn=7<br>mm=1<br>XX=0 | |
| 5 | nn=0<br>mm=0<br>XX=0 | nn=0<br>mm=0<br>XX=0 | nn=0<br>mm=0<br>XX=0 | nn=3<br>mm=7<br>XX=0 | nn=4<br>mm=7<br>XX=0 | nn=5<br>mm=7<br>XX=0 | nn=7<br>mm=4<br>XX=0 | |
| 6 | | | | | | | | |

Fig. 49

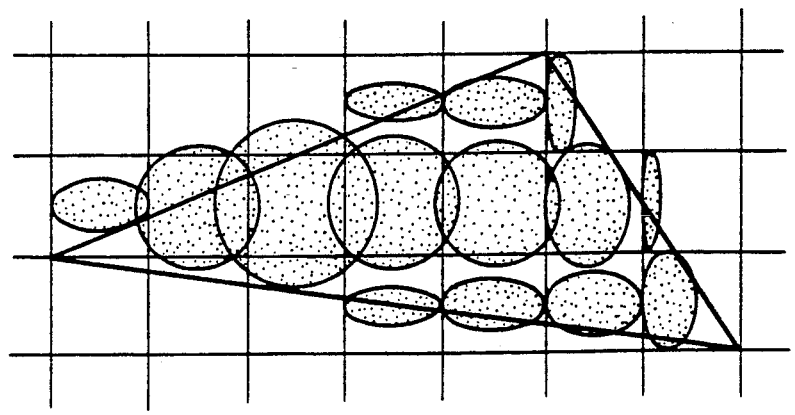

Fig. 52
[I]
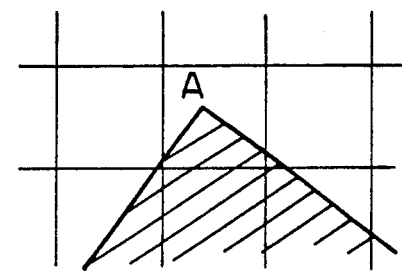
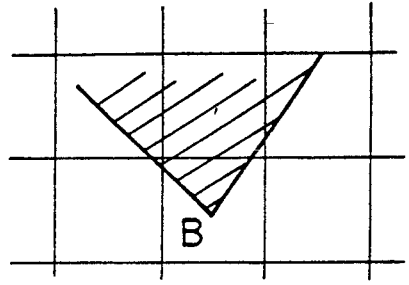
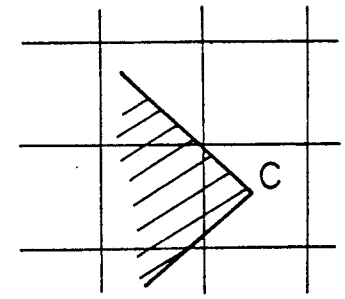
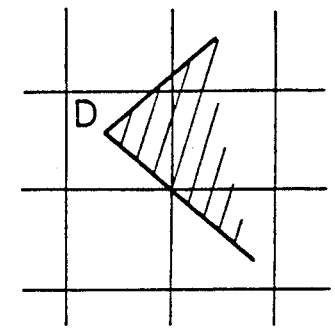
[II]
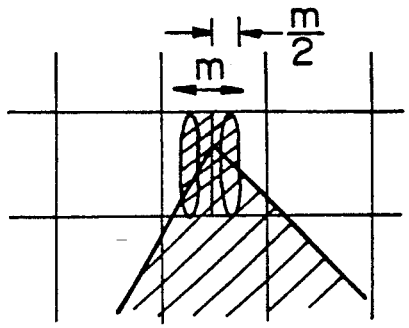

| nn = 0 | nn = 7 | nn = 7 | nn = 2 | nn = 0 | nn = 0 | nn = 0 |
| mm=0 | mm=1 | mm=4 | mm=7 | mm=0 | mm=0 | mm=0 |
| XX = 0 | XX = 7 | XX = 1 | XX = 0 | XX = 0 | XX = 0 | XX = 0 |
| nn = 0 | nn = 7 | nn = 7 | nn = 6 | nn = 3 | nn = 0 | nn = 0 |
| mm=0 | mm=4 | mm=7 | mm=7 | mm=7 | mm=0 | mm=0 |
| XX = 0 | XX = 4 | XX = 0 | XX = 0 | XX = 0 | XX = 0 | XX = 0 |
| nn = 1 | nn = 3 | nn = 4 | nn = 5 | nn = 5 | nn = 4 | nn = 7 |
| mm=7 | mm=7 | mm=7 | mm=7 | mm=7 | mm=7 | mm=1 |
| XX = 0 | XX = 0 | XX = 0 | XX = 0 | XX = 0 | XX = 0 | XX = 3 |

Fig. 60
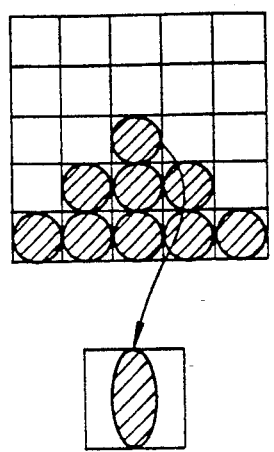
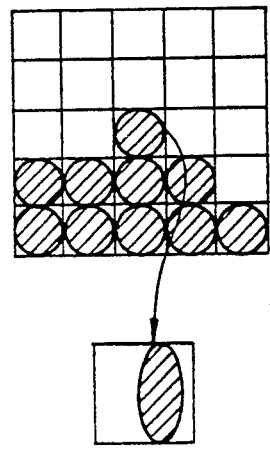
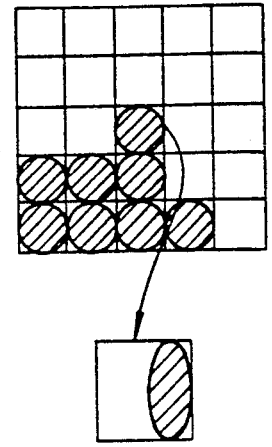
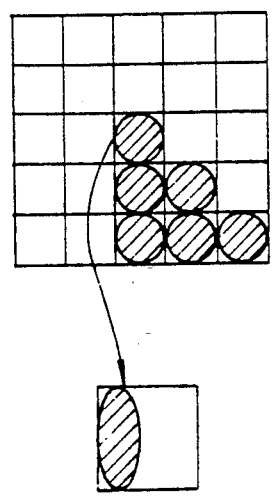
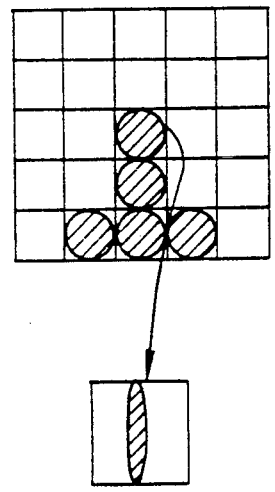
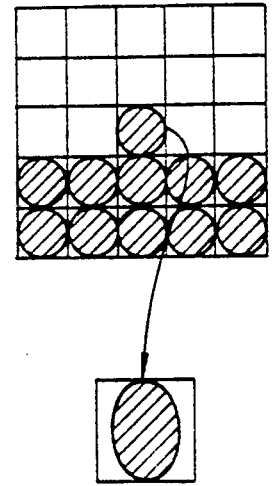

GRAPHIC OUTPUT DEVICE INCLUDING ANTIALIASING CAPABILITY GOVERNED BY DECISIONS REGARDING SLOPE OF EDGE DATA

BACKGROUND OF THE INVENTION

The present invention relates to a graphic output device of the type effecting antialiasing processing to remove the seps or aliases of jaggy edges of an output image and, more particularly, to a graphic output device capable of effectively outputting image data undergoing antialiasing processing.

In the computer graphic art, an antialiasing technique is used to make an image to appear on an output medium in the form of CRT more attractive. The antialiasing processing is such that the steps of aliases are modulated in luminance to allow an image to appear smooth on a CRT. The data undergone antialiasing may be outputted by a multilevel color laser printer which is usually driven by a power modulation (PM) system or a pulse width modulation (PWM) system. Japanese patent Laid-Open Publication No. 112966/1990 discloses an apparatus which receives bilevel image data in a dot matrix format, recognizes a pattern by dividing the bilevel image data into small areas, and executes correction (antialiasing) with the recognized pattern to thereby improve an image to be displayed. However, a multilevel printer of the type electrostatically forming a latent image by the PM system has a problem that the latent image of each pixel representative of the edge of a figure elongate in the subscanning direction is isolated from the overlying and underlying pixel latent images. The problem with a multilevel printer implemented with the PWM system is that the latent image of each pixel representative of the edge of a figure elongate in the main scanning direction is isolated from the nearby pixel latent images. Moreover, when data undergone antialiasing is outputted by a laser printer, pixels whose luminane is reduced due to modulation cannot be printed out in adequate density. This is especially true when the printing area is small. The apparatus taught in Japanese Patent Laid-Open Publication No. 112966/1990 also lacks the continuity of an image, failing to make the most of the antialiasing procedure.

SUMMARY OF THE INVENTION

It is, therefore, an object of the present invention to enhance the advantage of antialiasing processing while insuring the continuity of an image.

In accordance with the present invention, a graphic input device comprises an antialiasing a processing section for rendering the alias of an edge of a vector image smoothly, an image outputting section comprising a pulse PWM writing section and a PM writing section for converting image data subjected to antialiasing processing by the antialiasing processing section to multilevel image data and outputting the multilevel image data, a first decision section for determining whether the inclination of the vector is representative of a vertical line or a horizontal line, a second decision section for determining, when the inclination is determined to be representative of a vertical line, whether the edge to be processed is a right edge or a left edge, and a designating section for selecting, when the edge is determined to be a left edge, the PWM writing section and designating a position for starting outputting a pulse. The PM writing section is selected when the edge is determined to be a horizontal line.

If desired, the PWM writing section and PM writing section may be respectively selected when the edge is determined to be a right edge and when the inclination of the vector is determined to be a horizontal line.

Also, in accordance with the present invention, a graphic output device comprises an antialiasing processing section for rendering the alias of an edge of a vector image smoothly, a first decision or determining whether the inclination of the vector image is representative of a horizontal line or a vertical line, an image outputting section for outputting image data subjected to antialiasing processing by the antialiasing processing section by power modulation when the inclination of the vector is determined to be representative of a horizontal line or by pulse width modulation when the inclination is determined to be representative of a vertical line, a second decision section for determining, when the inclination is determined to be representative of a vertical line, whether the edge of the vector image is a right edge or a left edge, a designating section for designating, when the edge is determined to be a left edge, a print start position of a pulse, a recognizing section for recognizing, when the inclination is determined to be representative of a horizontal line, a pixel density (minimum density) which would be difficult to output by the image outputting section, a third decision section for determining whether the edge of the horizontal line is an upper edge or a lower edge, and a control section for performing control such that a pixel of a horizontal line having been modulated in luminance to below the minimum density recognized by the recognizing section is not printed out, an underlying pixel is increased in density when the edge is determined to be an upper edge, and an overlying pixel is increased in density when the edge is determined to be a lower edge.

Further, in accordance with the present invention, a graphic output device comprises an antialiasing processing section for rendering the alias of an edge of a vector image smoothly, an image outputting section comprising a PWM writing section and a PM writing section for converting image data subjected to antialiasing processing by the antialiasing processing section to multilevel image data and outputting the multilevel image data, a designating section for designating a print start position of a pulse by the PWM writing section, an apex detecting section for detecting an apex in a pixel being processed, an apex position determining section for determining the position of an apex detected by the apex detecting section, and a control section for selectively driving either one of the PWM writing section and PM writing section on the basis of the position of an apex determined by the apex position determining section.

Moreover, in accordance with the present invention, a graphic output device for receiving bilevel image data in a dot matrix format, recognizing a pattern by dividing the bilevel image data into small areas, executing antialiasing processing, and then forming an image by use of a laser comprises an image storing section storing image element patterns for antialiasing processing and each comprising bilevel pixels, and antialiasing data, a pattern extracting section for extracting from image data stored in the image storing means a small area pattern having the same size and shape as each of the image element patterns, a pattern comparing section for comparing the small area pattern extracted by the pattern extracting section with the image element patterns stored in the pattern data storing section, a correct signal generating section for generating, when the extracted pattern coincides with any one of the image element patterns, a dot corrected signal for correcting a dot shape associated with the center pixel of the small area pattern on the basis of corresponding one of the antialiasing data, and an image forming section for forming an image by combining a PM system and a PWM system in response to the dot correct signal.

BRIEF DESCRIPTION OF THE DRAWINGS

The above and other objects, features and advantages of the present invention will become more apparent from the following detailed description taken with the accompanying drawings in which:

FIG. 6A and 6B demonstrate antialiasing processing using a uniform averaging method;

FIG. 7A nd 7B demonstrate antialiasing processing using a weighting and averaging method;

FIGS. 8A–8D each shows a specific filter applicable to the weighting and averaging method;

FIGS. 10A, 10B and 11A–11D are representative of antialiasing processing of the kind producing an approximate area ratio of an edge pixel;

FIGS. 14A-1, and 14A-2 and 14B are respectively a flowchart showing a specific operation of the PDL and coordinates indicative of the painting of passes;

FIGS. 24–26 are tables demonstrating multilevel drive particular to the first embodiment;

FIG. 30 is a table showing a relation of PPWD0–PPWD2, $Id_1$–$Id_7$ and latent image to one another;

FIG. 35 is a table associated with FIG. 34;

FIGS. 37A–37C demonstrate a specific operation of the first embodiment;

FIGS. 48A–48D show a specific operation of the second embodiment;

FIG. 49 shows a specific latent image outputted by the operation shown in FIGS. 48A–48D;

FIG. 52 show specific apex positions and the control over a position;

FIG. 60 shows various positions each being designated in matching relation to a relation between an apex and adjoining pixels;

DESCRIPTION OF THE PREFERRED EMBODIMENTS

Figure 66A:
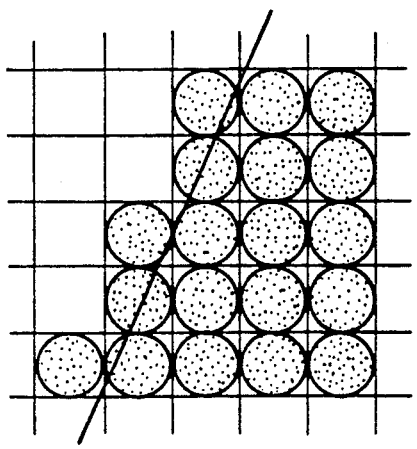
FIGS. 66A and 66B are views useful for understanding an advantage attainable with antialiasing.
Figure 66B:
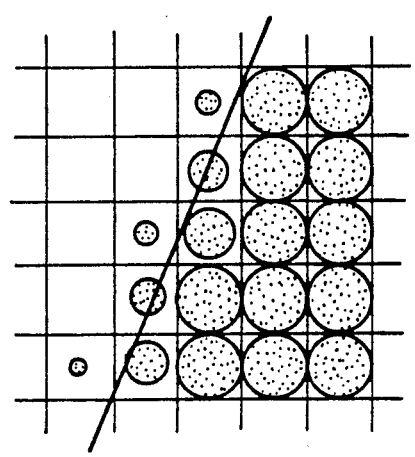
Figure 67A:
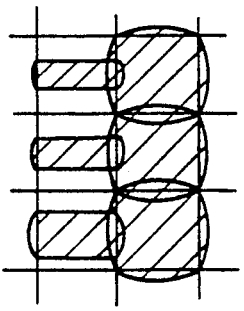
FIGS. 67A and 67B show a specific latent image outputted by a conventional antialiasing technique.
Figure 67B:
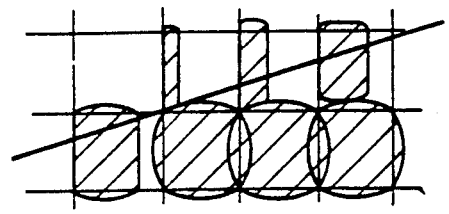

To better understand the present invention, a general antialiasing procedure and problems with a conventional graphic output device will be described specifically. Antialiasing commonly executed in the computer graphics art effects luminance modulation with a steplike jaggy portion or alias such as shown in FIG. 66A, so that a smooth image such as shown in FIG. 66B may be displayed. The data undergone antialiasing may be outputted by a multilevel color laser printer which is usually driven by a power modulation (PM) system or a pulse width modulation (PWM) system. Japanese patent Laid-Open Publication No. 112996/1990 discloses an apparatus which receives bilevel image data in a dot matrix format, recognizes a pattern by dividing the bilevel image data into small areas, and executes correction (antialiasing) with the recognized pattern to thereby improve an image to be displayed. However, a multilevel printer of the type electrostatically forming a latent image by the PM system has a problem that, as shown in FIG. 67A, the latent image of each pixel representative of the edge of a figure elongate in the sub-scanning direction is isolated from the overlying and underlying pixel latent images. The problem with a multilevel printer implemented with the PWM system is that, as shown in FIG. 67B, the latent image of each pixel representative of the edge of a figure elongate in the main scanning direction is spaced apart from the nearby pixel latent images. Moreover, when data undergone antialiasing is outputted by a laser printer, pixels whose luminane is reduced due to modulation cannot be printed out in adequate density. This is especially true when the printing area is small. The apparatus taught in Japanese Patent Laid-Open Publication No. 112996/1990 also lacks the continuity of an image, failing to make the most of the antialiasing procedure.

Preferred embodiments of the present invention which are free from the above problems will be described hereinafter with reference to the accompanying drawings.

FIRST EMBODIMENT

A first embodiment of the graphic output device in accordance with the present invention will be described and put under seven heads, i.e., (1) Outline of First Embodiment, (2) Outline of Image Forming System, (3) Antialiasing, (4) Construction and Operation of PDL controller, (5) Construction of Image Processor, (6), Construction of Multilevel Color Laser Printer (Construction and Operation of Developing Section), (7), Multilevel Drive of Driver, and (8) Specific Operation.

(1) Outline of First Embodiment

Figure 1:
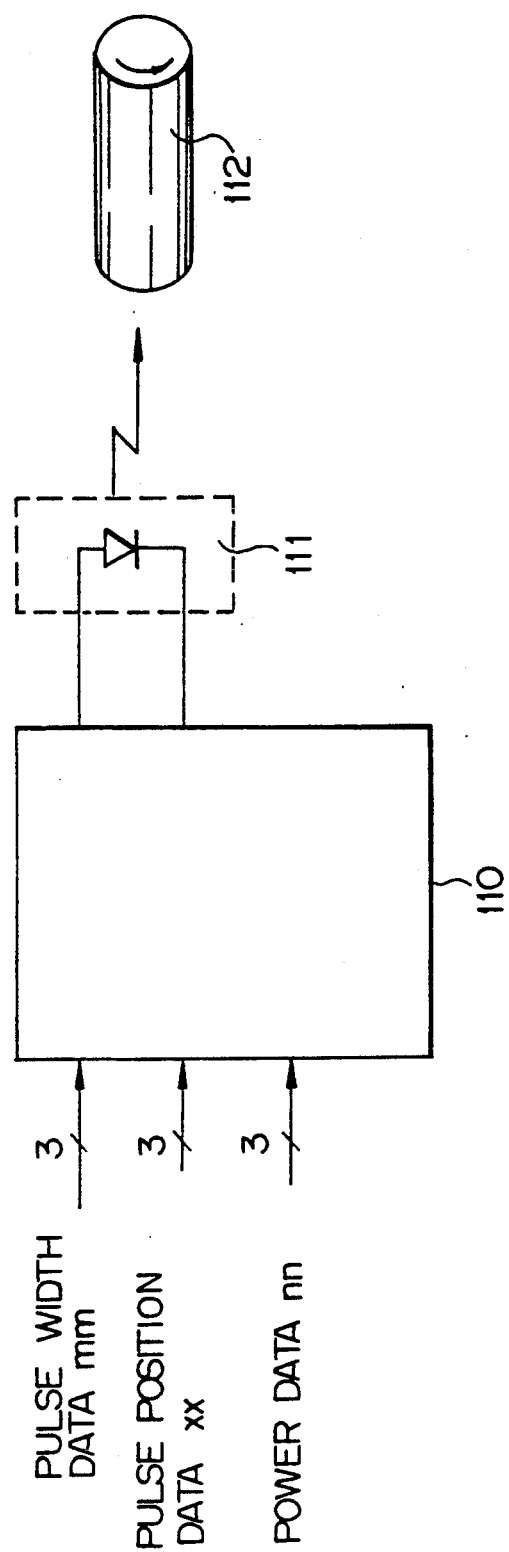
FIG. 1 is a block diagram schematically showing a laser writing section included in a first embodiment of the present invention together with elements associated therewith.

FIG. 1 shows a laser writing section included in the embodiment together with associated elements thereof. As shown, a plurality of data signals are applied to a laser writing section 110. In response, the laser writing section 110 controls a laser diode 111 to switch over the outputting method thereof. For example, the laser writing section 110 outputs data to a photoconductive element 112 by the PM system if the inclination of the vector is less than 45 degrees or by the PWM system if it is greater than 45 degrees. The graphic output device needs three kinds of input data which are power data nn, pulse width data mm, and pulse position data xx. These data nn, mm and xx each controls the laser writing section 110 independently of one another.

Figure 2:
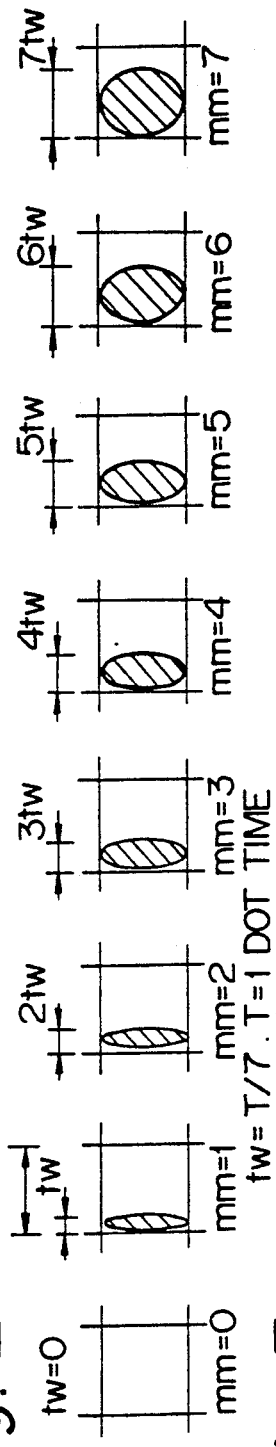
FIG. 2 shows various latent images each being formed by particular pulse width data.
Figure 3:
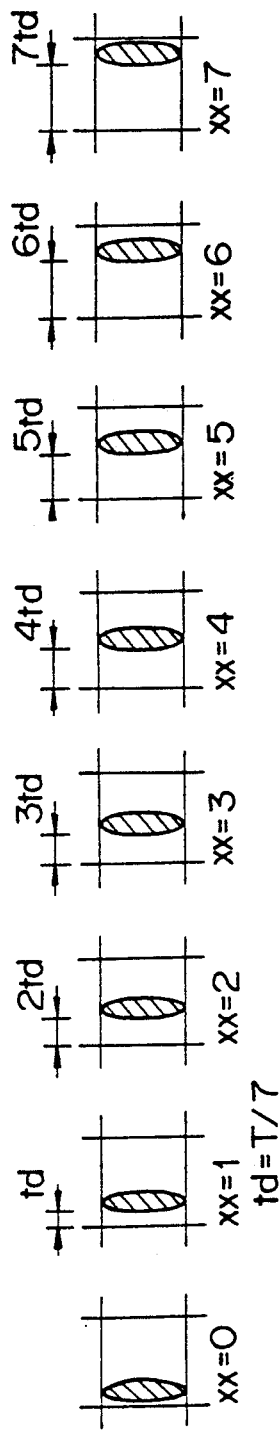
FIG. 3 shows latent images each being formed by particular pulse position data.
Figure 4:
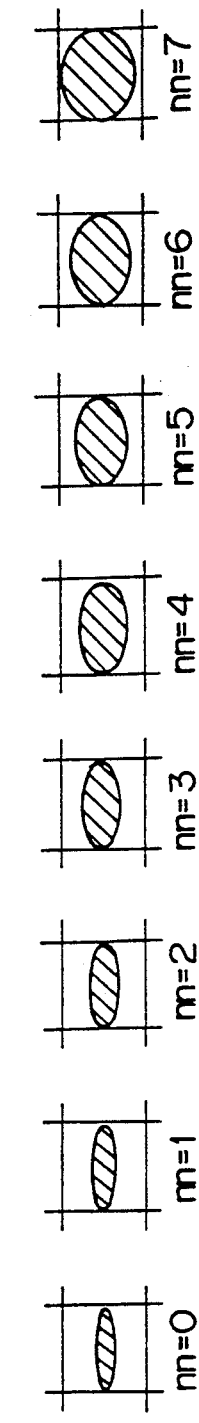
FIG. 4 shows latent images each being formed by particular power data.

FIG. 2 shows various latent images each being derived from particular pulse width data mm (where xx=0 and nn=7). FIG. 3 shows various latent images each being formed by particular pulse position data xx (where mm=1 and nn=7). Further, FIG. 4 shows various latent images each being formed by particular power data nn (where mm=7 and xx=0).

(2) Outline of Image Forming System

The image forming system of the embodiment is capable of forming images represented by both of vector data outputted by DTP (Desk Top Publishing) and described in PDL (Page Description Language) and image data read by an image reader.

Figure 5:
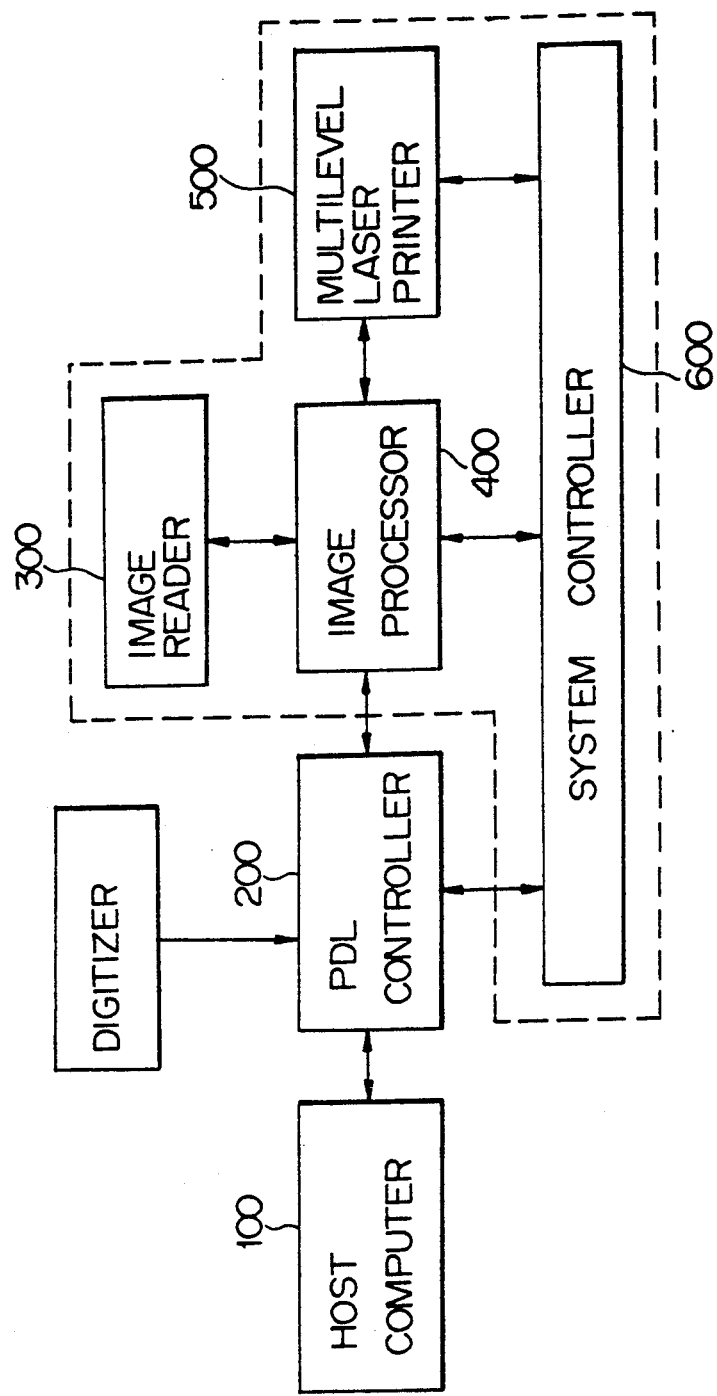
FIG. 5 is a block diagram schematically showing an image forming system of the first embodiment.

Referring to FIG. 5, the image forming system includes a host computer 100 for preparing a document described in PDL (Postscript language in the embodiment). A PDL controller 200 develops the PDL language sent thereto from the host computer 100 page by page into images of three different colors, i.e., red (R), green (G) and blue (B) while subjecting it to antialiasing. An image reader 300 reads image information via an optical unit. An image processor 400 processes the image from the PDL controller 200 or from the image reader 300, as will be described specifically later. A multilevel color laser printer 500 prints out multilevel image data fed thereto from the image processor 400. The PDL controller 200, image reader 300, image processor 400 and color laser printer 500 are controlled by a system controller 600.

(3) Antialiasing

Typical of antialiasing technique are a uniform averaging method, a weighting and averaging method, and a conventional integrating method.

The uniform averaging method divides each pixel into N * M (N and M being natural numbers) subpixels, performs raster calculation with a high resolution, and determines the luminance of each pixel on the basis of the mean of N * M subpixels. Antialiasing using this method will be described with reference to FIGS. 6A and 6B. As shown, assume that an edge of an image is conatined in a given pixel, i.e., an image exits rightwardly and downwardly of the oblique line in the pixel of interest. When antialiasing is not effected with the pixel, the maximum luminance kid of displaying tones (e.g. kid=225 in the case of 256 tones) is assigned to the pixel, as shown in FIG. 6A. When antialiasing is effected by the N=M=7 method, the pixel of interest is divided into 7 * 7 subpixels, as shown in FIG. 6B. Then, the subpixels covered by the image are counted, the count (28) is divided by the number of the subpixels (49) constituting the whole pixel, and the maximum luminance (255) is multiplied by the resulting means value to thereby determine the luminance of the pixel. In this manner, the uniform averaging method determines the luminance of a given pixel by taking account of how the image covers each pixel.

The weighting and averaging method is a modification of the uniform averaging method. Specifically, while the uniform averaging method handles all the subpixels constituting one pixel with the same weight, i.e., simply counts the subpixels covered by an image, the weighting and averaging method assigns a particular weight to each subpixel and, depending on the subpixels which are covered by an image, changes the influence to the luminance kid subpixel by subpixel. The weights are implemented by a filter. Specifically, FIGS. 7A and 7B demonstrate the weighting and averaging method dealing with the image data shown in FIG. 6A and the same division method (N=M=7). FIG. 7A shows the weights of a filter (here cone filter), and these weights are assigned to the corresponding pixels. For example, the weight given to the subpixel located at the upper right corner is 2. When the individual subpixels are covered by an image, the weights given by the filter characteristic are their counts. In FIG. 7B. the display pattern of the image is shown in matching relation to the weighs of the subpixels. The resulting count of subpixels covered by the image is 199. The count is divided by the sum of the weights of the filter (here 336), and the maximum luminance is multiplied by the resulting means to determined the luminance of the pixel. FIGS. 8A-8D show specific conventional filters.

Figure 9:
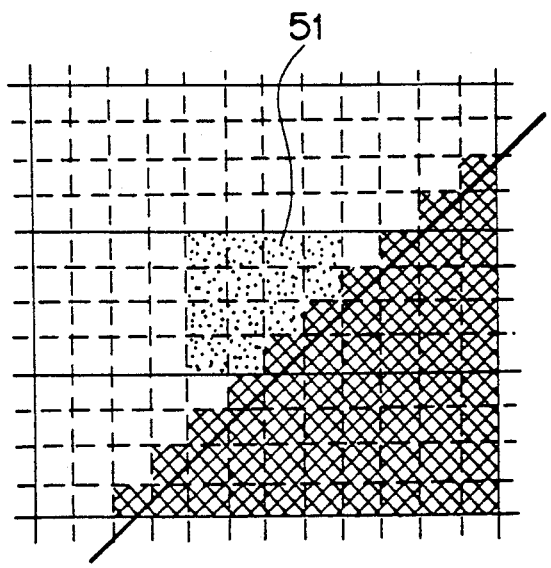
FIG. 9 demonstrates a convolutional integrating method using a $3 \times 3$ pixel matrix.

The convolutional integrating method determines the luminance of a pixel of interest by taking account of the surrounding pixels, i.e., considers N'×N' pixels surrounding a pixel of interest as corresponding to the pixel of any of the above-described methods. Specifically, FIG. 9 shows a convolutional integrating method which references 3×3 pixels surrounding a pixel 51 whose luminace should be determined. In the figure, an image extends rightward and downward from the oblique line, and the pixels indicated by double-hatching should be counted. The pixels are each divided into 4 * 4, so that use is made of a 12 * 12 filter. This method is successful in removing high-frequency components contained in a vector image.

In parallel with the spread of DTP using a personal computer, a system of the type printing vector images which are dealt with in the computer graphics is becoming popular. Typical of such a system is the system developed by Adbi and using postscript. Postscript belongs to a family of page description languages and is a programming language for describing the text and graphics constituting a single document as well as the arrangement and format thereof. This kind of system uses a vector font as a character font and is, therefore, far superior in print quality than a system using a bit map font (e.g. conventional word processor similar equipment) even when the magnification of characters is changed. In addition, such a system can print out the character font together with graphic images.

However, each of the conventional antialiasing methods and apparatuses described above has to divide a single pixel into a plurality of (e.g. forty-nine) subpixels, count the subpixels to painte, and then determine the area ratio (luminance). This is time-consuming and slows down the display speed or the printing speed. Especially, with the convolutional integrating method, it is difficult to increase the processing speed because it involves a great number of arithmetic operations and because it influences a plurality of pixels.

Figure 10A:
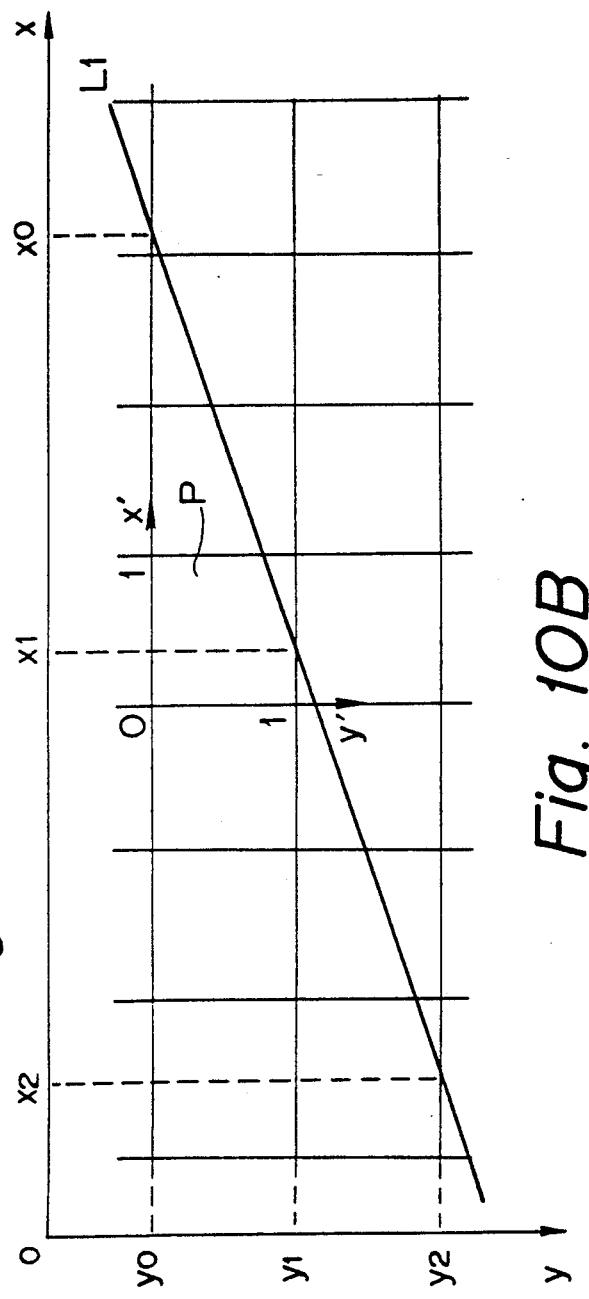
Figure 10B:
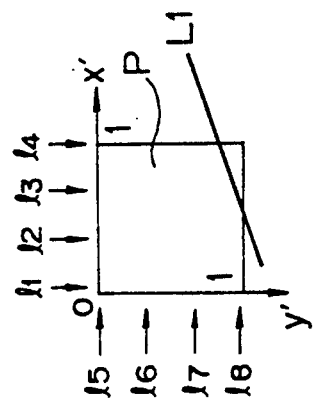

In light of the above, there has also been proposed an antialiasing method capable of determining an area ratio rapidly without subdividing a pixel or counting the number of subpixels to paint. Briefly, this method determines an approximate area ratio of a pixel containing an edge on the basis of whether or not vector data and a given group of lines which divide the pixel intersect each other and the kind of the edge. A reference will be made to FIGS. 10A, 10B and 11A-11D for describing this method specifically. As shown in FIG. 10A, assume that a line L1 defined by vector data (hereinafter referred to as a vector line L1) and lines $y_0$, $y_1$ and $y_2$ in the subscanning direction y intersect each other at points $x_0$, $x_1$ and $x_2$. Then, the vector line L1 may be represented by an equation using the two points $(x_0, y_0)$ and $(x_1, y_1)$, as follows:

$$y - y_0 = \frac{y_1 - y_0}{x_1 - x_0}(x - x_0) \qquad \text{Eq. (1)}$$

Paying attention to a particular pixel P, new coordinages x' and y' are set, and the pixel P is subdivided by eight lines $l_1$-$l_8$ (hereinafter referred to as division lines). Then, the division lines $l_1$-$l_8$ are expressed as follows:

| | |
|---|---|
| line $l_1$: x = 0 | Eq. (3) |
| line $l_2$: x = ⅓ | Eq. (4) |
| line $l_3$: x = ⅔ | Eq. (5) |
| line $l_4$: x = 1 | Eq. (6) |
| line $l_5$: y = 0 | Eq. (7) |
| line $l_6$: y = ⅓ | Eq. (8) |
| line $l_7$: y = ⅔ | Eq. (9) |
| line $l_8$: y = 1 | Eq. (10) |

Assume that the equation (1) representative of the vector line L1 is:

$$y = -(\tfrac{1}{3})x + (7/6) \qquad \text{Eq. (2)}$$

Then, the vector line L1 and the division lines $l_1$-$l_8$ dividing the pixel P intersect at points which are shown in Table 1 below.

TABLE 1

| DIVISION LINE | COORDINATES |
|---|---|
| $l_1$ | (0, 7/6) |
| $l_2$ | (⅓, 19/18) |
| $l_3$ | (⅔, 17/18) |
| $l_4$ | (1, 5/6) |
| $l_5$ | (7/2, 0) |
| $l_6$ | (5/2, ⅓) |
| $l_7$ | (3/2, ⅔) |
| $l_8$ | (½, 1) |

In the x' and y' coodinates, the x' and y' of the pixel P lie in the ranges of $0 \leq x' \leq 1$ and $0 \leq y' \leq 1$, respectively. It follows that the points of intersection exist on the division lines $l_3$, $l_4$ and $l_8$ in the range of the pixel P.

Conversely, regarding an equation representative of vector lines inersecting only the three division lines $l_3$, $l_4$ and $l_8$, as shown in FIG. 11A, the coordinates of the points of intersection A and B pass respectively the range of ($\frac{1}{3} \leq x' \leq \frac{2}{3}$, $y' = 1$) and the range of ($x' = 1$, $\frac{2}{3} < y' < 1$), respectively, without fail. Therefore, all the area ratios of the pixel P divided by the vector lines which intersect only the three division lines $l_3$, $l_4$ and $l_8$ have values close to one another. Stated another way, assuming that a group of vector liens each intersecting a given group of division lines are a single set, the area ratios of the pixel P divided by the set of vector lines are close to one another within a given range. Thus, the area ratios of the sets classified by the intersecting point data of vector lines and division lines $l_1$–$l_8$ can each be approximated to a single area ratio.

Therefore, the above-stated antialiasing method produces sets of vector lines on the basis of the intersecting point data and data indicative of whether the edge is a right edge or a left edge, determines an approximate area ratio set by set beforehand, and prepares a lookup table (LUT) listing intersecting point data, edge data, and approximate area ratios. An example of such LUT in shown in FIG. 11B. Subsequently, in the event of antialiasing, the method reads a particular approximate area ratio out of the LUT matching the intersecting point data and edge data to thereby adjust the output of the edge pixel. In the LUT shown in FIG. 11B, an edge data flag indicates a left edge when a left edge flag is (logical) ONE and a right edge flag is (logical) ZERO or indicates a right edge when the former is ZERO and the latter is ONE. When both the left edge flag and the right edge flag are ONE, the edge data flag indicate an apex, as shown in FIG. 11C. When a division line flag is ONE, corresponding one of the division liens $l_1$–$l_8$ and the vector line intersect, i.e., there is a point of intersection. FIG. 11C shows lines which may be represented by data $D_1$ of the LUC; the data $D_1$ involves the approximate area ratio of the regions indicated by hatching in FIG. 11C as data. Likewise, FIG. 11D shows liens which may be represented by data $D_2$ of the LUT: the data $D_2$ involves the approximate area ratio of the regions indicated by hatching in FIG. 11D. For example, to determine the area ratio of the vector lines shown in FIG. 11C. the intersecting points of the vector lines and the division lines $l_1$–$l_8$ are determined, then whether or the edge is a right edge or a left edge is determined on the basis of edge data produced by the PDL specifications, and than a corresponding approximate area ratio is selected on the LUT.

(4) Construction and Operation of PDL Controller

Figure 12:
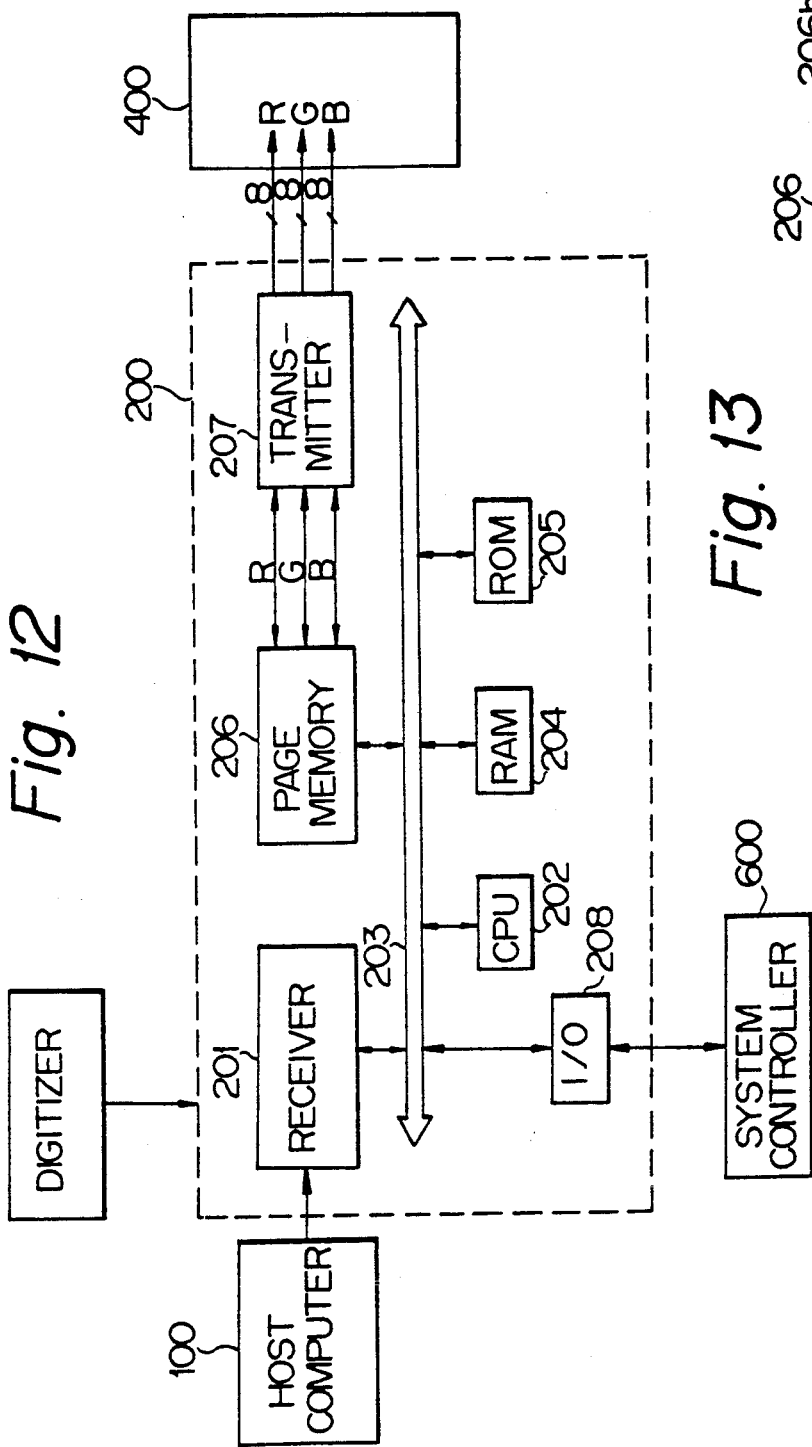
FIG. 12 is a schematic block diagram showing a specific construction of a PDL controller.
Figure 13:
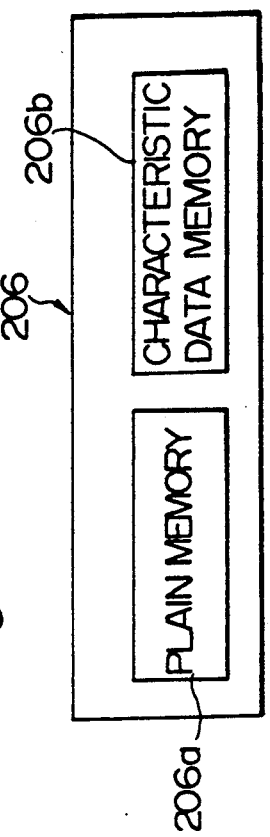
FIG. 13 shows a page memory.

Referring to FIG. 12, a specific construction of the PDL controller 200 will be described. As shown, the PDL controller 200 includes a receiver 201 for receiving the PDL language sent from the host computer 100. A CPU 202 controls the storage of the PDL language received by the receiver 201 and the execution of antialiasing processing. The PDL language is transferred from the receiver 201 to a RAM 204 over an internal system bus 203. A ROM 205 stores an antialiasing program and other necessary programs. A page memory 206 stores multilevel RGB image data undergone an antialiasing procedure. A transmitter 207 transfers the RGB image data stored int he page memory 206 to the image processor 400. An I/O unit 208 interchanges signals with the system control 600. The CPU 202 writes the PDL language received by the receiver 201 in the RAM 204 via the system bus 203 according to a program stored in the ROM 205. After receiving one page of PDL language and writing it to the RAM 204, the CPU 202 writes multilevel RGB image data to a plain memory section included in the page memory 206. Specifically, as shown in FIG. 13, the page memory 206 is made up of an RGB plain memory section 206a and a characteristic data memory section 206b. The data stored in the page memory 206 are sent to the image processor via the transmitter 207 afterwards.

Figures 2, 14A:
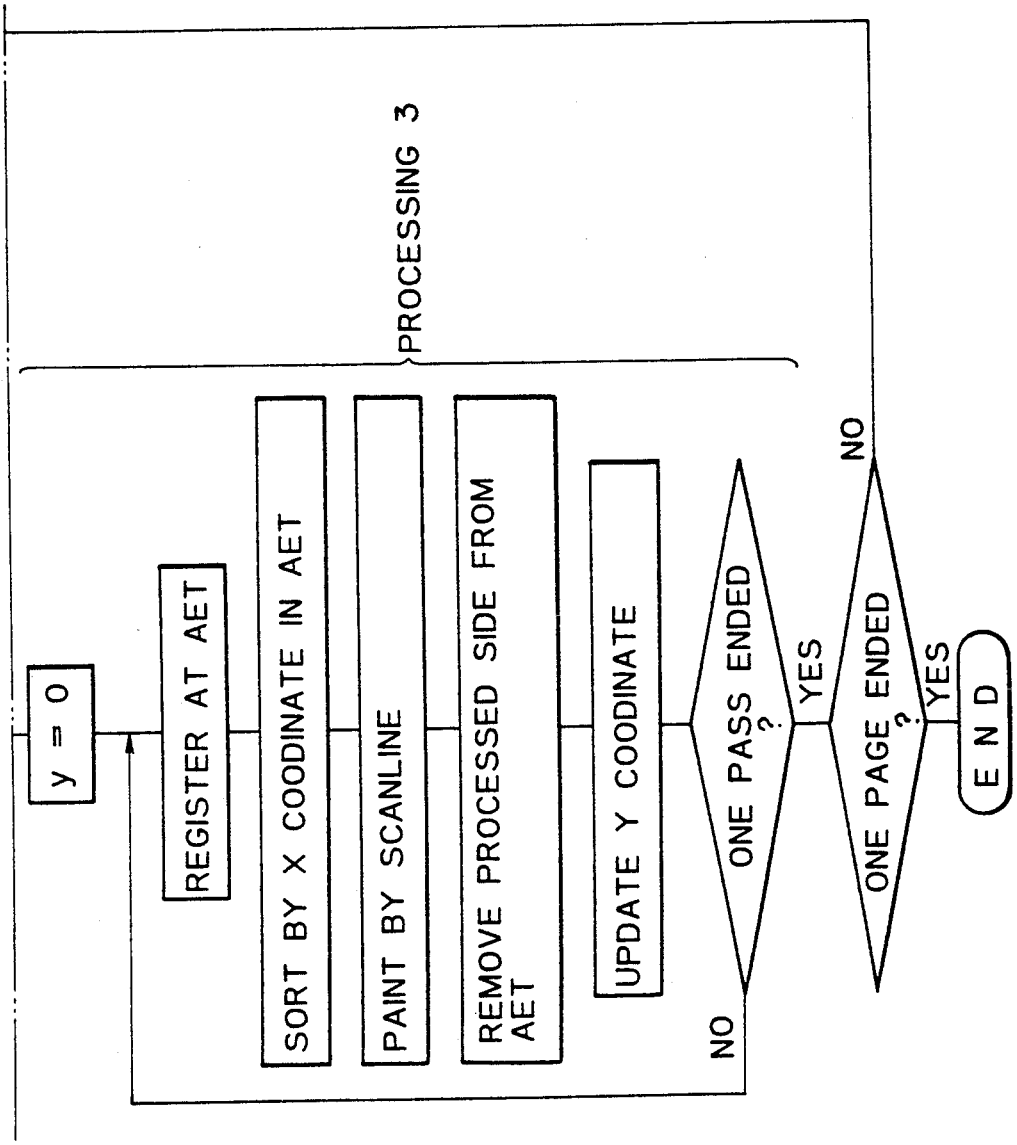
Figure 14B:
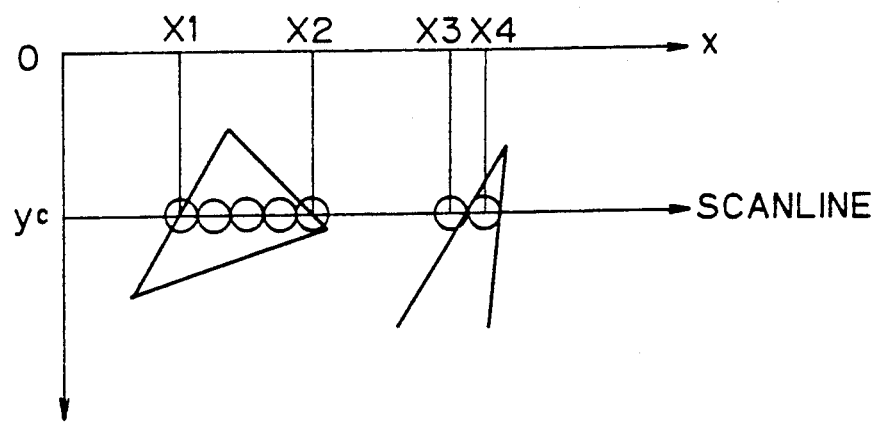

A specific operation of the operation of the PDL controller 200 will be described with reference to FIGS. 14A and 14B. The CPU 202 included in the controller 200 executes a sequence of steps shown in FIG. 14A. The controller 200 develops the PDL language sent thereto from the host computer 100 page by page into R, G and B image data while subjecting it to antialiasing processing, as stated earlier. In the PDL language, both graphics and texts are represented by vector data, and the image data are handled page by page. Further, one page is constituted by at least more than one passes each consisting of one or a plurality of elements (figure elements and character elements). On the arrival of PDL language, the CPU 202 determines whether or not the element thereof is a curve vector and, if the answer is positive, approximates it to a line vector and then registers it at a work area as a line element (line). The CPU 202 repeats such steps with all of the figure and character elements lying in one pass to thereby register line elements at the work area pass by pass (PROCESSING 1). Then, the CPU 202 sorts the pass-by-pass line elements having been registered at the work-by-pass area by the y coordinate at which the line starts. (PROCESSING 2). Thereupon, the CPU 202 executes painting using scanlines while updating the y coordinate one by one (PROCESSING 3). For example, assuming a pass shown in FIG. 14B, the CPU 202 registers at an active edge table (AET) the elements which a scan line yc to be processed crosses and the real number of x coordinates crossed the scanline yc ($x_1$, $x_2$, $x_3$ and $x_4$).

Because the order of elements registered at the work area is identical with the order in which they were registered by PROCESSING 1, the x coordinates crossing the scanline yc are not always registered in the increasing order. For example, when the line element passing the scanline yc and the coordinate $x_3$ shown in FIG. 14 B is processed first, $x_3$ will be registered in the AET first as the x coordinate of an edge that appears on the scanline yc. Therefore, after the registering at the AET, the elements of the various sides stored in the AET are sorted in the increasing order with respect to the x coordinate. Then, the first and second elements in the AET are paired, and the space between the paired elements is painted (PAINT BY SCANLINE). In the event this painting step, antialiasing is implemented by adjusting the density and luminance of the pixel on the edge in matching relation to the approximate area ratio. Subsequently, the sides having been processed are removed from the AET, and then the scanline (y coordinate) is updated. Such a procedure is repeated until all the sides listed in the AET, i.e., all the elements lying in on the pass have been processed.

The sequence of steps included in PROCESSING 1–3 is executed pass by pass to complete one page. Thereafter, a laser printer which will be described prints out the data while switching over the beam power thereof to the PM system or to the PWM system, depending on the inclination of the vector.

Figure 15A:
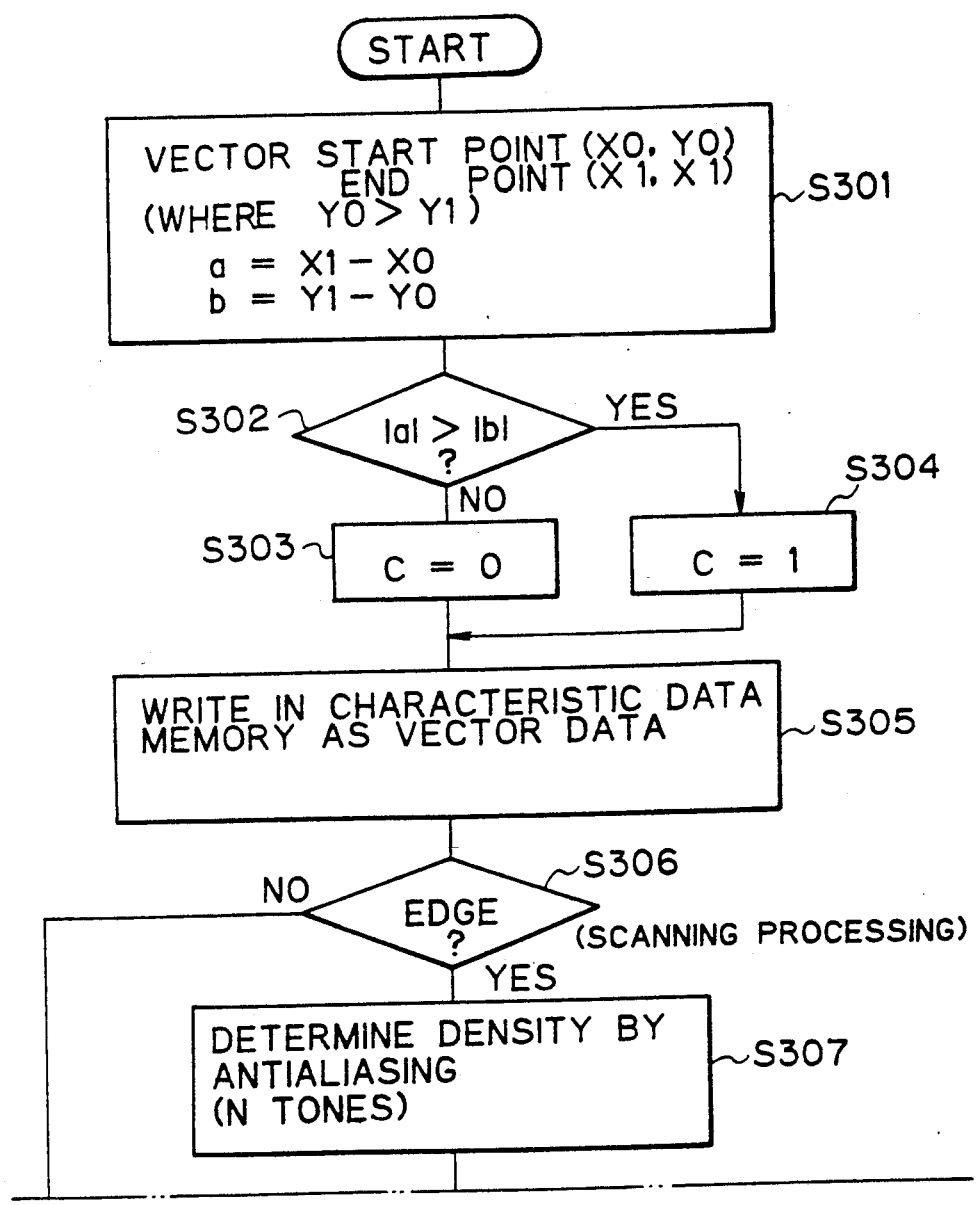
FIGS. 15A–B are flowcharts showing how three kinds of data are generate.
Figure 15B:
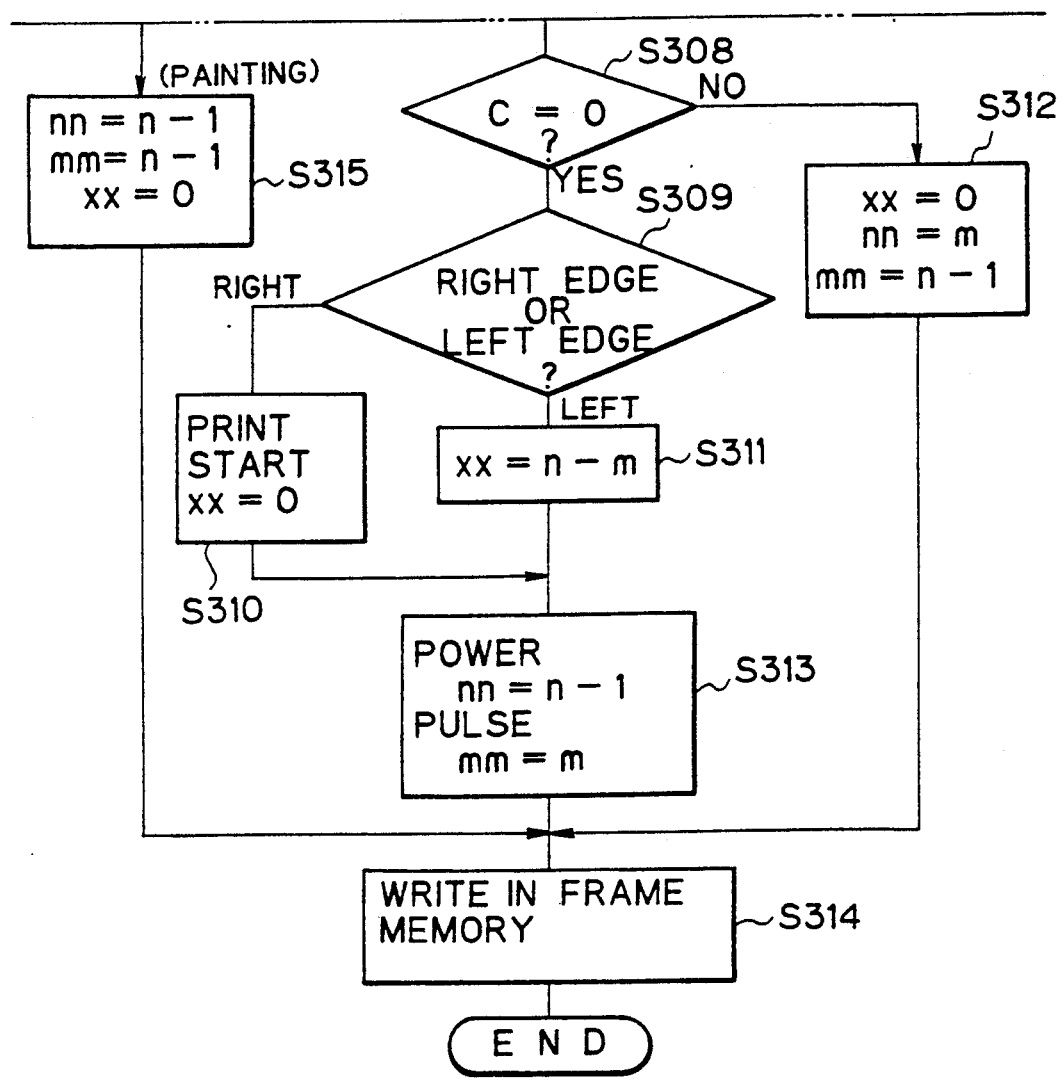

A reference will be made to FIG. 15 for describing how the previously mentioned three different kinds of data, i.e., power data nn, pulse width data mm and pulse position data xx are generated. Assume that all the data concerned have n levels.

First, assuming a vector having a start point (X0, Y0) and an end point (X1, Y1) where Y0 is greater than Y1), the following operations are performed (step S301):

a = X1 − X0 b = Y1 − Y0

Then, vectors are classified into two groups by the inclination. In the illustrative embodiment, let the vectors having inclinations greater than 45 degrees be referred to as vertical lines and vectors having inclinations smaller than 45 degrees be referred to as horizontal lines for simplicity. These two kinds of lines are distinguished on the basis of the relation between $|a|$ and $|b|$ (S302). Namely, a vector is determined to be a vertical line if $|a| < |b|$ (S303; C=0) or a horizontal line if $|a| < |b|$ (S304; C=1). The data C is written to the characteristic data memory as vector data (S305). Subsequently, whether the portion of interest is an edge or not is determined (S306) and, if the answer is negative, painting (nn = n − 1, mm = n − 1, xx = 0) is executed (S315). Conversely, if the portion of interest is an edge, density m is determined by antialiasing processing (S307).

Further, in a step S305, whether or not the vector data C already decided and stored in the characteristic data memory is 0 is determined (S308). If the answer of the step S308 is negative, the PM system is selected (xx = 0, nn = m and mm = n − 1). If answer of the step S308 is positive, the PWM system is selected, and whether the edge is a right edge or a left edge is determined so as to add data for controlling the print position of a pulse (S309). If the edge is a right edge, a dot is shifted to the left; if the former is a left edge, the latter is shifted to the right. More specifically, assuming that the PWM system is effected by dividing one dot into n segments, and that the positions of the segments are 0 to (n − 1), then printing will begin at the position xx = 0 in the case of a right edge (S310) or at the position xx = n − m in the case of a left edge (S311). In this manner, in the case of a horizontal line, the power nn = m, pulse width mm = n − 1 (maximum width) and print start position xx = 0 (no control over start position in the case of a right edge) or xx = n − m are written to the memory at the time of drawing an image in the frame memory 206. In the case of a vertical line, the power nn = n − 1 (maximum value), pulse width mm = m and print start position xx = n − m are written to the frame memory 206 (S313).

The graphic output device shown in FIG. 1 outputs an image by using the data generated by the above procedure. Hence, when a vector is determined to be a vertical line, a dot form assigned to vertical lines is used after having the phase thereof controlled. Likewise, when a vector is a horizontal line, a dot form assigned to horizontal lines is used.

(5) Construction of Image Processor

Figure 16:
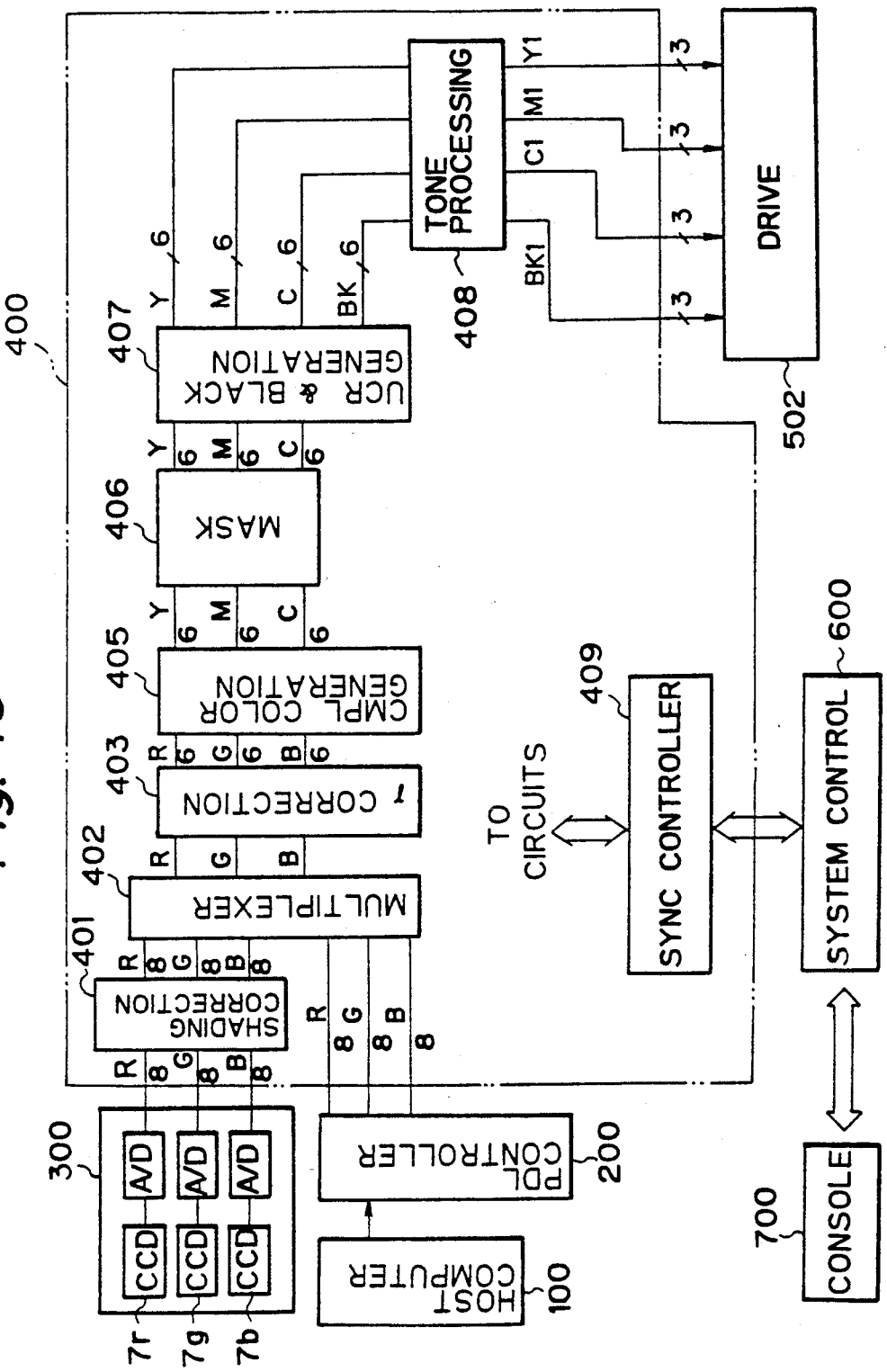
FIG. 16 is a block diagram schematically showing an image processor.

Referring to FIG. 16, the image processor 400 transforms image signals of three colors from CCDs (Charge Coupled Devices) 7r, 7g and 7b included in the image reader 300 to record signals of black (BK), yellow (Y), magenta (M) and cyan (C) which are necessary for recording. Likewise, the image processor 400 transforms RGB image data from the PDL controller 200 to such record signals. Let the mode in which the image signals from the image reader 300 arrive at the image processor 400 and the mode in which the RGB image data from the PDL controller 200 arrive the same be referred to as a copier mode and a graphics mode, respectively. As shown in FIG. 16, the image processor 400 includes a shading correction circuit 401 to which 8-bit digital color tone data derived from the output signals of the CCDs 7r, 8g and 7b are fed. The image processor 400 corrects the irregularities in the illuminance of the color tone data, irregularities in the elements of the individual CCDs 7r, 7g and 7b, etc. A multiplexer 402 outputs either ne of the color tone data from the shading correction circuit 401 and the color tone data from the PDL controller 200, according to the above-mentioned mode. A gamma correction circuit 403 changes tonality of the 8-bit data fed thereto from the multiplexer 402 (color tone data) in matching relation to the characteristic of a photoconductive element, thereby producing 6-bit data. A complementary color generation circuit 405 converts the 6-bit tone data from the gamma correction circuit 403 and representative of R, G and B tones to C, M and Y tone data (six bits). A masking circuit 406 executes predetermined masking processing with each of the Y, M and C tone data fed thereto from the circuit 405. A UCR (Undercolor Removal) and black generation circuit 407 performs undercolor removal and black generation with the masked Y, M and C tone data. A tone processing circuit 408 transforms the 6-bit Y, M, C and BK tone data from the UCR and black generation circuit 407 to 3-bit tone data Y1, M1, C1 and BK1, respectively, and deliver the 3-bit data to a laser driver 502, which will be described, included in the multicolor laser printer 500. A synchronization control circuit 409 sets up synchronization among the various circuits constituting the image processor 400.

The gamma correction circuit 403 allows the tonality to to be freely selected on buttons provided on a console 700, although not described specifically. The algorithm which the tone processing circuit 408 uses may be a multilevel dither method or a multilevel error scattering method. Assming a multilevel dither method using a 3×3 matrix, the multilevel color laser printer 500 is operable with a number of tones which is the product of the 3× area tones and the 3-bit (i.e. eight steps) multiple levels, i.e., 3×3×8=72 (tones).

Hereinafter will be described the operations of the masking circuit 406 and UCR and black generation circuit 407. Generally, the masking circuit 406 uses an equation:

$$\begin{bmatrix} Y_0 \\ M_0 \\ C_0 \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y_i \\ M_i \\ C_i \end{bmatrix}$$

where $Y_i$, $M_i$ and $C_i$ are the data before masking, and $Y_0$, $M_0$ and $C_0$ are the data after masking.

Likewise, the UCR and black generation circuit 407 implements UCR processing by using an equation:

$$\begin{bmatrix} Y_0' \\ M_0' \\ C_0' \\ BK_0' \end{bmatrix} = \begin{bmatrix} a_{11}' & a_{12}' & a_{13}' \\ a_{21}' & a_{22}' & a_{23}' \\ a_{31}' & a_{32}' & a_{33}' \\ a_{41}' & a_{42}' & a_{43}' \end{bmatrix} \begin{bmatrix} Y_0 \\ M_0 \\ C_0 \end{bmatrix}$$

By using the products of such two groups of coefficients, the illustrative embodiment produces new coefficients, as shown below:

$$\begin{bmatrix} Y_0' \\ M_0' \\ C_0' \\ BK_0' \end{bmatrix} = \begin{bmatrix} a_{11}' & a_{12}' & a_{13}' \\ a_{21}' & a_{22}' & a_{23}' \\ a_{31}' & a_{32}' & a_{33}' \\ a_{41}' & a_{42}' & a_{43}' \end{bmatrix} \begin{bmatrix} a_{11} & a_{12} & a_{13} \\ a_{21} & a_{22} & a_{23} \\ a_{31} & a_{32} & a_{33} \end{bmatrix} \begin{bmatrix} Y_i \\ M_i \\ C_i \end{bmatrix}$$

$$= \begin{bmatrix} a_{11}'' & a_{12}'' & a_{13}'' \\ a_{21}'' & a_{22}'' & a_{23}'' \\ a_{31}'' & a_{32}'' & a_{33}'' \\ a_{41}'' & a_{42}'' & a_{43}'' \end{bmatrix} \begin{bmatrix} Y_i \\ M_i \\ C_i \end{bmatrix}$$

In the illustrative embodiment, new coefficients such as $a_{11}''$ for executing masking and UCR at the same time are produced by calculation beforehand. In addition, such new coefficients are used to determine $Y_0'$ and other output values (results of calculation by the UCR and black generation circuit 407) corresponding to expected inputs $Y_i$, $M_i$ and $C_i$ to the masking circuit (six bits each), the determined output values being stored in a memory in advance. Hence, in the embodiment, the masking circuit 406 and UCR and black generation circuit 407 are implemented as a single ROM; data at a particular address designated by Y, M C which are the inputs to the circuit 406 is fed out as an output of the circuit 407. Generally, the masking circuit 406 corrects the Y, M and C signals in matching relation to the spectral reflection wavelength characteristic of a toner, while the UCR and black generation circuit 407 performs correction for balancing colors when toners of different colors are superposed. Circuit 407 generates data BK representative of a black component by combining the input Y, M and C data, while subtracting the data BK from the Y, M and C data before outputting the latter.

(6) Construction of Multilevel Color Laser Printer (Construction and Operation of Developing Section)

Figure 17:
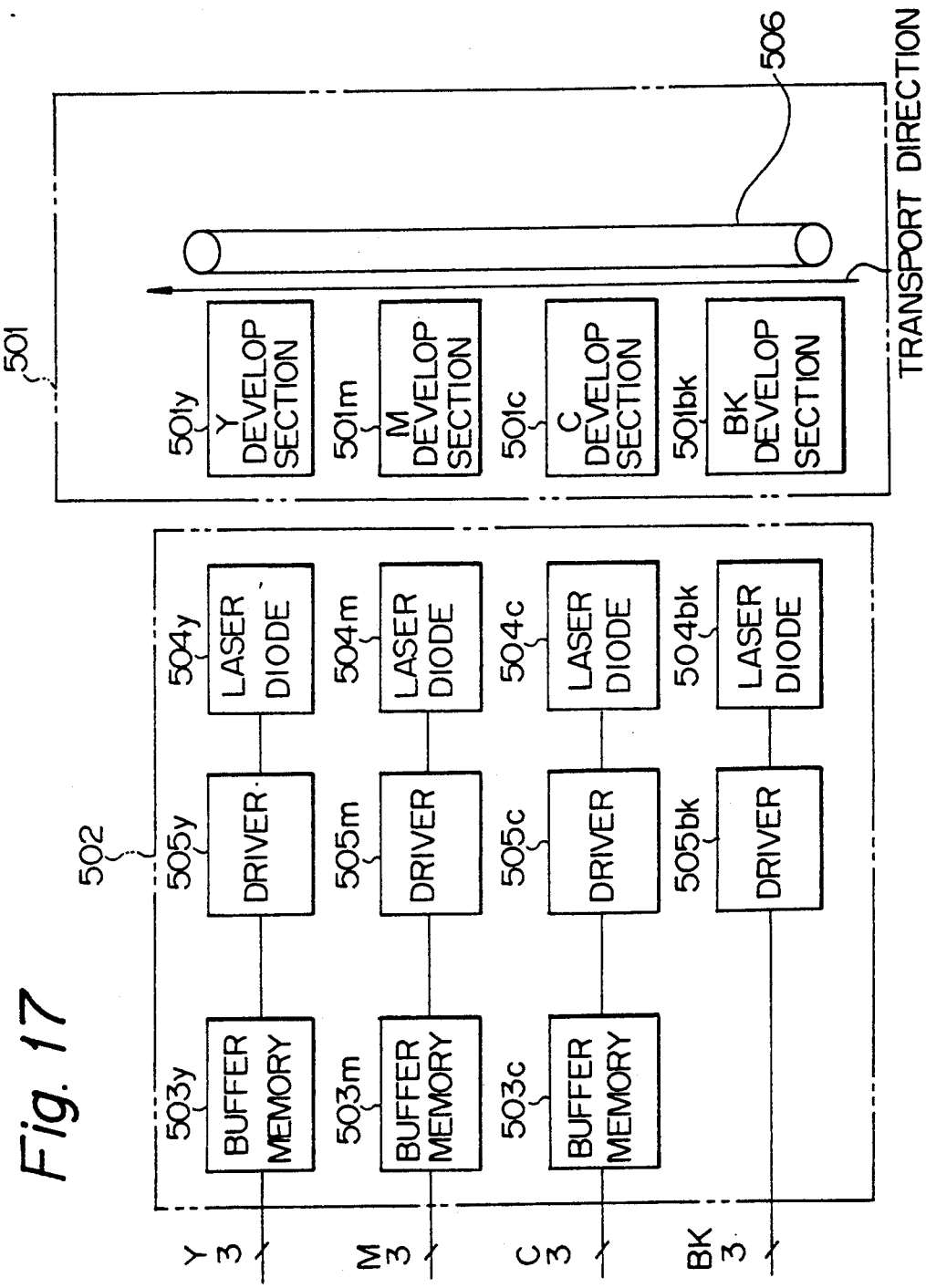
FIG. 17 is a block diagram showing a control system incorporated in a multilevel color laser printer.

The general construction of the multilevel color laser printer 500 will be described with reference to FIG. 17. As shown, the printer 500 is generally made up of a photoconductor developing section 501 and a laser driving section 502. The photoconductor developing section 501 uniformly charges the surface of a photoconductive drum which will be described, forms a latent image on the charged surface of the drum by exposing it imagewise by a laser beam, develops the latent image by a toner, and transfers the developed image or toner image to a recording medium. The developing section 501 has developing and transferring sections 501bk, 501c, 501m and 501y respectively assigned to BK data, C data, M data, and Y data, as will be described in detail later. The laser driving section 502 outputs a laser beam in response to 3-bit M, C and BK data (image density data at this stage) sent thereto from the image processor 400. Specifically, this section 502 has buffer memories 503y, 503m and 503c to which 3-bit Y, M and C data respectively are applied, laser diodes 504, 504m, 504c and 504bk emittig respectively laser beams corresponding to Y, M, C and BK, and drivers 505y, 505m, 505c and 505bk for driving the laser diodes 504y, 504m, 504c and 504bk, respectively.

Figure 18:
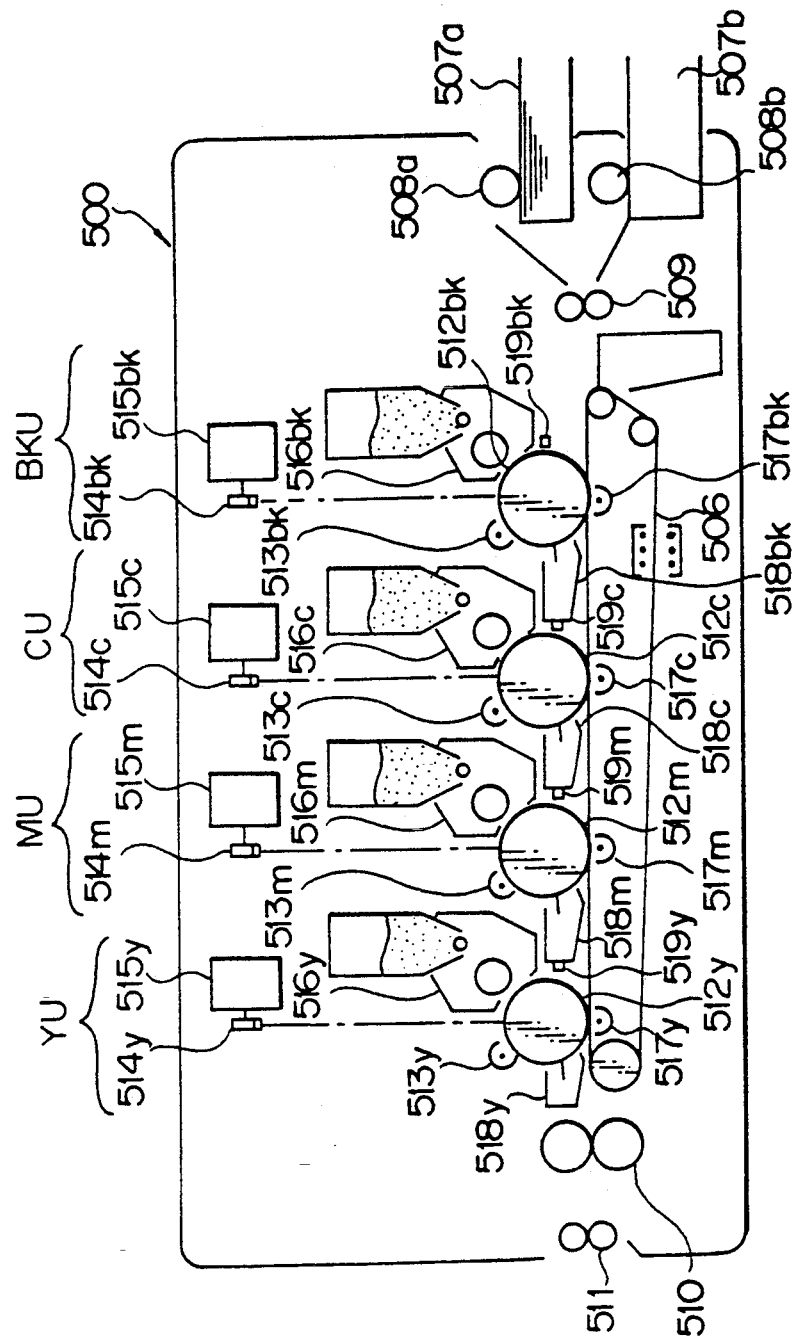
FIG. 18 shows a specific construction of a multilevel color laser printer.

The developing and transferring section 501 of the developing section 501 and the laser diode 504bk and driver 505bk of the laser driving section 502 will hereinafter be called a black recording unit BKU in combination (see FIG. 18). The combination of the developing and transferring section 501c, laser diode 504c, driver 505c and buffer memory 503c will be referred to as a cyan recording unit CU (see FIG. 18). Likewise, the combination of the developing and transferring unit 501m, laser dioe 504m, driver 505m and buffer memory 503m will be referred to as a magenta recording unit MU (see FIG. 18). Further, the combination of the developing and transferring unit 501y, laser diode 504y, driver 505y and buffer memory 303y will be called a yellow developing unit YU (see FIG. 18). These units BKU, CU, MU and YU are sequentially arranged in this order around a transport belt 506 in an intended direction of medium transport.

In the above arrangement, the laser diode 504bk assigned to black and the laser diode 504y assigned to yellow start on exposure first and last, respectively. To make up for such a time gap between nearby laser diodes, the buffer memories 503y, 503m and 503 are incorporated in the laser driving section 502.

The construction of the multilevel color laser printer 500 will be described with reference to FIG. 18 specifically. As shown, the laser printer 500 has, in addition to the transport belt 506 and the recording units YU, MU, CU and BKU, cassettes 507a and 507b each being loaded with sheets of particular size, pick-up rollers 508a and 508b respectively associated with the cassettes 507a and 507b, a register roller 509 for driving a sheet fed from one of the cassettes 507a and 507b further at a predetermined timing, a fixing roller 510 for fixing an image on a sheet having been sequentially transported by the belt 506 via the recording units BKU, CU, MU and YU, and a discharge roller 511 for discharging the sheet to a predetermined section, not shown. The recording units YU, MU, CU and BKU have respectively photoconductive drums 512y, 512m, 512c and 512bk, main chargers 513y, 513m, 513c and 513bk for uniformly charging respectively the drums 512y, 512m, 512c and 512bk, polygonal mirrors 514y, 514m, 514c and 514bk for steering respectively laser beams to the drums 512y, 512m, 512c and 512bk, motors 515y, 515m, 515c and 515bk respectively associated with the mirrors 514y, 514m, 514c and 514bk, developing devices 516y, 516m, 516c and 516bk each for developing a latent image electrostatically formed on associated one of the drums 512y-512bk by a toner of particular color, transfer chargers 517y, 517m, 517c and 517bk for transferring the developed toner images to a recording medium or sheet, and cleaning units 518y, 518m, 518c and 518bk each for removing the toner remaining on associated one of the drums 512y-512bk after image transfer. CCD line sensors 519y, 519m, 519c and 519bk each reads a particular pattern formed on respective one of the drums 512y-512bk, and they monitor the process conditions of the laser printer 500, although not described specifically.

Figure 19A:
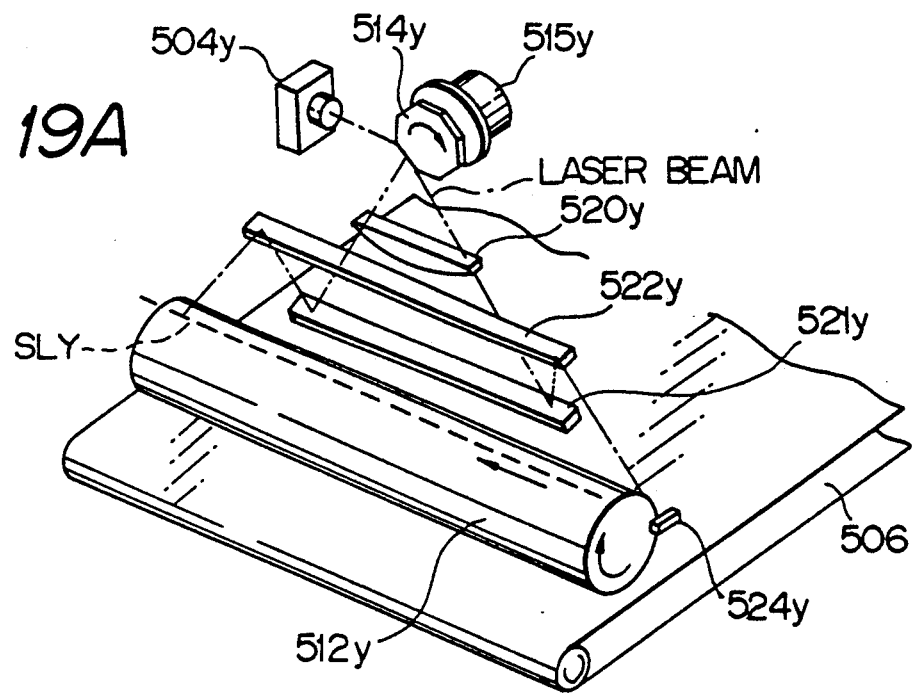
FIGS. 19A and 19B are views showing the arrangement of optics included in a yellow recording unit.
Figure 19B:
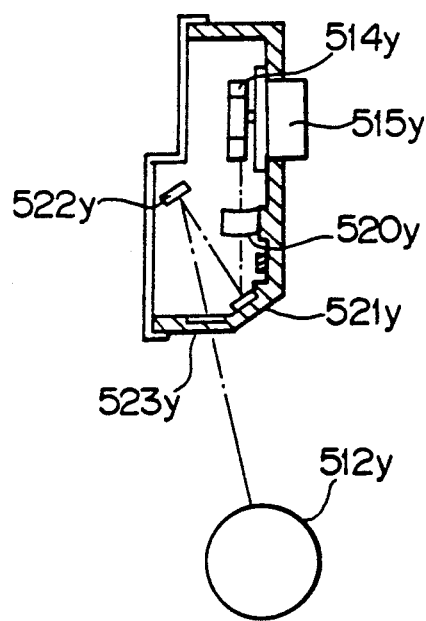

The operation of the laser printer 500 will be described by taking the yellow recording unit YU as an example. FIGS. 19A and 19B show the optics for exposure included in the recording unit YU. As shown, a laser beam issuing from the laser diode 504y is reflected by the polygonal mirror 514y, transmitted through an f-theta lens 502y, sequentially reflected by mirrors 521y and 522y, and incident to the drum 512y via a dust-proof glass 523y. Since the polygonal mirror 514y is rotated at a constant speed by the motor 515y, the laser beam is steered along the axis of the drum 512y (main scanning direction). In the illustrative embodiment, a photosensor 524y is located at a non-exposure position in order to detect a reference point for tracing the main scanning position. The laser diode 504y emits light in response to record data (3-bit data from the image processor 400), the surface of the drum 504y is subjected to multilevel exposure matching the record data. By the exposure, a latent image corresponding to a document image is electrostatically formed on the surface of the drum 504y which has been uniformly charged by the main charger 513 in advance. The developing device 516y develops the latent image to produce a yellow toner image. A sheet fed from the cassette 507a (or 507b), FIG. 18, is driven by the register roller 509 to the transport belt 506 in synchronism with the operation of the recording unit BKU. As a result, the yellow toner is transferred from the drum 507y to the sheet being transported by the belt 506. The other recording units BKU, CU and MU are constructed and operated in the same manner as the above-stated recording unit YU.

(7) Multilevel Drive of Driver

The drivers 505y-505bk each drives associated one of the laser diodes 504y-504bk in multiple levels in response to the 3-bit data Y, M, C or BK sent from the image processor. For the drive of the drivers 505y-505bk, use is often made of PM or PWM. The illustrative embodiment executes multilevel drive which is the combination of PM, PWM and pulse position modulation (PPM), as will be described with reference to FIGS. 20-36. Let the following description concentrate on the driver 505y and laser diode 504y by way of example.

Figure 20:
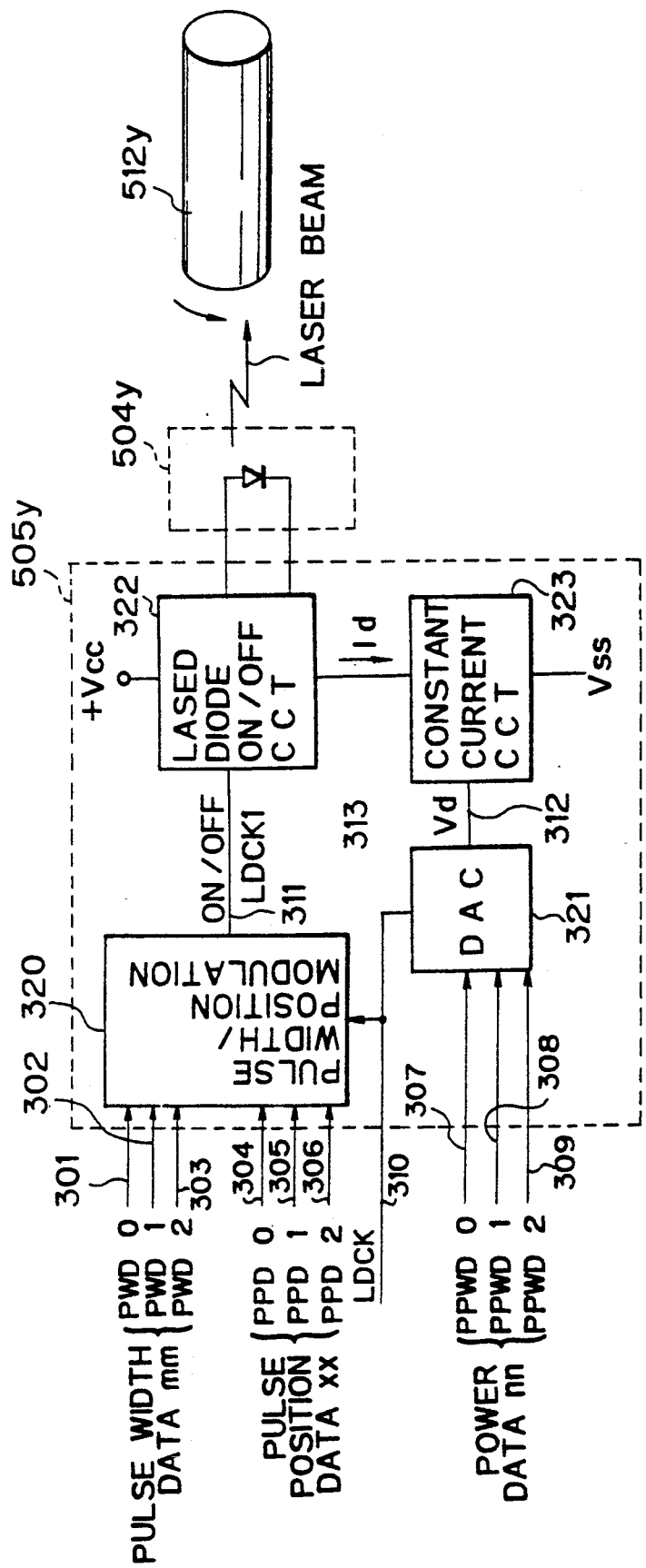
FIG. 20 is a block diagram representative of multilevel drive using power modulation and pulse width/position modulation.

As shown in FIG. 20, the driver 505y includes a laser ON/OFF circuit 322 for turning on and off the laser diode 504y in response to a predetermined LD drive clock (LDCK). A digial-to-analog converter (DAC) 321 converts 3-bit power data nn to an analog signal. A constant current circuit 323 receives the analog output of the DAC 321 based on an image density and in turn feeds a current (LD drive current) Id for driving the laser diode 504y to the laser ON/OFF circuit 322. A pulse width/position modulation circuit 320 modulates the pulse width and pulse position of the LD drive clock in response to the 3-bit pulse width data mm and the pulse position data xx, respectively.

Figure 21:
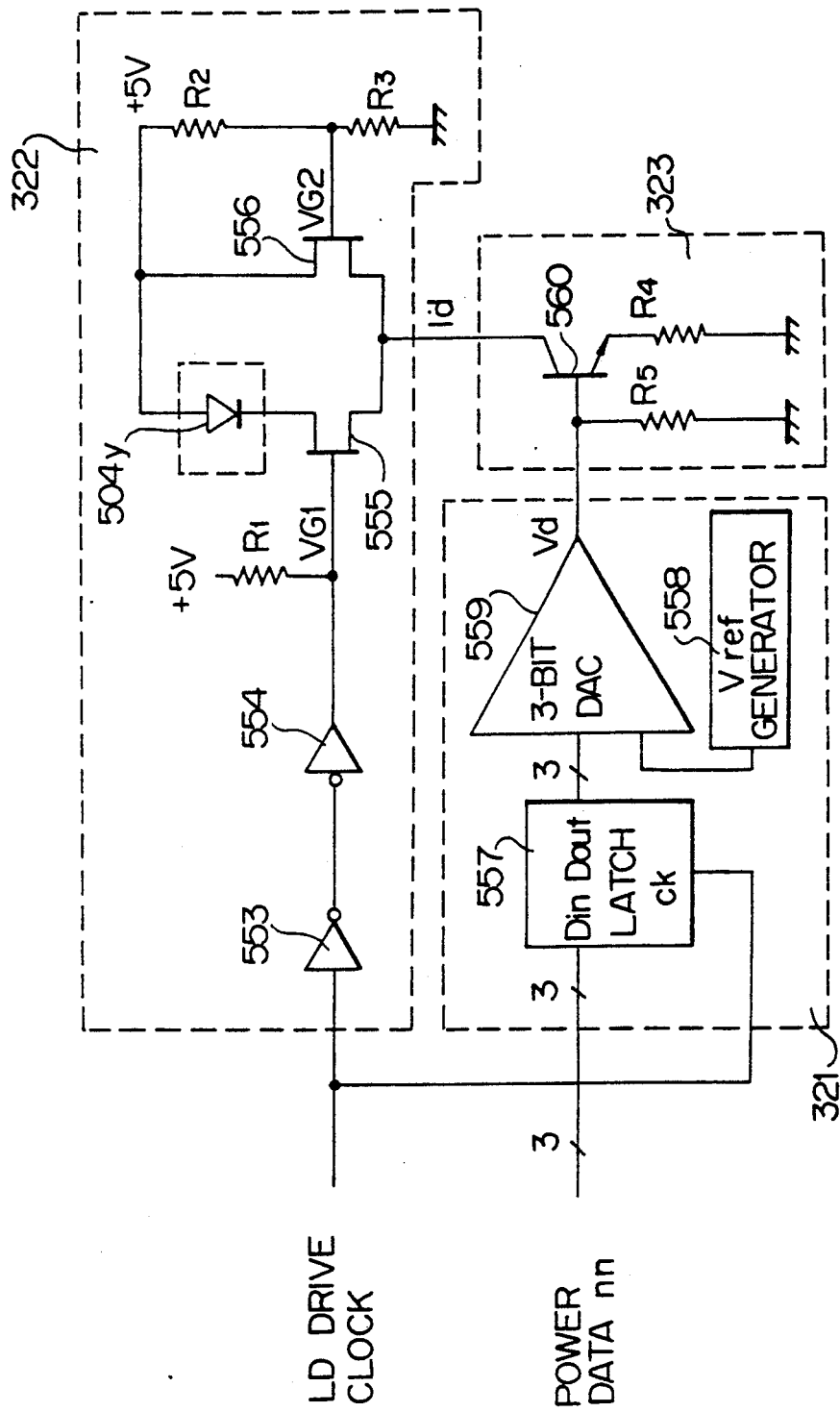
FIG. 21 is a diagram showing a specific construction of circuitry including a laser diode ON/OFF circuit.

FIG. 21 shows a specific construction of the laser diode ON/OFF circuit 322, DAC 321, and constant current circuit 323. As shown, the laser diode ON/OFF circuit 322 has TTL inverters 553 and 554, toggle type differential switching circuits 555 and 556, and resistors R2 and R3 constituting a voltage dividing circuit for generating VG2 which satisfies a condition that when VG1>VG2, the switching circuits 555 and 556 are ON and OFF, respectively, and a condition that when VG1<VG2, the switching circuits 555 and 556 are OFF and ON, respectively. Hence, when the LD drive clock is ONE, VG1 appears on the output of the inverter 554 to satisfy the condition VG1>VG2. As a result, the switching circuits 555 and 556 are turned on and turned on off, respectively, turning on the laser diode 504y. Conversely, when the LD drive clock is ZERO, the inverter 554 does not produce an output with the result that the condition VG1<VG2 is satisfied. In this condition, the switching circuits 555 and 556 are turned off and turned on, respectively, turning off the laser diode 5046. the DAC 321 has a latch 557 for latching the input image density data while the LD drive clock is ONE, a $V_{ref}$ generator 558 for generating the maximum output $V_{ref}$, and a 3-bit DAC 559 for outputting analog data Vd on the basis of the image density data and maximum output Vref. The analog data Vd, image density data and maximum output $V_{ref}$ are related to one another, as follows:

$$Vd = V_{ref} \times \frac{\text{image density data (input value)}}{2^3 - 1}$$

The constant current circuit 323 feeds the current of the laser diode 504y o the laser diode ON/OFF circuit 322, as stated earlier. This circuit 323 has a transistor 506 and resistors $R_4$ and $R_5$. The output Vd of the DAC 321 is applied to the base of the transistor 560 to determine the voltage which is to be applied to the resistor $R_4$. Stated another way, the current that flows through the resistor $R_4$ is substantially the same as the collector current of the transistor 560, so that the current Id to flow through the diode 504y is controlled by the analog data Vd.

Figure 22A:
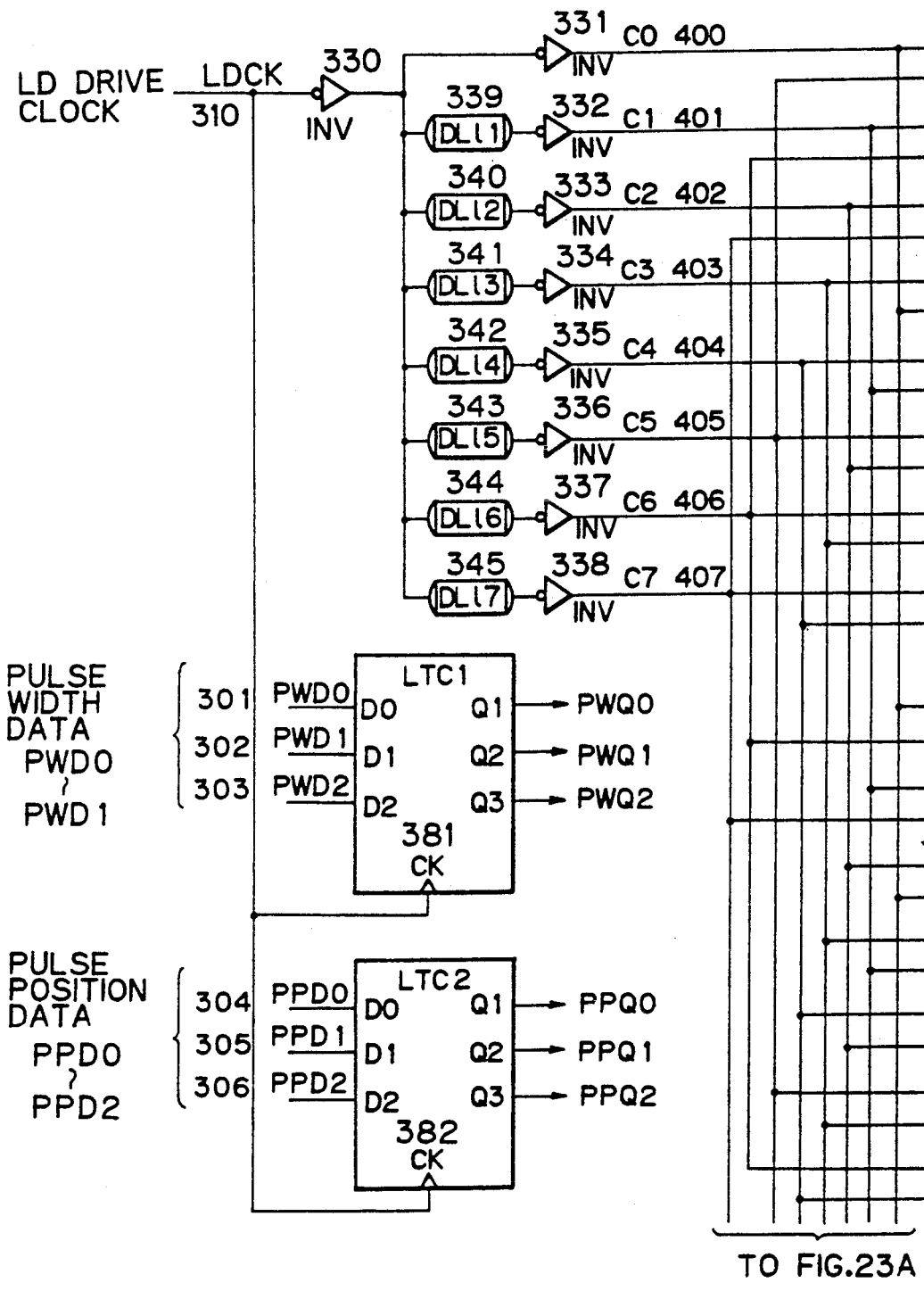
FIGS. 22A–B are block diagrams schematically showing part of a pulse width/position modulation circuit.
Figure 22B:
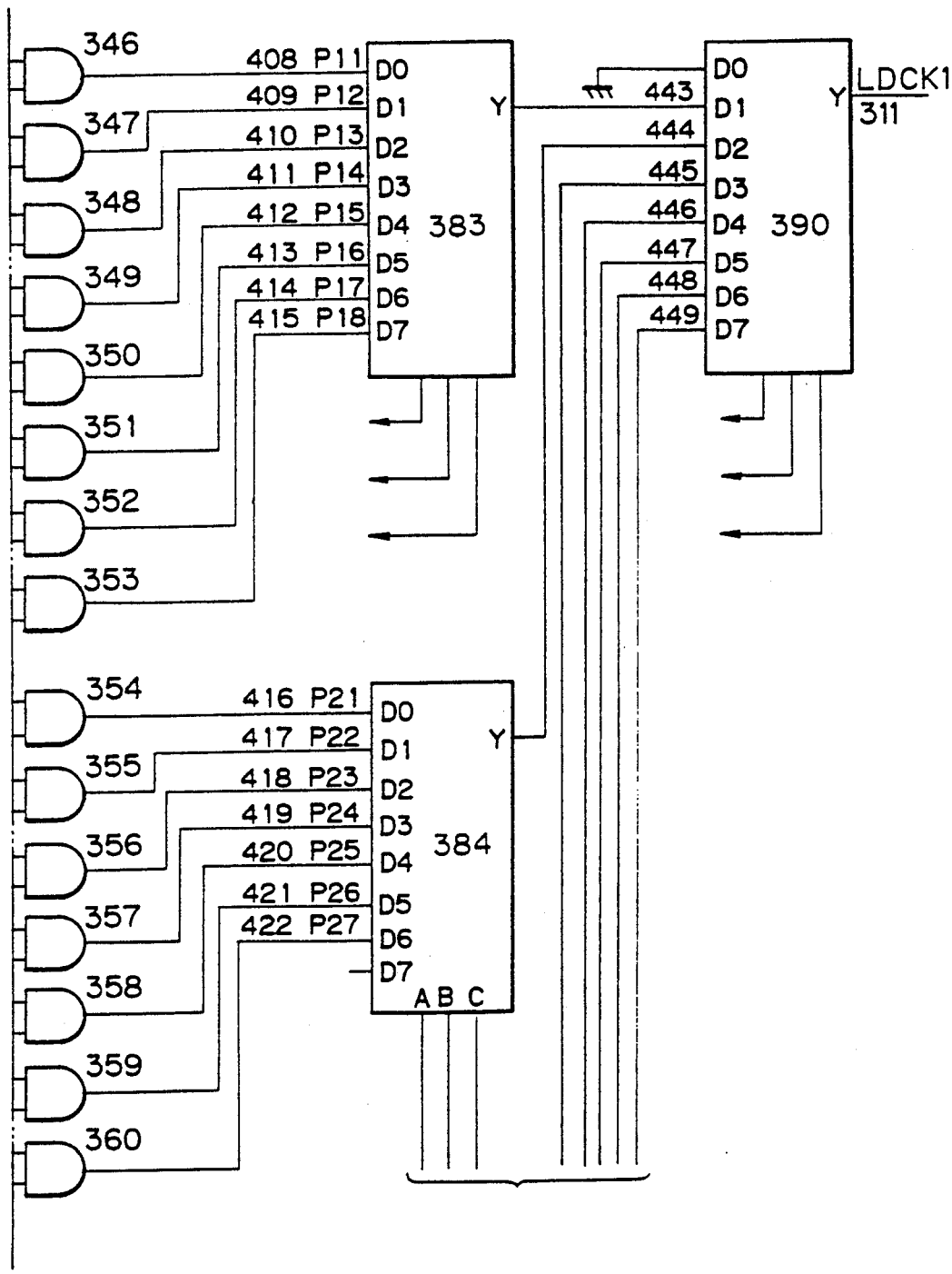
Figure 23A:
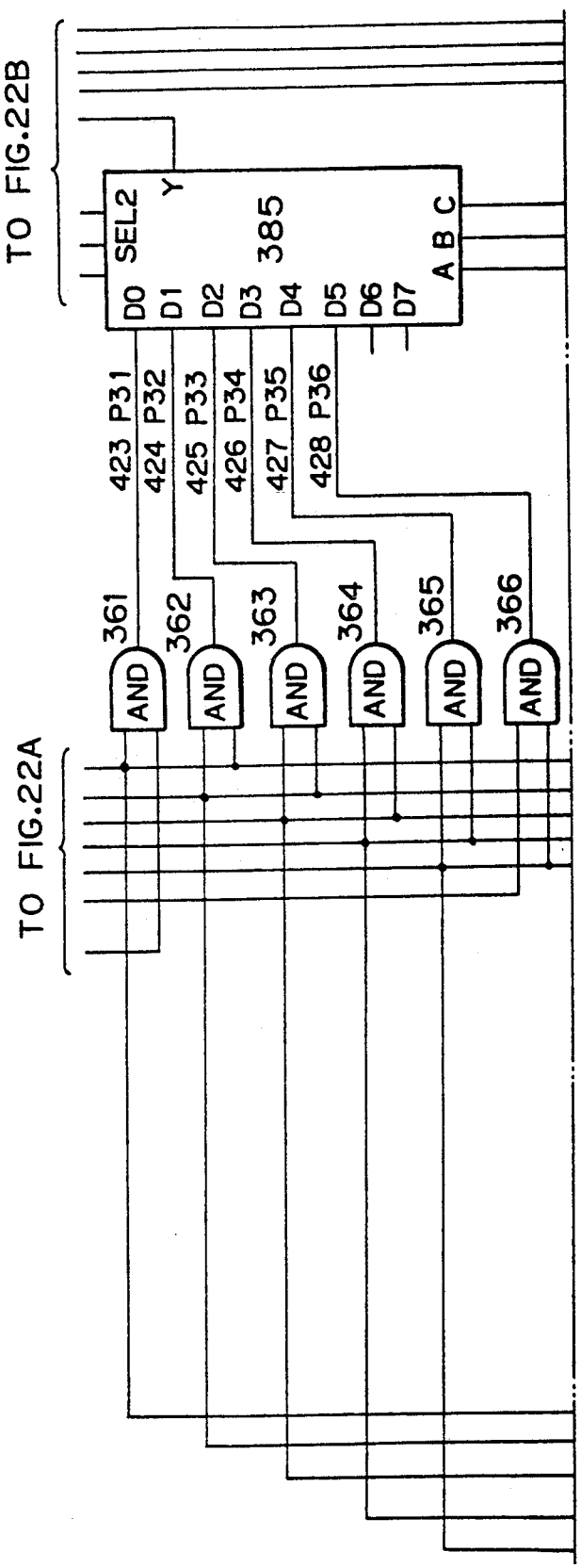
FIGS. 23A–B are block diagrams showing another part of the pulse width/position modulation circuit.
Figure 23B:
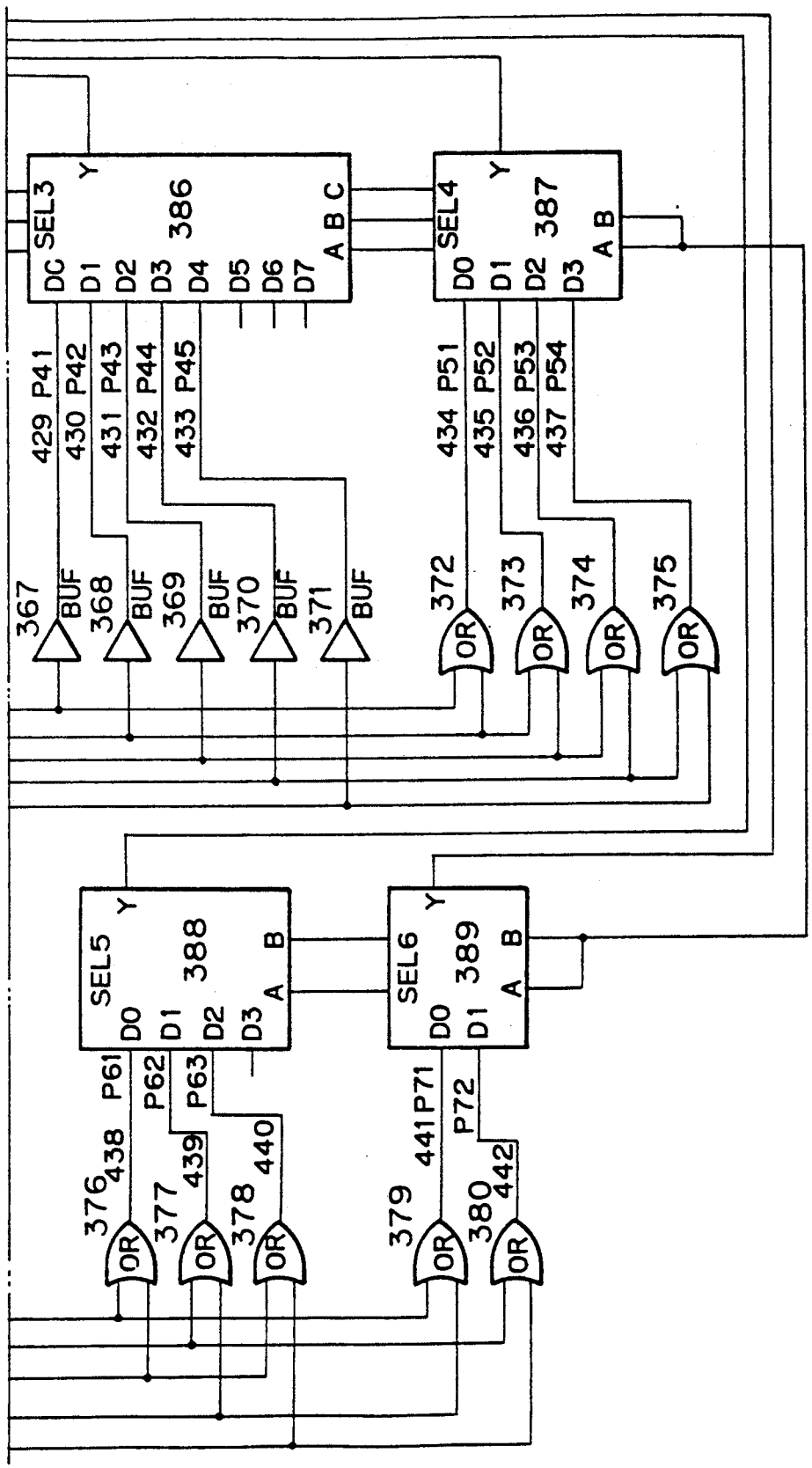
Figure 27:
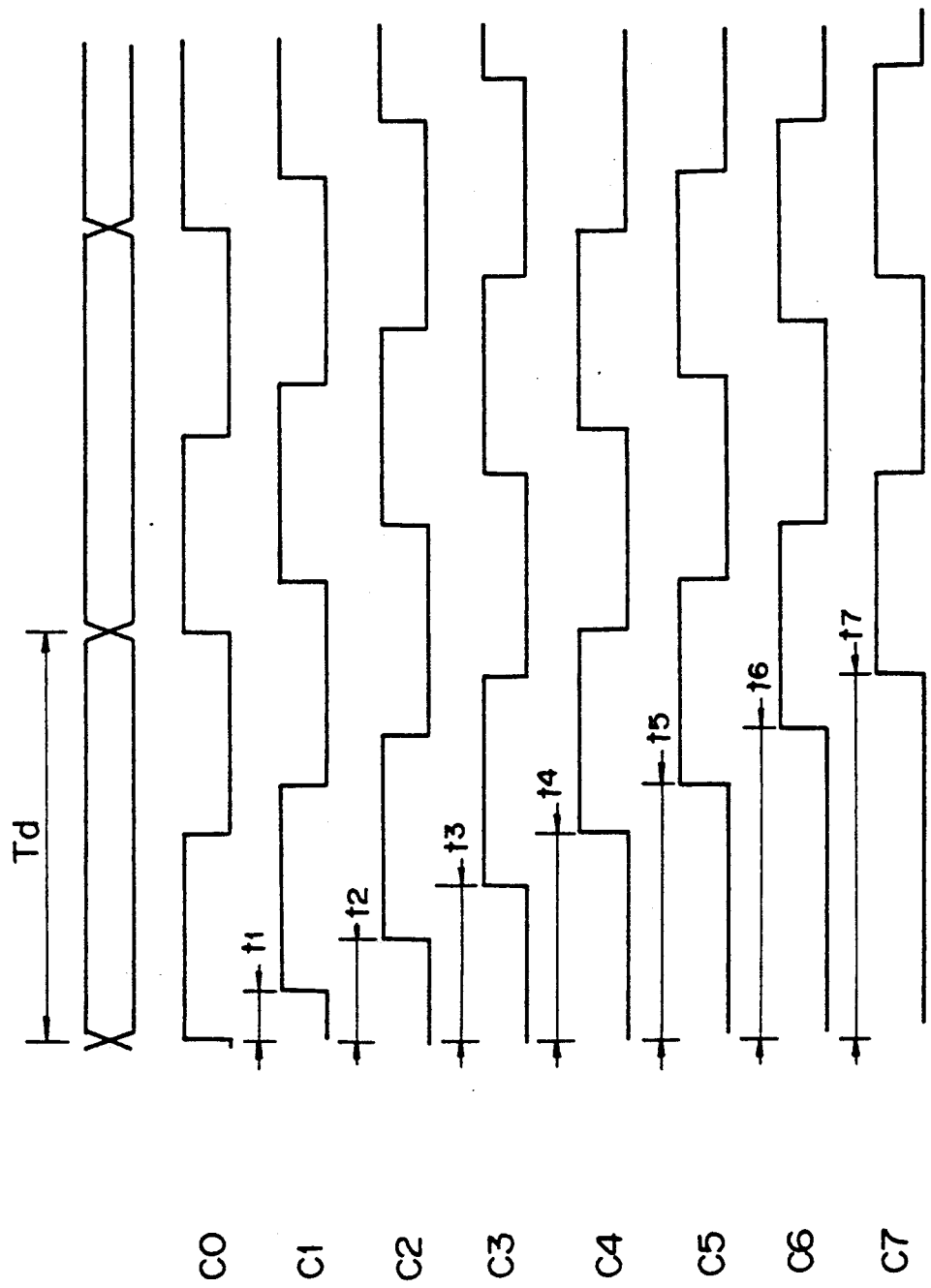
FIG. 27 is a timing chart showing $C_0$–$C_7$ included in the circuitry of FIG. 22.
Figure 28:
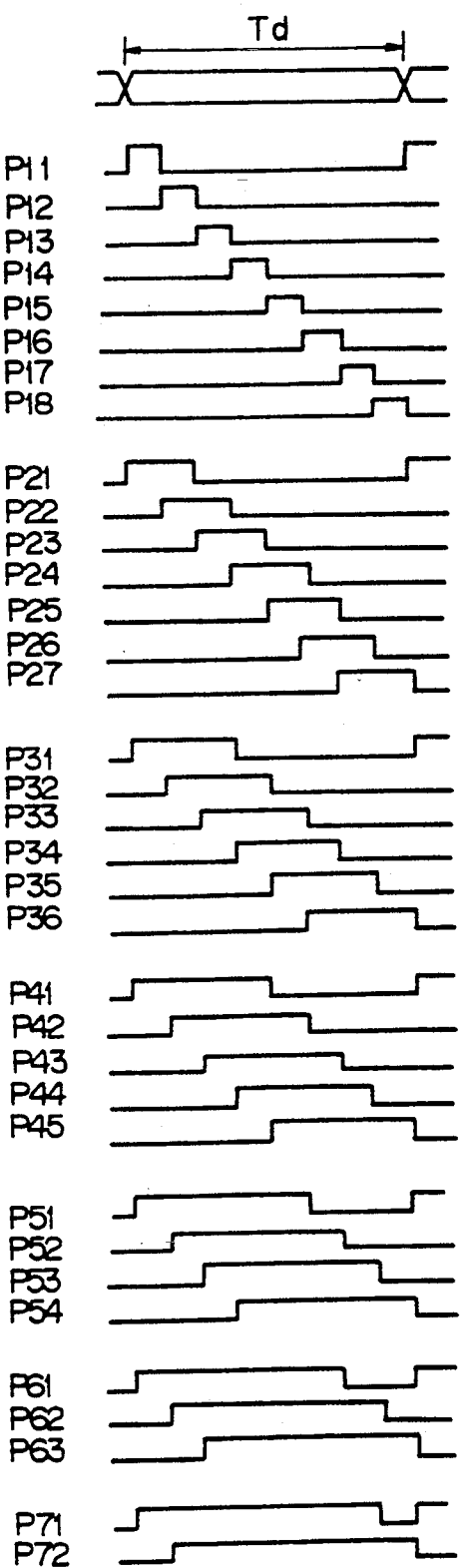
FIG. 28 is a timing chart showing P11–P18, P21–P27, P31–P36, P41–P45, P51–P54, P61–P63 and P71–P72 also included in the circuitry of FIG. 22.
Figure 29:
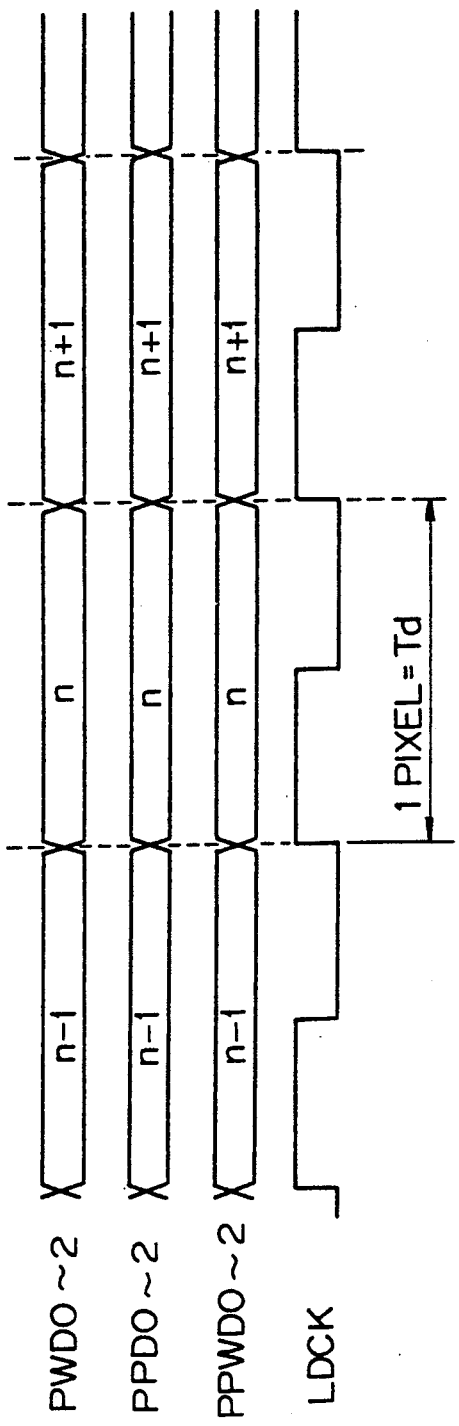
FIG. 29 is a chart indicative of a relation of pulse width data, pulse position data, power data and clock pulses to one another with respect to time.
Figure 31:
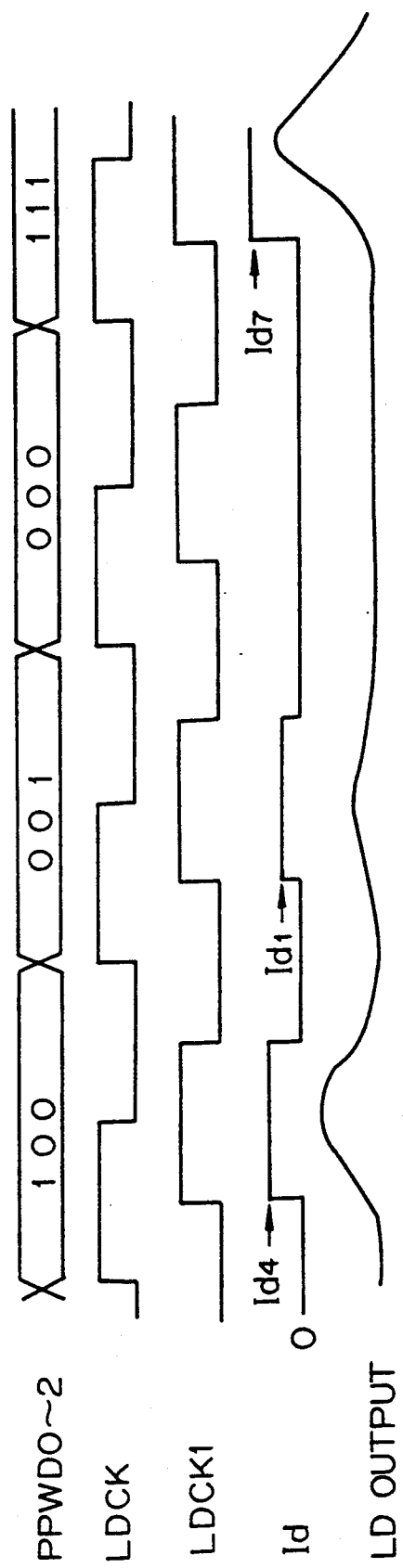
FIG. 31 is a chart showing a relation between Id and optical output on the assumption that LDCK1 has a particular value.

FIGS. 22 and 23 show a specific construction of the pulse width/position modulation circuit 320. As shown, the modulation circuit 320 includes inverters 330-338, delay elements 339-345 delaying the LDCK by times of $t_1$-$t_7$, respectively, AND gates 346-366, buffer circuits 367-371, and OR gates 372-380. Selectors 383-386 and 390 each has eight inputs and selects one of $D_0$-$D_7$ in response to inputs A, B and C while outputting it on an output Y. FIG. 24 shows a relation between the inputs A, B and C and the resluting output. 4-input selectors 387 and 388 each selects one of $D_0$-$d_3$ in response to inputs A and B while outputting it on an output Y. FIG. 25 shows a relation between these inputs A and B and the resulting output. A 2-input selector 389 selects either one of $D_0$ and $D_1$ in response to an input A while outputting it on an output Y, as shown in FIG. 26. Latches 381 and 382 each latches $D_0$-$D_2$ at the positive-going edge of the clock while outputting them on $Q_0$-$Q_2$. The latches 381 and 382 latch and hold respectively the data PWD0-PWD2 and the data PPD0-PPD2 at the positive-going edge of the LDCK, so that no malfunction may occur even when such inputs change before the next positive-going edge of the LDCK. The selectors 383-389 each selects a pulse position modulated pulse in response to the data PPD0-PPD2. The selector 390 selects the clock of various pulse undergone pulse position modulation in response to the data PWD-PWD2, thereby generating LDCK1. FIG. 27 is a timing chart representative of $C_0$-$C_7$ shown in FIG. 22 while FIG. 28 is a timing chart representative of P11-P18, P21-P27, P31-P36, P41-P45, P51-P54, P61-P63, and P71-P72.

In the above construction, the pulse width data 301-303 pulse position data 304-306 and power data 307-309 which are the image data and the LD drive clock 310 which is the clock pulse are applied to drive the laser diode 504y.

As the pulse width data and pulse position data are applied to the pulse width/position modulation circuit 320, a desired pulse is produced as LDCK 1311 and fed to the laser diode ON/OFF circuit 322. This circuit 322 feeds a current Id to the laser diode 504y when LDCK1 is ON or makes the current Id zero when LDCK1 is ZERO. The current Id is generated by the constant current circuit 322 as Id313. On the other hand, the power data PPWD0-PPWD are applied to the DAC 321. In response, the DAC 321 generates a control voltage Vd312 which determines the current Id of the constant current circuit 323. In the embodiment, Id has any one of seven data values $Id_1$-$Id_7$ because the power data has three bits. FIG. 30 shows a relation between the power data PPWD0-PPWD2, data values $Id_1$-$Id_7$, and latent image. FIG. 30 is representative of a relation between the current Id and the optical output on the assumption that LDCK1 has a particular value.

Figures 32, 33:
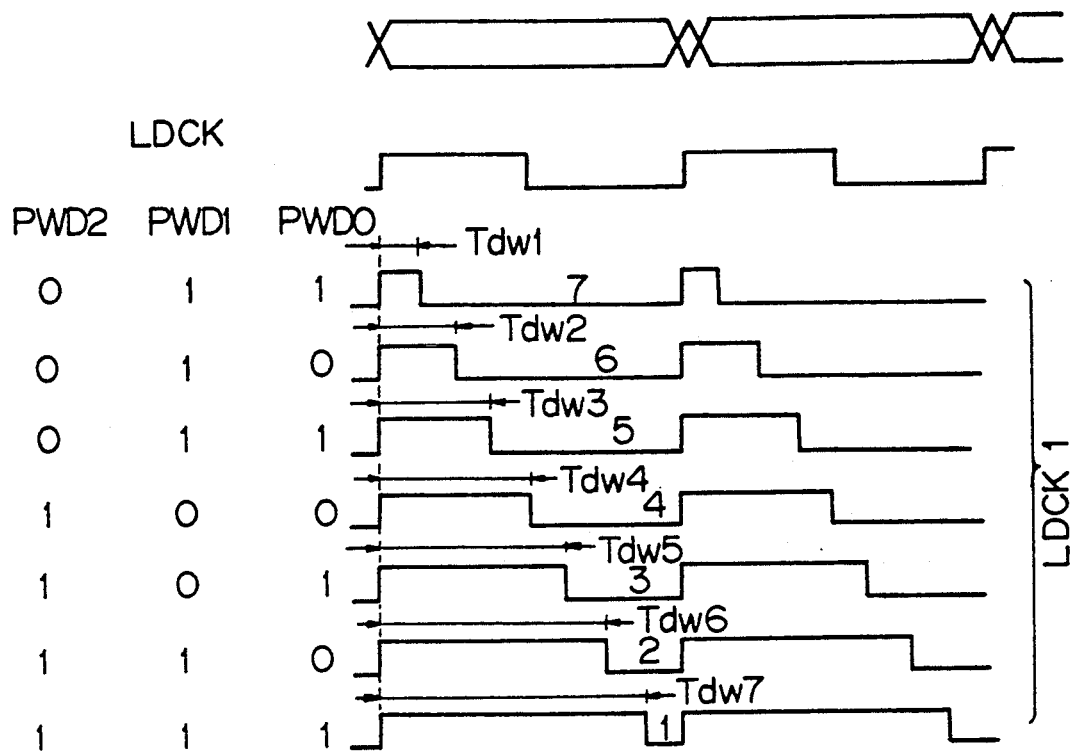
FIG. 32 is a chart showing a relation between PWD0–PWD2 and LDCK1.
FIG. 33 is a table indicative of a relation between LDCK1 and latent image.
Figure 34:
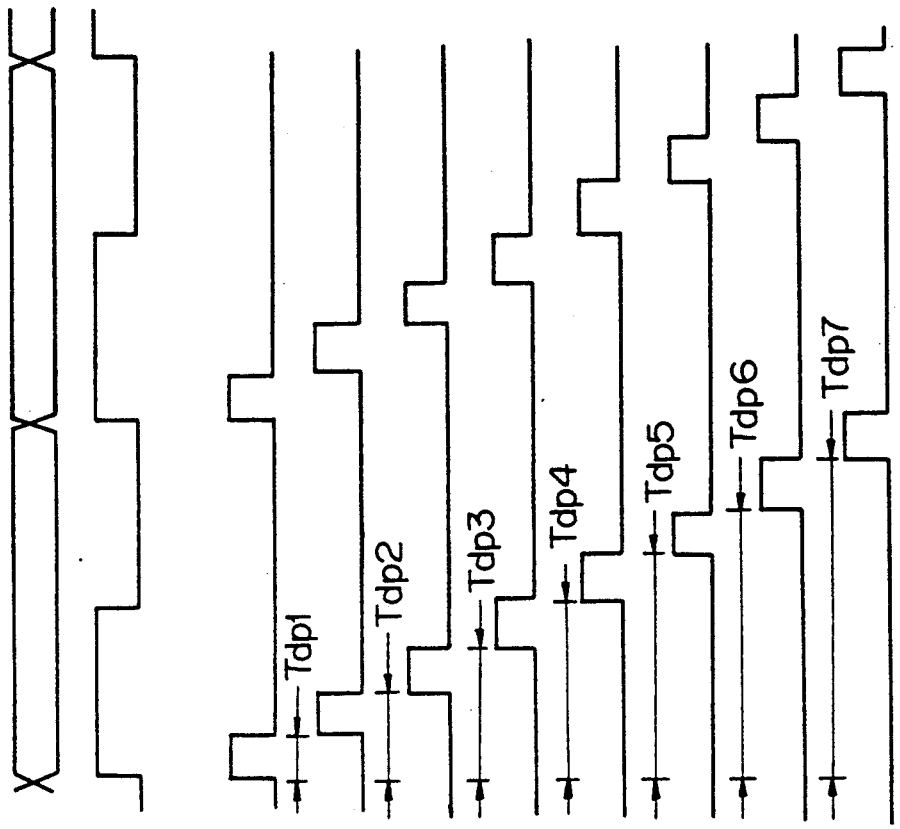
FIG. 34 is a chart showing a relation of PPD0–PPD2, LDCK1 and latent image to one another.
Figure 36:
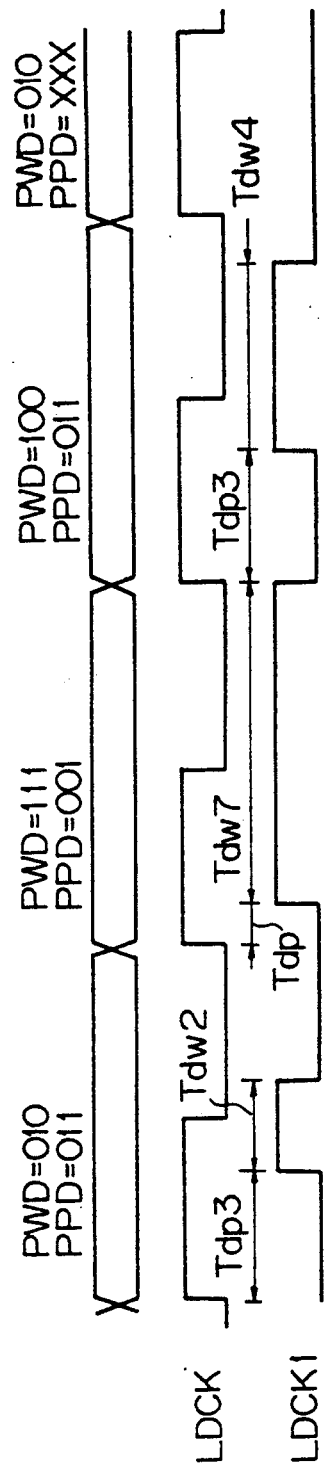
FIG. 36 is a chart representative of a condition wherein pulse width modulation and position modulation are effected at the same time.

The operation of the pulse width/position modulation circuit 320 is as follows. This circuit 320 divides one period Td of LDCK (one pixel) into eight and generates pulses LDCK1 which are pulse width/position modulated LDCK. PWD0-PWD2 determine the pulse width of LDCK1. FIG. 32 shows a relation between PWD0-PWD2 and DCK1 while FIG. 33 shows a relation between LDCK1 and latent image. Here, the pulse position modulation is assumed to be fixed (PPD0-PPD2=000) for simplicity. On the other hand, PPD0-PPD2 divide one period Td of LDCK (one pixel) into eight and select an interval between the positive-going edge of LDCK (start point of a pixel) and the positive-going edge of LDCK1. Because PPD0-PPD2 can be selected independently of PWD0-PWD2, it is also possible to control the duration of the pulse width modulated pulse. FIGS. 34 and 35 show a relation of PPD0-PPD2, LCK1 and latent image to one another. FIG. 36 shows a specific condition wherein pulse width modulation and pulse position modulation are effected at the same time.

(8) Specific Operation

A reference will be made to FIGS. 37A-37C for describing a specific operation of the illustrative embodiment. Assume that the image density has eight levels by way of example.

Figure 38:
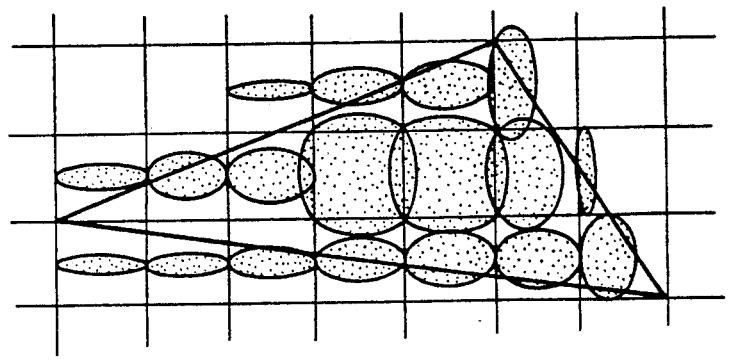
FIG. 38 shows a specific latent image outputted by the operation shown in FIGS. 34A–37C.

A vector (1) shown in FIG. 37A has a start point (7, 3) and an end point (2, 5). Since |2-7| is greater than |5-3|, the vector (1) is determined to be a horizontal line. On the other hand, a vector (2) has a start point (7, 3) and an end point (9, 6). This vector (2) is also determined to be a horizontal line because |9-7| is greater than |6-3|. Further, a vector (3) has a start point (2, 5) and an end point (9, 6) and is also determined to be a horizontal line. Such information is given to each vector. Then, the density of each pixel is modulated, as shown in FIG. 37B. Subsequently, power data nn, pulse width data mm and pulse position data xx are determined on the basis of the modulated densities of individual pixels, whether the pixels of interest are the edges of vertical lines or the edges of horizontal lines is determined, and, if the pixels are the edges of vertical lines, whether they are right edges or left edges is determined. The data nn, mm and xx are written to the page memory 206. FIG. 37C shows data so written to the page memory 206 in association with the pixels existing in the range of $3 \leq Y \leq 4$ and $3 \leq X \leq 9$. As shown in FIG. 38, when antialiasing is executed by use of the data stored in the page memory 206, the edge of the vector (1) is represented by horizontally long dots, the vector (2) is represented by vertically long dots shifted to the left, and the vector (3) is represented by horizontally long dots.

It is to be noted that when two or more vectors exist in a single pixel together, vector data to be dealt with later by scanline line processing is selected to be the data particular to the pixel.

As stated above, the illustrative embodiment is capable of effectively rendering the result of antialiasing processing by selecting a modulation system with consideration given to graphics information also.

SECOND EMBODIMENT

An alternative embodiment of the present invention will be described under the heads: (1) Outline of Second Embodiment, (2) Operation of PDL Controller, and (3) Specific Operation. The rest of the construction and operation are identical with the first embodiment and will not be shown or described to avoid redundancy.

(1) Outline of Second Embodiment

Figure 39:
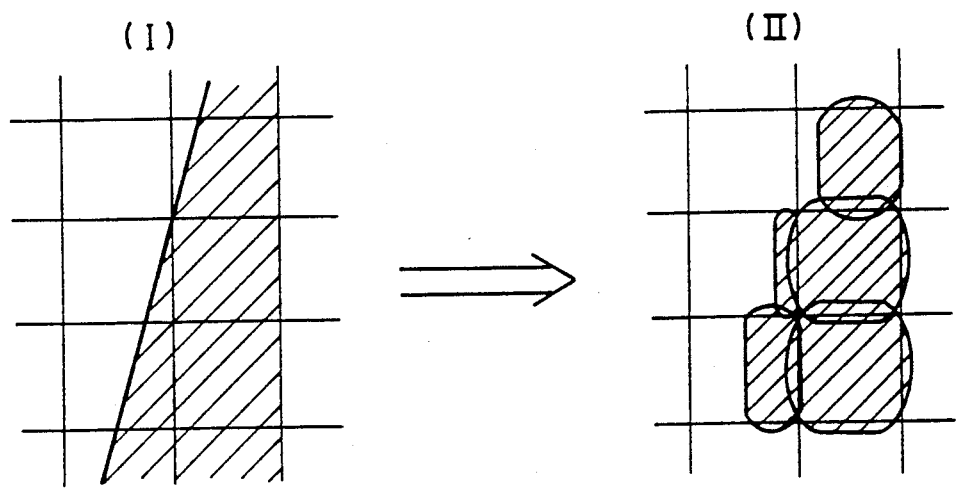
FIGS. 39 and 40 each shows a specific output for describing the advantage attainable with a second embodiment of the present invention.
Figure 40:
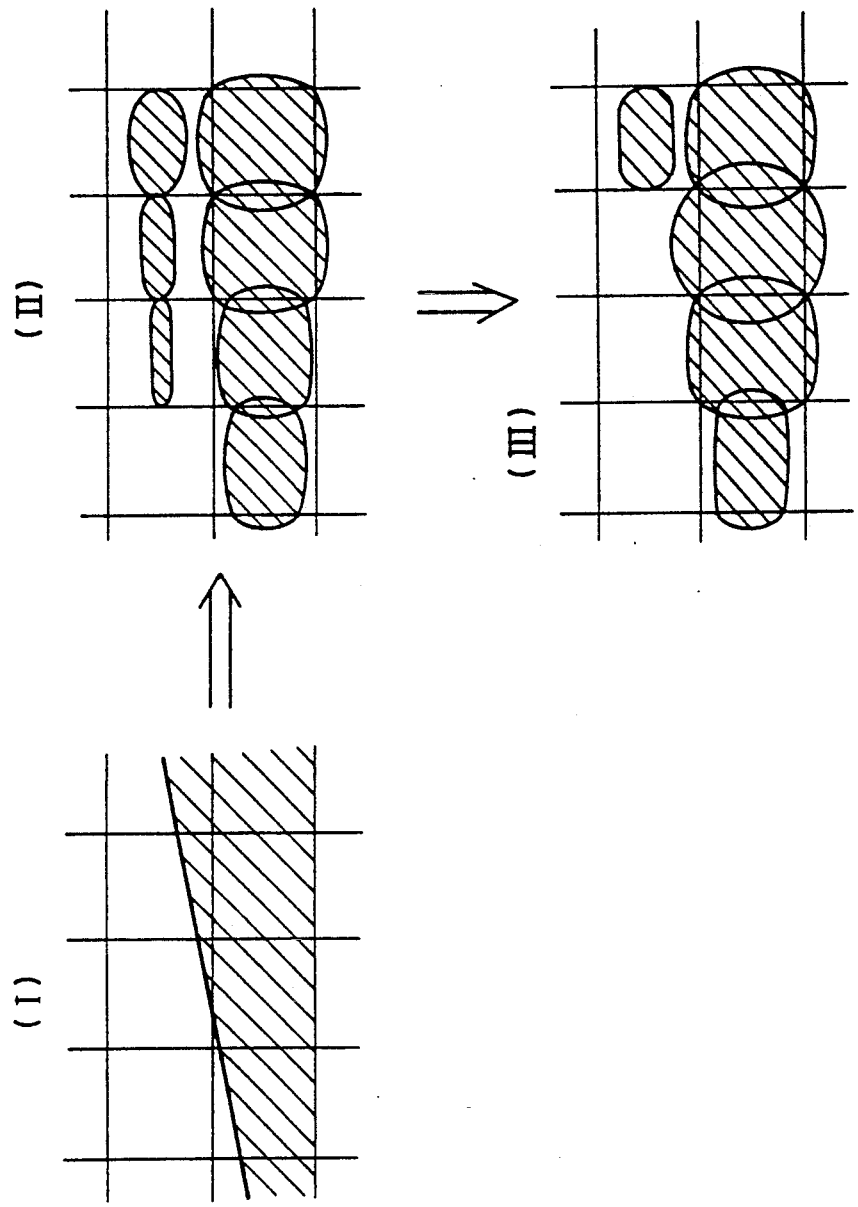

The embodiment provides a system which assigns, on the basis of image data, a particular outputting method to the laser beam printer for pixels whose densities have been reduced due to modulation. Specifically, this embodiment determines a vector as a vertical line if the inclination thereof is greater than 45 degrees and, in such a case, controls the position by the PWM system (vertically long dot form) because the image traverses the pixels of interest vertically long. If the vector has an inclination smaller than 45 degrees, the embodiment determines that it is a horizontal line and uses the PM system (horizontally long dot form) because the image traverses the pixels of interest horizontally long. Especially, the embodiment contemplates a method of outputting pixels whose densities have been reduced due to modulation. Regarding a pixel representative of a vertical line and reduced in density by modulation, the density thereof can be contiguous with the densities of nearby pixels even by the above-mentioned system and, therefore, no special measure is taken (see FIG. 39, [II]). On the other hand, when it comes to a pixel representative of a horizontal line and reduced in luminance by modulation, the above-mentioned system would cause a small dot to be printed out at an isolated location because the position of the horizontally long dot cannot be controlled in the up-and-down direction (see FIG. 40, [II]). In light of this, the embodiment does not output a pixel representative of a horizontal line and having a low density and, instead, increases the density of, among pixels neighboring in the up-and-down direction, a pixel located close to the image (see FIG. 40, [III]).

Figure 41A:
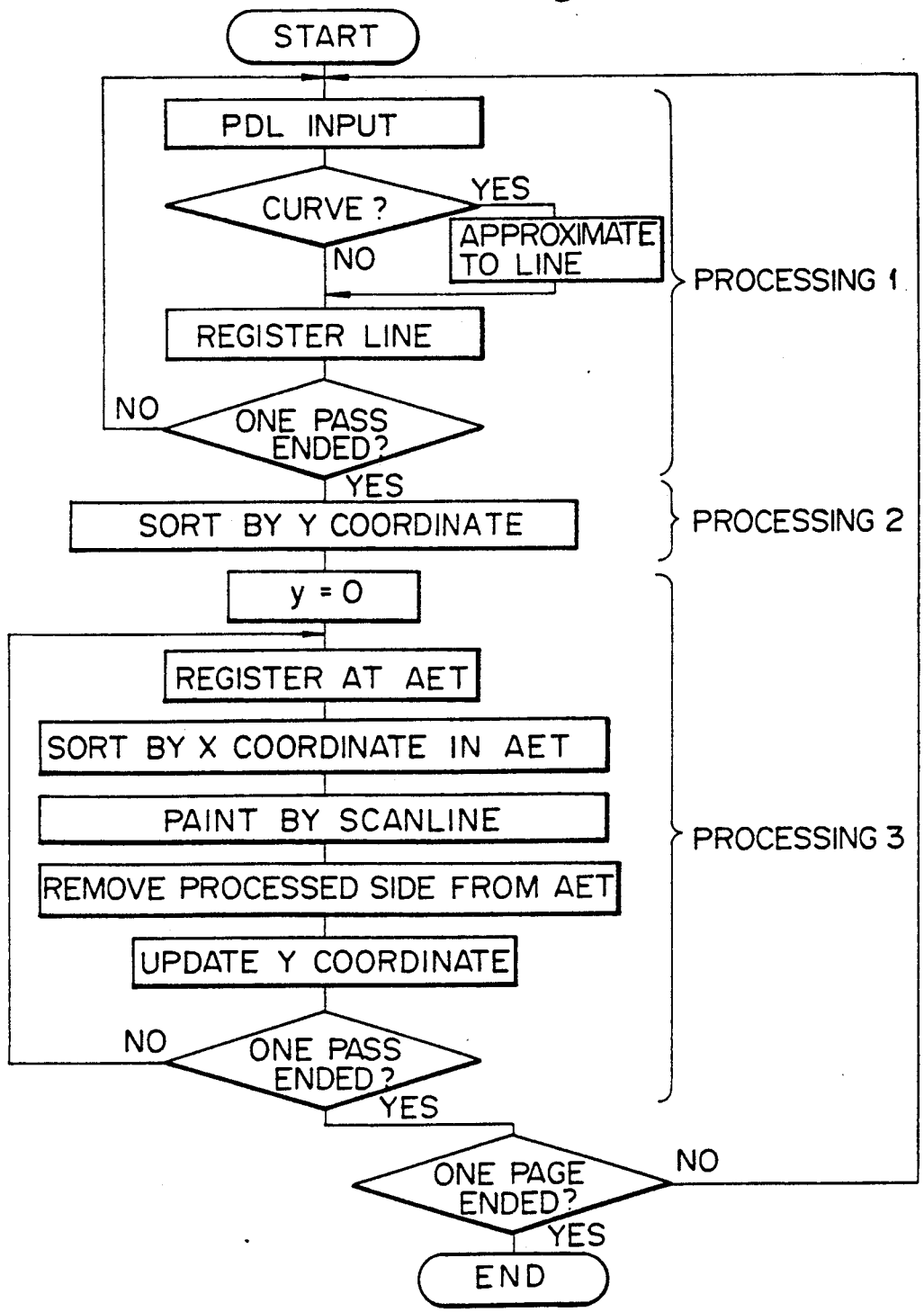
FIGS. 41A an 41B show respectively a specific operation of a PDL controller and the paining of a pass.

FIG. 41A shows a specific operation of the CPU 202. The PDL controller 200 develops the PDL language sent thereto from the host computer 100 page by page into R, G and B image data while subjecting it to antialiasing processing, as stated earlier. In the PDL language, both graphics and texts are represented by vector data, and the image data are handled page by page. Further, one page is constituted by at least more than one passes each consisting of one or a plurality of elements (figure elements and character elements). On the arrival of a PDL language, the CPU 202 determines whether or not the element thereof is a curve vector and, if the answer is positive, approximates it to a line vector and then registers it at a work area as a line element (line). The CPU 202 repeats such steps with all of the figure and character elements lying in one pass to thereby register line elements at the work area pass by pass (PROCESSING 1). Then, the CPU 202 sorts the pass-by-pass line elements having been registered at the work area by the y coordinate at which the line starts. (PROCESSING 2). Thereupon the CPU 202 executes painting using scanning liens while updating the y coordinate one by one (PROCESSING 3). For example, assuming a pass shown in FIG. 41B, the CPU 202 registers at an active edge table (AET) the elements which a scan line yc to be processed crosses and the real number of x coordinates crossed the scanline yc ($x_1$, $x_2$, $x_3$ and $x_4$).

Figure 41B:
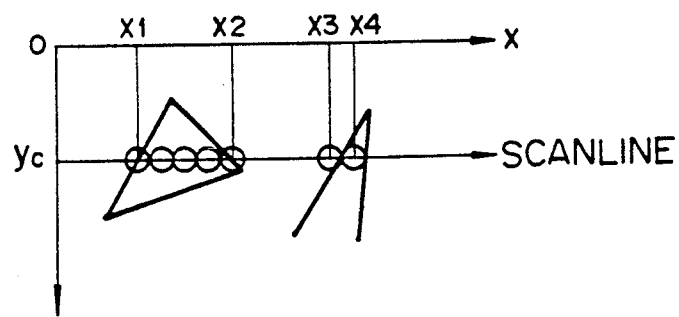

Because the order of elements registered at the work area is identical with the order in which they were registered by PROCESSING 1, the x coordinates crossing the scanline yc are not always registered in the increasing order. For example, when the line element passing the scanning line yc and the coordinate $x_3$ shown in FIG. 41B is processed first in PROCESSING 1, $x_3$ will be registered at the AET first as the x coordinate of an edge that appears on the scanline yc. Therefore, after the registering at the AET, the elements of the various sides stored in the AET are sorted in the increasing order with respect to the x coordinate. Then, the first and second elements in the AET are paired, and the space between the paired elements is painted (PAINT BY SCANLINE). In the event of this painting step, antialiasing is implemented by adjusting the density and luminance of the pixel on the edge in matching relation to the approximate area ratio. Subsequently, the sides having been processed are removed from the AET, and then the scanline (y coordinate) is updated. Such a procedure is repeated until all the sides listed in the AET, i.e., all the elements lying in on pass have been processed.

The sequence of steps included in PROCESSING 1-3 is executed pass by pass to complete one page. Thereafter, a laser printer which will be described prints out the data while switching over the beam power thereof to the PM system or to the PWM system, depending on the inclination of the vector.

Figure 42:
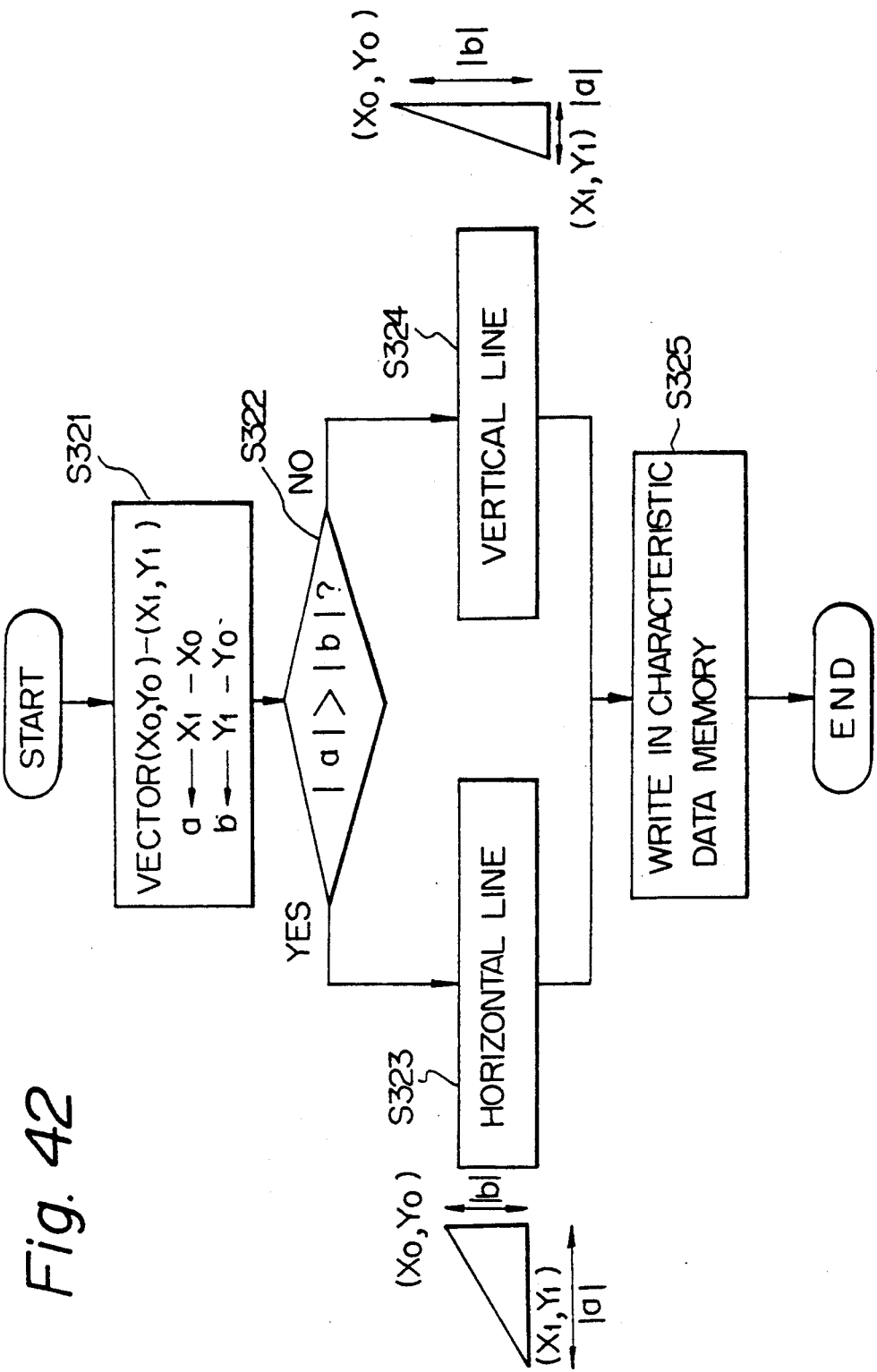
FIG. 42 is a flowchat representative of a vector data generation procedure particular to the second embodiment.

A reference will be made to FIG. 42 for describing how the previously mentioned there different kinds of data, i.e., power data nn, pulse width data mm and pulse position data xx are generated. Assume that all the data concerned have n levels.

First, assuming a vector having a start point (X0, Y0) and an end point (X1, Y1) (where Y0 is greater than Y1), the following operations are performed (step S321):

a = X1 − X0 b = Y1 − Y0

Then, vectors are classified into two groups by the inclination. In the illustrative embodiment, let the vecotors having inclinations greater than 45 degrees be referred to as vertical lines and vectors having inclinations smaller than 45 degrees be referred to as horizontal lines for simplicity. These two kinds of lines are distinguished on the basis of the relation between $|a|$ and $|b|$ (S322). Namely, a vector is determined to be a vertical line if $|a| < |b|$ (S323) or a horizontal line of $|a| > |b|$ (S324). This data is written to the characteristic data memory 206b of the page memory 206 as vector data (S325).

Figure 43A:
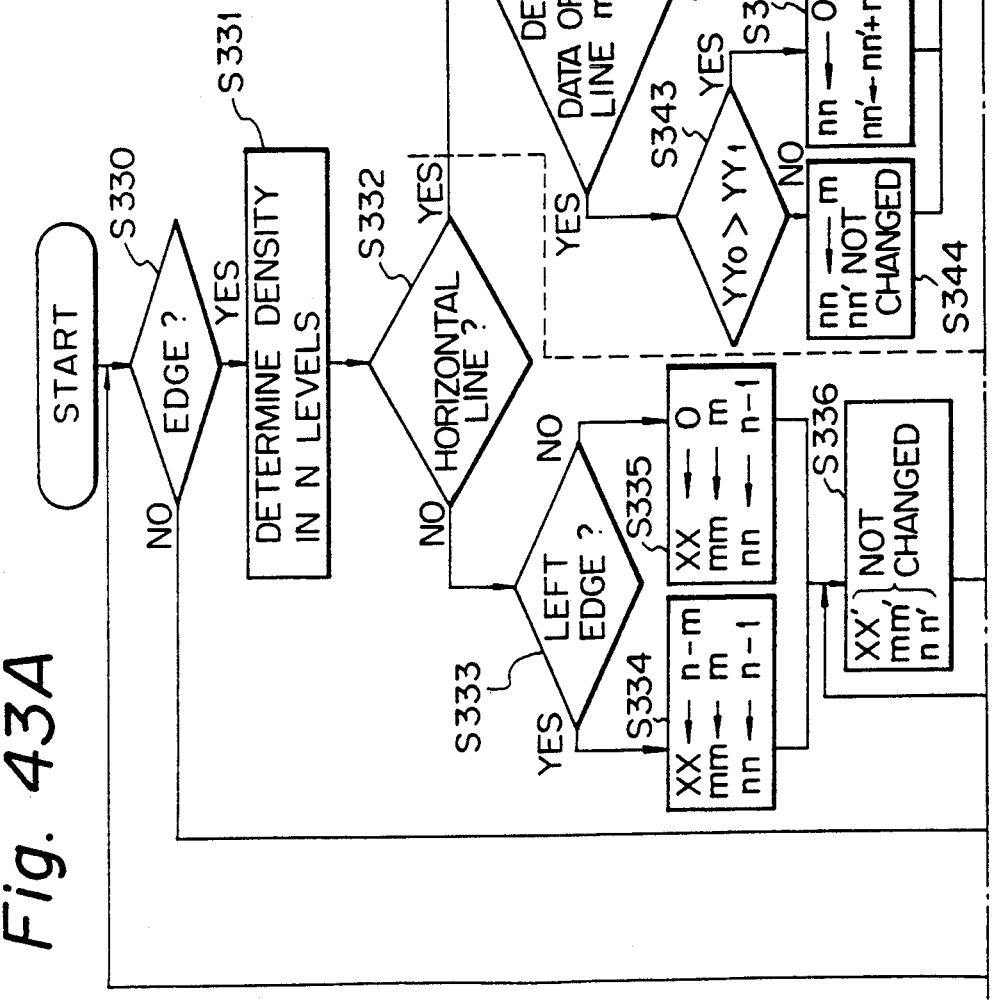
FIGS. 43A–B are flowcharts showing a beam modulation data generation procedure also particular to the second embodiment.
Figure 43B:
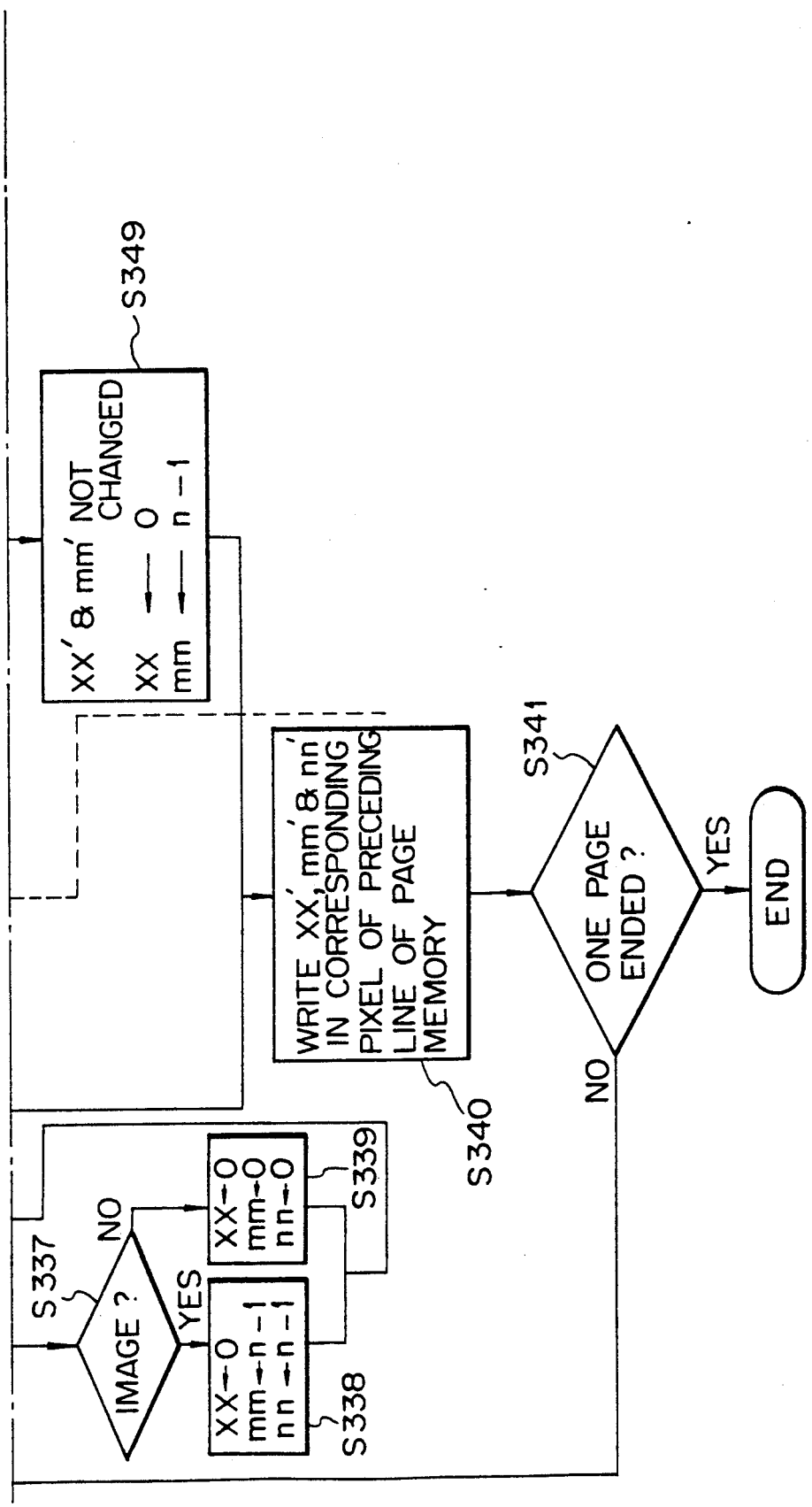

Referring to FIG. 43, how the embodiment generates beam modulation data will be described with respect to a vertical line and a horizontal line sequentially.

Whether the portion of interest is an edge of an image or not is determined (S330) and, if the answer is positive, antialiasing is executed to determine a density m with respect to the n levels (S331). Next, whether the edge is representative of a horizontal line is determined (S332) on the basis of horizontal and vertical line data determined in advance (see FIG. 42) and, if the answer is negative, i.e., if the edge is a vertical line, whether the edge is a left edge is determined so as to add data for controlling the print position of a pulse (S333). If the edge is a left edge, a dot is shifted to the right (xx=n−m, mm=m and nn=n−1). If the edge is a right edge, a dot is shifted to the left (xx=0, mm=m and n=n−1). More specifically, assuming that pulse width modulation is effected by dividing one dot into n segments, and that the positions of the segments are 0 to (n−1), then printing will begin at the position 0 in the case of a right edge or at the position (n−m) in the case of a left edge.

If the answer of the step S330 is negative, meaning that the portion of interest is not an edge, whether or not the portion is an image is determined (S337). If the answer of the step S337 is positive, xx=0, mm=n−1 and nn=n−1 are set to execute painting (S338). If the answer of the step S337 is negative, xx=0, mm=0 and nn=0 are set so as not to executed painting (S339).

After various data have been generated as stated above, xx', mm' and nn' (data on the preceding line and decided after the processing of the current line) associated with both the right edge and the left edge are set as they are (S336), and they are written to the corresponding pixels of the page memory 206. Whether or not one line has completed is determined (S341) and, if it has not completed, the steps S330–S341 are repeated until one line completes. If the answer of ht step S341 is positive, the program ends.

Figure 44:
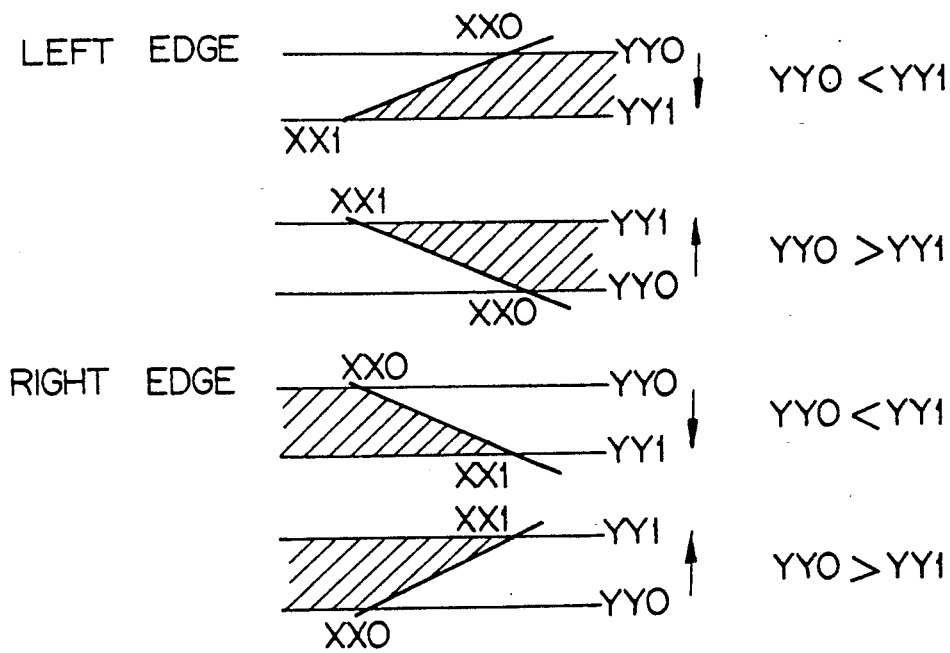
FIG. 44 shows how an upper edge and a lower edge are distinguished from each other.

Assume that the answer of he step S332 is positive, meaning that the edge is a horizontal line. Then, when the pixel of interest has a low density, it is not printed out while one of the pixels adjoining the pixel of interest in the up-and-down direction that merges into an image is increased in density. Assume that the vector representative of the edge intersects the overlying and underlying scanning lines at coordinates (XX0, YY0) and (XX1, YY1), respectively, and that the coordinates (XX0, YY0) is closer to an image. As shown in FIG. 44, which of the overlying and underlying pixels should have the density thereof increased depends on the position of the edge, i.e., an upper edge or a lower edge, more specifically a relation between YY0 and YY1. The processing is effected by determining data on the current line to be temporarily stored and the final density data on the preceding line while referencing the density data on the preceding line which is temporarily stored without fail. Specifically, densities lower than n/4 are determined to be low. When the density on the current line is determined to be low, to which of the overlying and underlying lines the low density should be added is determined. When the low density should be added to the underlying line, the current density is temporarily held. When the low density should be added to the overlying line, it is added to the density of the preceding line to determine the density of the preceding line and, at the same time, the density of the current line is reduced to zero and then temporarily held. On the other hand, if the density of the preceding line having been held is low, it is added to the density of the current line to set up a new density of the current line while, at the same time, the density of the preceding line is changed to zero.

Specifically, as shown in FIG. 43, if the answer of the step S332 is positive, whether or not the density data m of the current line is equal to or greater than n/4 is determined (S342). If the answer of the step S342 is positive, whether or not YY0 is greater than YY1 is determined (S343) and, if the answer is negative, existing nn=m and nn' are maintained (S344). If the answer of the step S43 is positive, nn=0 and nn'=nn'+m are set up (S345). If the answer of the step S342 is negative, whether or not the density data m' of the preceding line is greater than n/4 is determined (S346) and, if the answer is positive, nn=nn'+m and nn'=0 are set up (S347). If the answer of the step S346 is negative, existing nn=m and nn' are maintained (S348). After the steps S344, S345, S347 and S348, xx' and mm' are not changed while xx=0 and mm=n−1 are set up (S349). The step S349 is followed by the step S341.

Figure 45:
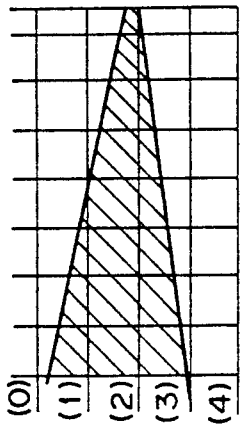
FIGS. 45, 46 and 47 demonstrate processing which the second embodiment executes with a horizontal line.
Figure 46:
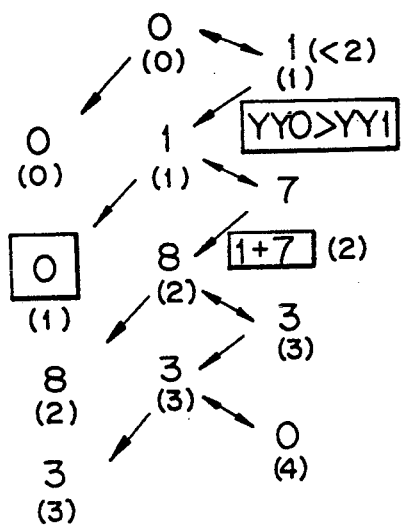
Figure 47:
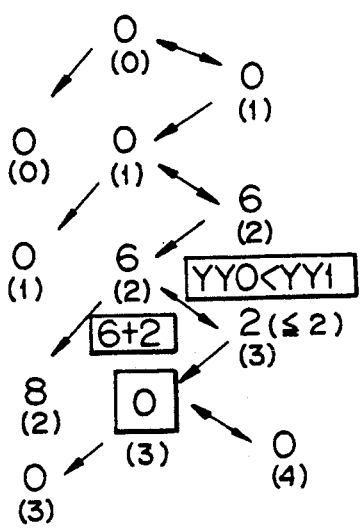

The procedure associated with a horizontal line will be described more specifically with reference to FIGS. 45-47. In FIG. 45, the data at the left-hand side, the data at the center and the data at the right-hand side represent respectively the final values decided and to be used for printing, the densities temporarily stored, and the modulated densities of the line being processed. Let the following description concentration on, among the seven pixels, two pixels A and B by way of example.

The temporarily held value of the pixel A on the line 0 is 0 while the density of the pixel A on the line 1 being processed is 1. Although the density on the line is lower than 2 and is the subject of density change, the existing density is temporarily held because the edge traversing this pixel is YY0<YY1. Because the data on the next line 2 is 7 and the temporarily held data is 1, 1 is added to the density on the line 2. The resulting value 8 is temporarily held, and the value 1 of the previous line is changed to 0 which is the finally decided value (see FIG. 46). Such a procedure is repeated thereafter. A procedure particular to a condition YY0>YY1 will be described by taking the pixel B as an example (only the portion where the density is changed will be described ). After the value on line 2 has been determined to be 6 and temporarily held, the value on the line 3 is determined to be 2 (subject of processing). Since YY0>YY1, 2 is added the temporarily stored value 6 on the line 2. The resulting value is used as a final value while the value on the line 3 is changed to 0 and temporarily held (see FIG. 47. Such a procedure is repeated thereafter. Data other than the data shown in FIG. 45 are determined in the same manner.

By the above procedures, in the case of a horizontal line, power nn which is determined by the above-described method, pulse width mm=n−1 (maximum value) and pulse print start position xx=0 are written to the page memory 206. In the case of a vertical line, power nn=n−1, pulse width mm=m and pulse print start position xx=n−m (left edge) or xx=0 (right edge) are written to the page memory 206. In portions to be painted other than edges, nn=n−1, mm=n−1 and xx=0 are set up.

Specific Operation

Figures 48A, 48B, 48C:
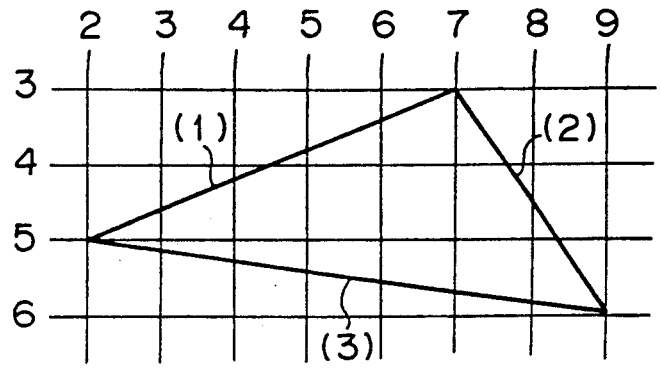

A specific operation of this embodiment will be described width references to FIGS. 48A-48D and 49. Again, assume that the density has eight levels. In FIG. 48A, a vector (1) has a start point and an end point which are (7, 3) and (2, 5), respectively. Because |9−7| is greater than |6−3|, this vector is determined to be a horizontal line. Likewise, a vector (2) whose start point and end point are (7, 3) and (9, 6) is determined to be a horizontal line because |9−7| is greater than |6−3|. Further a vector (3) whose start point and end point are (2, 5) and (9, 6) is determined to be a horizontal line based on the same principle. These data are given to the individual vectors. Then, the densities of individual pixels are modulated, as shown in FIG. 48B. Subsequently, power data nn, pulse width data mm and pulse position data xx are produced on the basis of the modulated densities and whether or a pixel of interest is representative of the edge of a vertical line or that of a horizontal line and, if it is representative of a vertical line, whether the edge is a right edge or a left edge. The resulting data nn, mm and xx are written to the page memory 206. For reference purpose, modulated densities which are not undergone the change which considers adjoining pixels are shown in FIG. 48C. As a result of antialiasing, the edge of the vector (1) is outputted in horizontally long dots, the edge of the vector (2) is outputted in vertically long dots shifted to the right, and the edge of the vector (3) is outputted in horizontally long dots, as shown in FIG. 49.

As stated above, the embodiment effectively renders the result of antialiasing by selecting a particular modulation system by taking account of figure data also and changing the density when adjoining pixels are reduced in luminance by modulation.

THIRD EMBODIMENT

Another alternative embodiment of the present invention will be described under the heads: (1) Outline of Third Embodiment, (2) Operation of PDL Controller, and (3) Specific Operation. The rest of the construction and operation are identical with the first embodiment and will not be shown or described to avoid redundancy.

(1) Outline of Second Embodiment

This embodiment is also practicable with the laser writing section and its associated elements shown in FIG. 1. The illustrative embodiment applies a plurality of data signals to the laser writing section 110. In response, the laser writing section 110 controls the laser diode 111 to switch over the outputting method (e.g. to the PM system if the inclination of a vector is smaller than 45 degrees or to the PWM system if otherwise). Further, when an apex to be outputted is located at the upper end or the lower end of an image, the embodiment uses the PWM system which is controlled such that the center of a pulse coincides with the apex; when the apex is located at the right or the left of the image, it uses the PM system.

(2) Operation of PDL Controller

Figure 50:
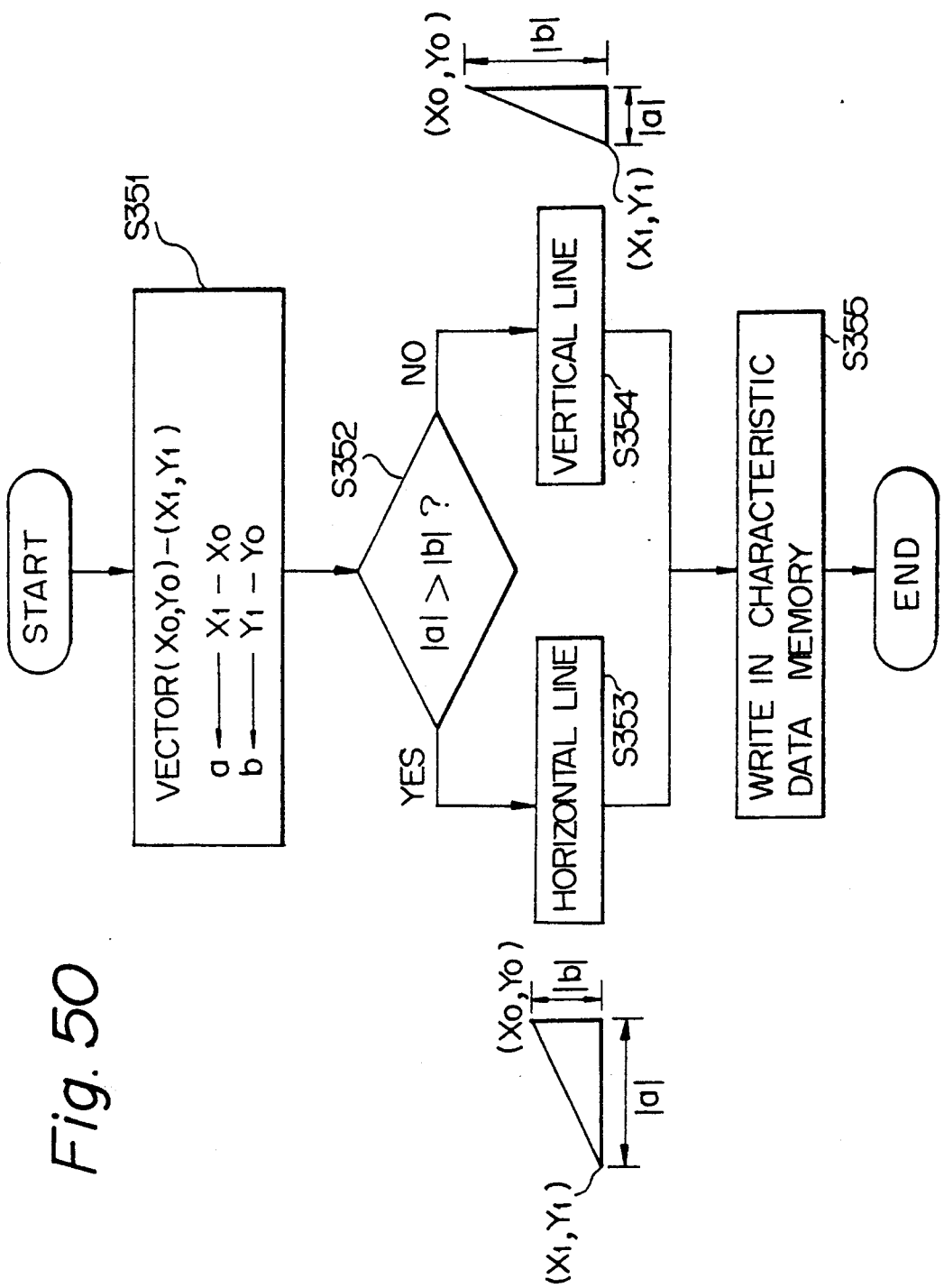
FIG. 50 is a flowchart demonstrating a vector data generation method particular to a third embodiment.

A reference will be made to FIG. 50 for describing how the previously mentioned three different kinds of data, i.e., power data nn, pulse width data mm and pulse position data xx are generated. Assume that all the data concerned have n levels.

First, assuming a vector having a start point (X0, Y0) and an end point (X1, Y1) (where Y0 is greater than Y1), the following operations are performed (step S351):

$$a = X1 - X0$$

$$b = Y1 - Y0$$

Then, vectors are classified into two groups by the inclination. In the illustrative embodiment, let the vecotors having inclinations greater than 45 degrees be referred to as vertical lines and vectors having inclinations smaller than 45 degrees be referred to as horizontal lines for simplicity. These two kinds of lines are distinguished on the basis of the relation between $|a|$ and $|b|$ (S352). Namely, a vector is determined to be a vertical line if $|a|$ is greater than $|b|$ (S353) or a horizontal line if $|a|$ is not greater than $|b|$ (S354). This data is written to the characteristic data memory 206b of the page memory 206 as vector data (S355).

Figure 51A:
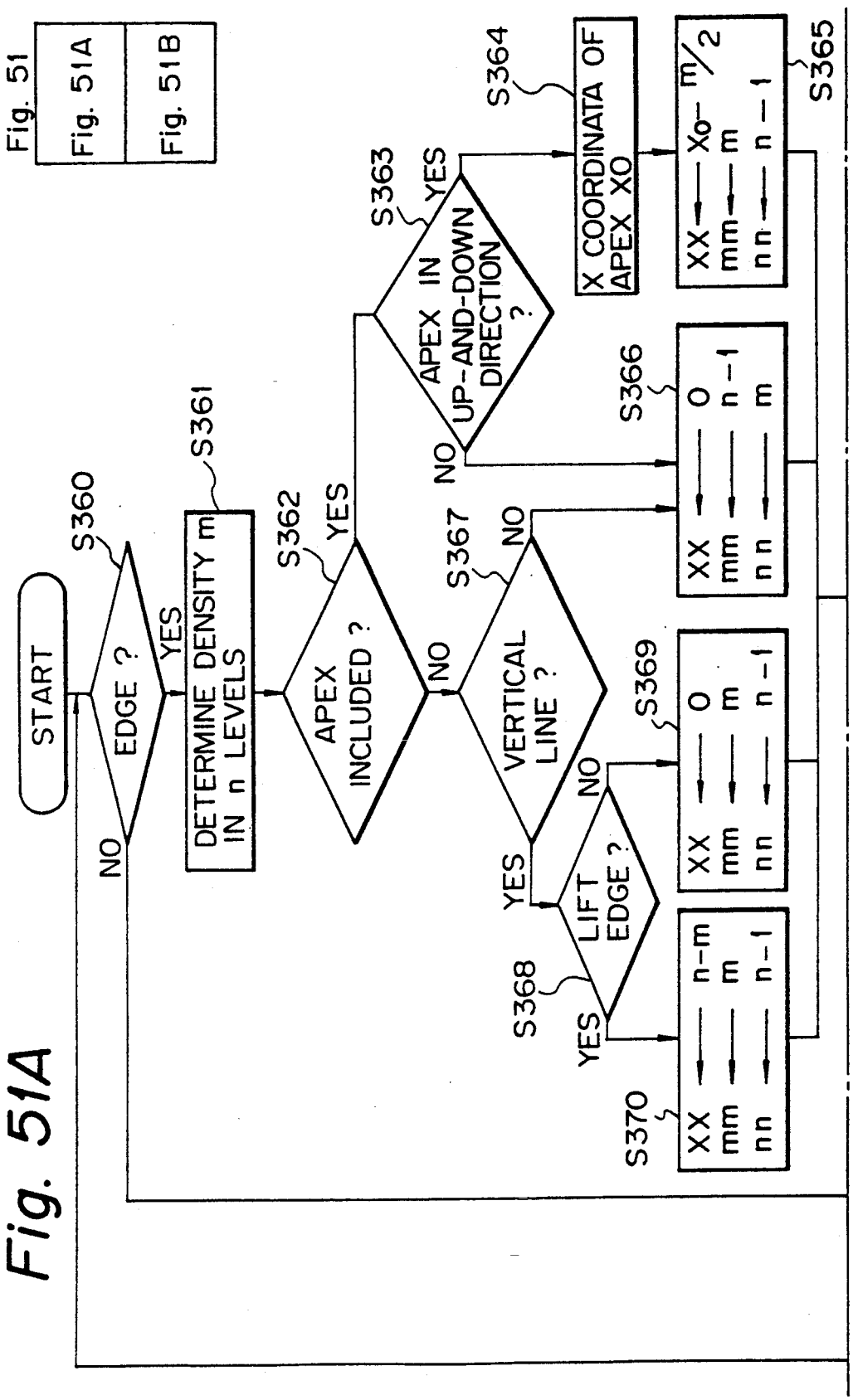
FIGS. 51A–B are flowcharts indicative of a beam modulation data generation procedure particular to the third embodiment.
Figure 51B:
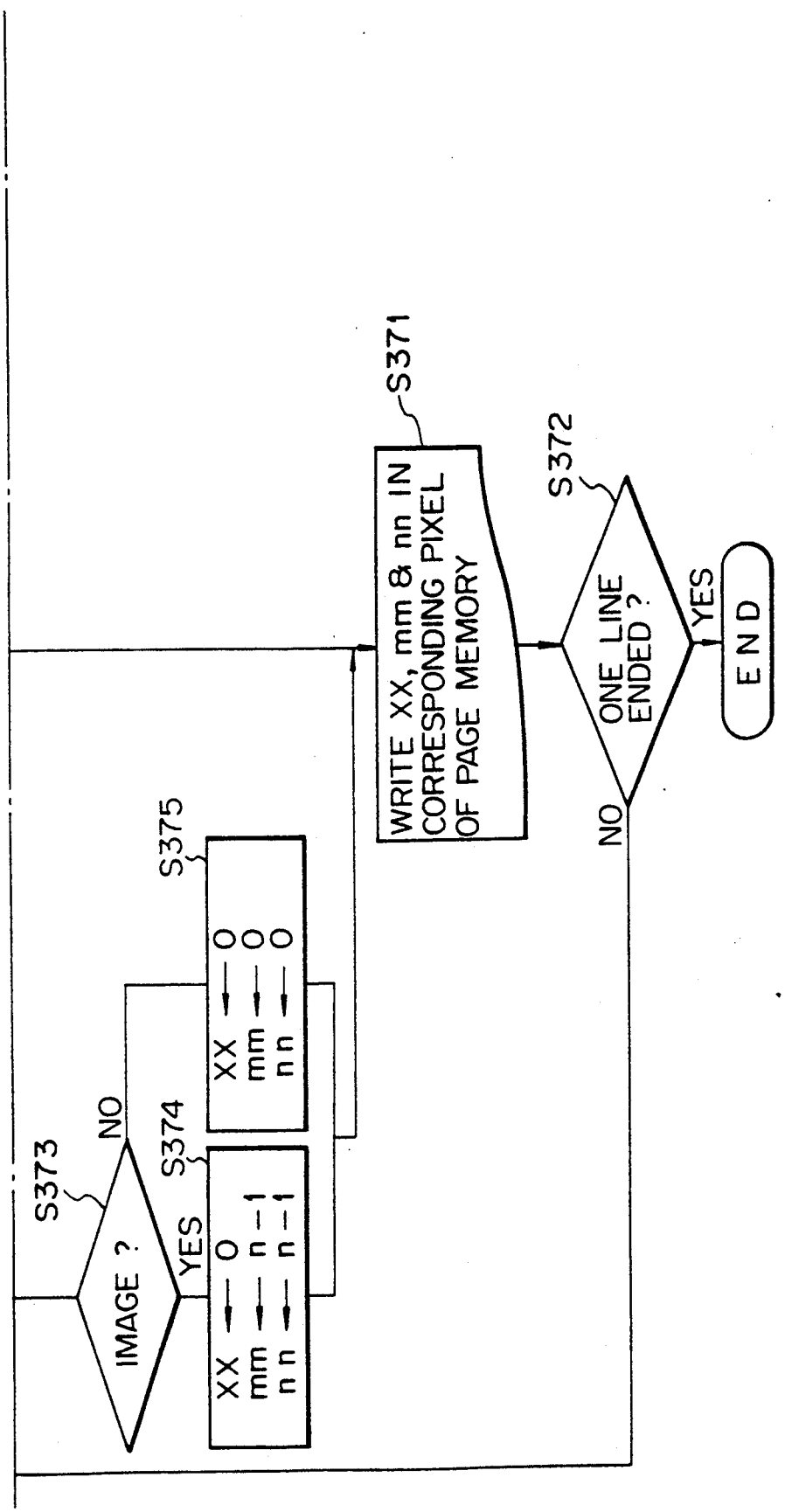

Referring to FIG. 51, how the horizontal generates beam modulation data will be described.

Whether the portion of interest is an edge of an image or not is determined (S360) and, if the answer is positive, antialiasing is executed to determine a density m with respect to the n levels (S361). Next, whether or not an apex exists in a pixel being processed is determined (S362) and, if the answer is positive, whether the apex is oriented in the up-and-down direction (see FIG. 52, [I]) is determined (S363). Because each vector has a smaller y coordinate at the start point and a greater y coordinate at an end point, the kind of an apex can be identified. Specifically, when the coordinates of an apex is defined by the start points or the end points of two vectors, the apex is determined to be located at the upper end or the lower end of an image; if otherwise, the apex is determined to be located at the right end or the left end of an image.

If the apex is oriented in the up-and-down direction as determined in the step S363, it is outputted by the PWM system while the position of a pulse is controlled such that the center thereof coincides with the x coordinate (X0) of the apex (S364). Specifically, assuming that an apex having coordinates (X0, Y0) and a pulse width of m, then a pulse begins to be outputted at a position $$xx = (X0 - m/2)$$

Therefore, when an apex oriented in the up-and-down direction, $$\begin{aligned} xx &= (X0 - m/2) \\ mm &= m \\ nn &= n - 1 \end{aligned} \quad (S365)$$

If the answer of the step S363 is negative, meaning that an apex oriented in the right-and-left direction exists, then $$\begin{aligned} xx &= 0 \\ mm &= n - 1 \\ nn &= m \end{aligned} \quad (S366)$$

If no apex exists in the pixel of interest as determined in the step S362, whether the edge is representative of a vertical line is determined (S367). If the answer of the step S367 is negative, meaning that the edge is a horizontal line (PW), $$\begin{aligned} xx &= 0 \\ mm &= n - 1 \\ nn &= m \end{aligned} \quad (S366)$$

If the answer of the step S367 is positive (pulse width modulation), whether it is a left edge is determined (S368). If the answer of the step S368 is positive, $$\begin{aligned} xx &= n - m \\ mm &= m \\ nn &= n - 1 \end{aligned}$$

conversely, if the edge is a right edge, $$\begin{aligned} xx &= 0 \\ mm &= m \\ nn &= n - 1 \end{aligned}$$

If the answer of the step S360 is negative, meaning that the portion of interest is not an edge, whether or not the portion is an image is determined (S373). If the answer of the step S373 is positive, $$\begin{aligned} xx &= 0 \\ mm &= n - 1 \\ nn &= n - 1 \end{aligned} \quad (S374)$$

If the answer of the step S373 is negative, $$\begin{aligned} xx &= 0 \\ mm &= 0 \\ nn &= 0 \end{aligned} \quad (S375)$$

In the above procedure, the various data are written to the corresponding pixels of the page memory 206 (S371).

Whether or not one line has completed is determined (S372) and, if it has not completed, the steps S360-S372 are repeated until one line completes. If the answer of the step S372 is positive, the program ends.

The system shown in FIG. 1 performs printing by using the various data generated as stated above. When a vector is determined to be a vertical line, the PWM system (vertically long dot form) is used after phase control. When a vector is a horizontal line, the PM system (horizontally long dot form) is used. It should be noted that when two or more apexes or edges exist in a single pixel, the data to processed later by the scanline processing is selected as data particular to the pixel.

(3) Specific Operation

Figures 53A, 53B:
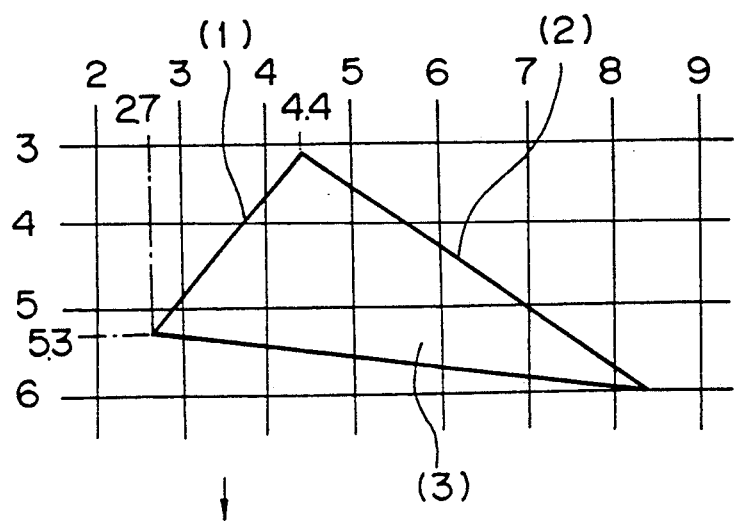
FIGS. 53A–53C show a specific operation of the third embodiment.
Figures 53C, 54:
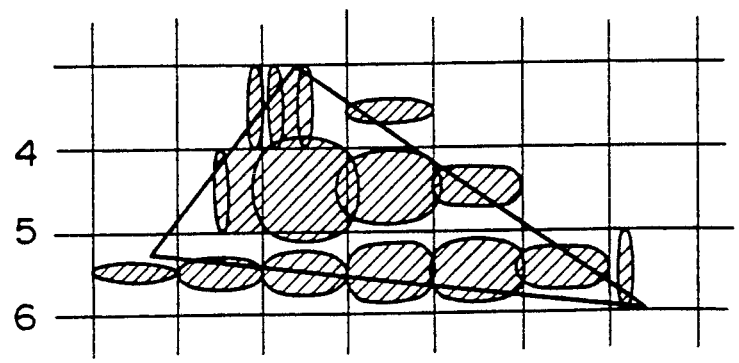
FIG. 54 shows a specific latent image outputted by the operation of FIGS. 53A–53C.

A specific operation of this embodiment will be described with reference to FIGS. 53A-53C and 54. Again, assume that the density has eight levels. In FIG. 53A, a vector (1) has a start point and an end point which are (4.1, 3.1) and (2.7, 5.3), respectively. Because $|2.7-4.4|$ is smaller than $|5.3-3.1|$, this vector is determined to be a vertical line. A vector (2) whose start point and end point are (4.4, 3.1) and (8.4, 6.0) is determined to be a horizontal line because $|8.4-4.4|$ is greater than $|6.0-3.1|$. Likewise, a vector (3) is determined to be a horizontal line. These data are given to the individual vectors. Then, the densities of individual pixels are modulated, as shown in FIG. 53B. Subsequently, power data nn, pulse width data mm and pulse position data xx are produced on the basis of the modulated densities, whether a pixel of interest is representative of the edge of a vertical line or that of a horizontal line and, if it is representative of a vertical line, whether the edge is a right edge or a left edge, whether the pixel of interest contains an apex and, if it is an apex oriented in the up-an-down direction, the coordinates where the apex is located. The resulting data nn, mm and xx are written to the page memory 206. FIG. 53C shows data stored in the page memory 206 in association with the pixels. As a result of antialiasing, the edge of the vector (1) is outputted in vertically long dots shifted to the left, the edge of the vector (2) is outputted in horizontally long dots, and the edge of the vector (3) is outputted in horizontally long dots, as shown in FIG. 54. The apex (4.4, 3.1) is defined by the start points of two vectors and located at the upper end of an image. Such an apex is outputted by the PWM system (horizontally long dot form), and the pulse start position is controlled to $xx=3-(4/2)=1$ because the fraction of X is 3 in terms of n levels and m=4. On the other hand, the apex (2.7, 5.3) is defined by the end point of one vector and the start point of another vector and, therefore, outputted by the PM system (horizontally long dot form. Likewise, the apex (8.4, 6.0) is outputted by the PM system (horizontally long dot form) because it is defined by the end point of one vector and the start point of another vector.

As stated above, this embodiment is also capable of effecting antialiasing processing by selecting a particular modulation system by taking account of figure data also.

FOURTH EMBODIMENT

This embodiment pertains to a graphic output device of the type receiving bilevel image data in a dot matrix format, divides the bilevel image data to small areas, recognizes the pattern of each area, executes antialiasing processing with the individual areas, and then forming an image by use of a laser. Briefly, the illustrative embodiment compares the pattern of a small area extracted from the bilevel image data with image element patterns stored in a predetermined memory (pattern data storing means), generates, if the former coincides with any one of the latter, a dot correct signal on the basis of associated antialiasing data, and forms an image by combining the PM system and PWM system on the basis of the dot correct signal.

Figure 55:
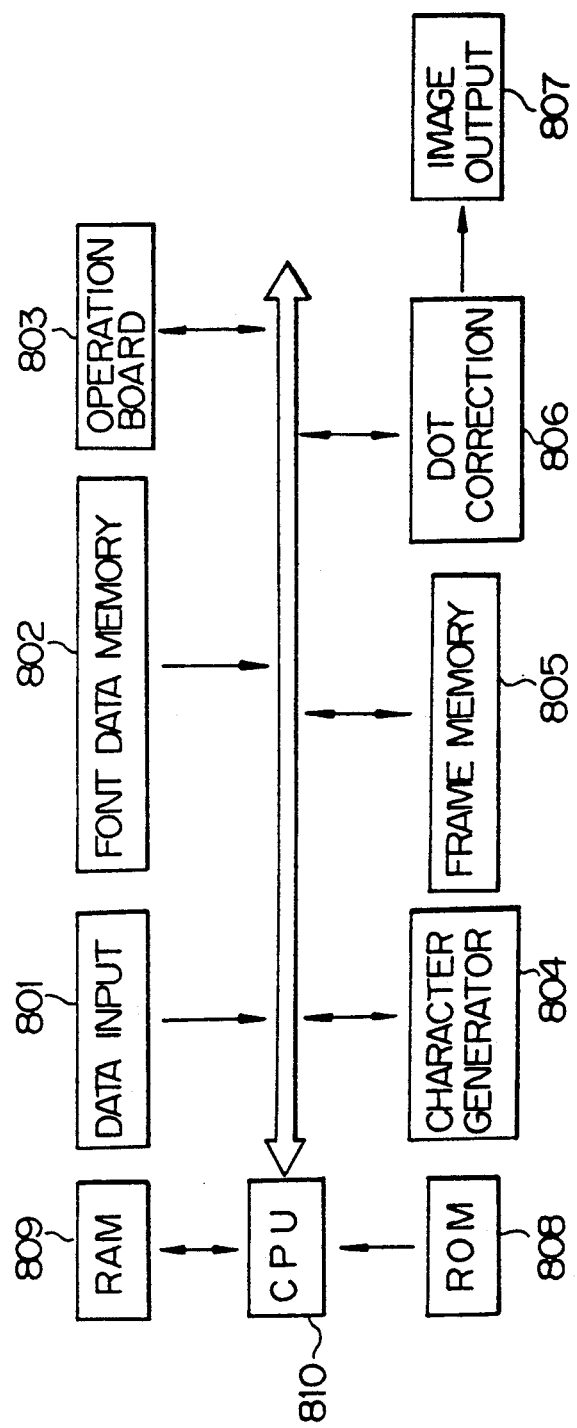
FIG. 55 is a block diagram schematically showing a fourth embodiment of the present invention.

Referring to FIG. 55, the embodiment includes a data input section 801 to which image data is applied from a personal computer or similar equipment. A font data memory 802 stores character fonts in the form of code data. An operation board 803 is accessible for enterinr various settings. A character generator 804 transforms character code data fed from the data input section 801 and font data memory 803 to bit map data. A frame memory 805 is capable of storing one page of image data (here, pixel-by-pixel data). A dot shape correcting section 806 corrects the shape of a dot in response to image data. An image outputting section 807 outputs data having been processed by the dot shape correcting section 806. A ROM 808 stores operation programs for operating the graphic output device. A RAM 809 is used to write temporarily and read out data to be used on the operation programs. A CPU 810 controls the various sections described above.

Figure 56:
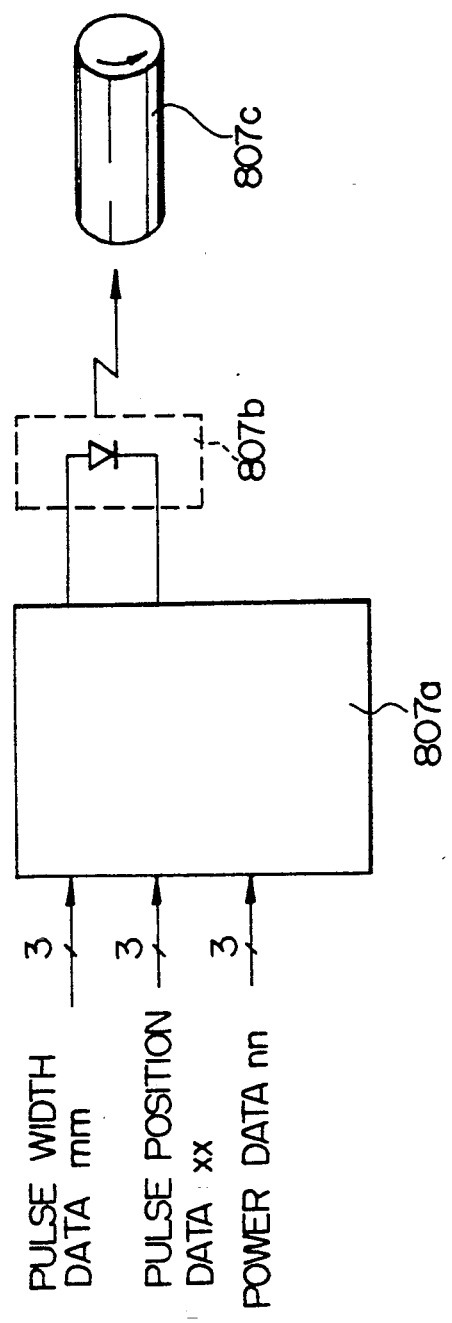
FIG. 56 is a block diagram schematically showing an image output section.

FIG. 56 shows a specific construction of the image output section 807. As shown, a laser writing section 807a is included in the output section 807 and controls a laser diode 807b in response to a correction signal consisting of pulse width data mm, pulse position data xx and power data nn which will be described. A laser beam issuing from the laser diode 807b is incident to a photoconductive element 807c to electrostatically form a latent image on the element 807c. The data mm, xx and nn, or control signal, control the laser writing section 807a independently of one another. The pulse width data mm forms a latent image as shown in FIG. 2 (where xx=0 and nn=7). The pulse position data xx forms a latent image as shown in FIG. 3 (where mm=1 and nn=7). Further, the power data nn forms a latent image as shown in FIG. 4 (where mm=7 and xx=0).

Figure 57:
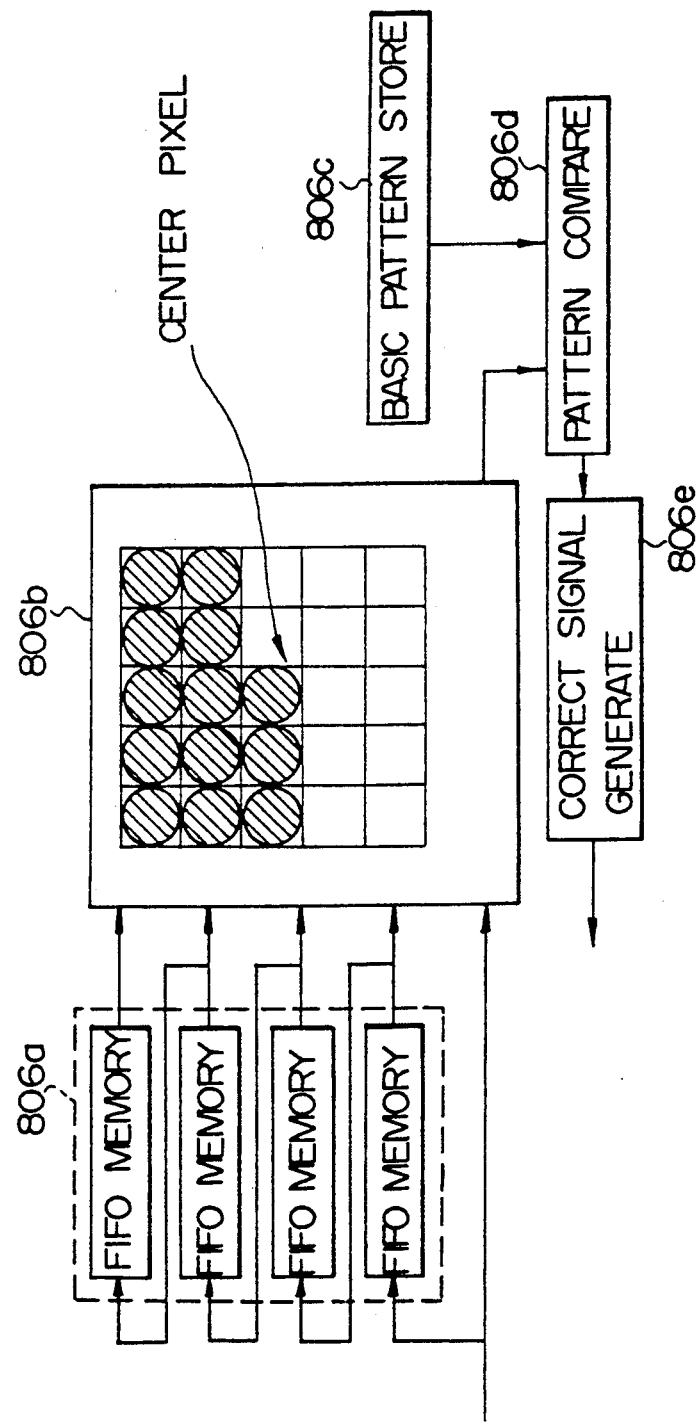
FIG. 57 is a block diagram schematically showing a dot correcting section.

FIG. 57 shows a specific constructio of the dot correcting section 806. As shown, the serial pixel-by-pixel data stored in the frame memory 805 are sequenially applied to a FIFO (First In First Out) buffer 806a, the leading pixel data being first. A pattern (small area pattern) is extracted from the buffer 806a via a pattern extracting section 806b. a basic pattern storing section 806c stores various basic patterns (image element patterns) and antialiasing data each corresponding to particulr one of the basic patterns. A pattern comparing section 806d compares the extracted pattern with the basic patterns. If the extracted pattern does not coincide with any one of the basic patterns as determined by the comparing section 806d, the center pixel of the extracted pattern is outputted without being corrected. If the extracted pattern coincides with any one of the basic patterns, a correct signal generating section 806e outputs a correct signal matching the antialiasing data of the coincident basic pattern. Thereafter, the center pixel is sequentially shifted one dot at a time together with the extracted pattern, so that the above processing is executed with all of the pixels constituting one page. While the embodiment extracts a small area pattern in a 5×5 matrix, such a pattern is only illustrative. For example, as the pattern size decreases, the correction using a basic pattern becomes simpler although the pattern extraction may become easier. Conversely, as the pattern size increase, the processing becomes more complicated although a greater number of kinds of patterns may be dealt with. Further, the small area is not limited to a square pattern.

Figure 58A:
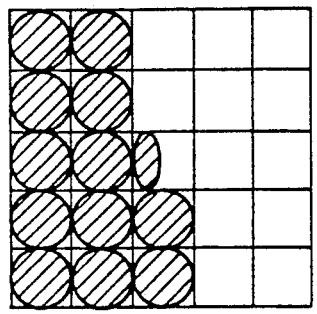
FIGS. 58A–58D show basic patterns stored in a basic pattern storing section and antialiasing data.
Figure 58B:
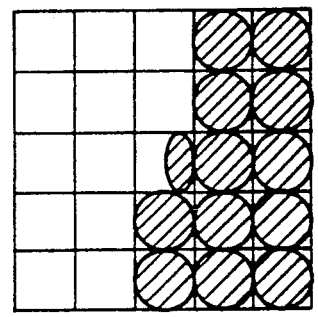
Figure 58C:
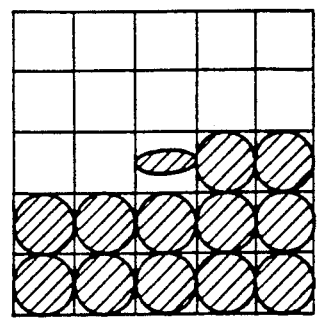
Figure 58D:
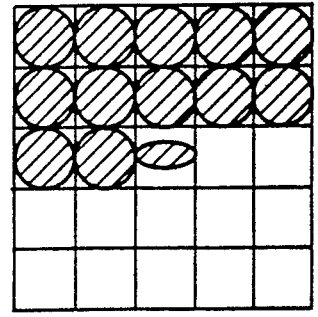
Figure 59A:
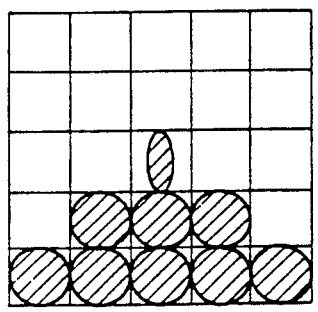
FIGS. 59A-59D show basic patterns stored in the basic pattern storing section and the correction of the center pixel.
Figure 59B:
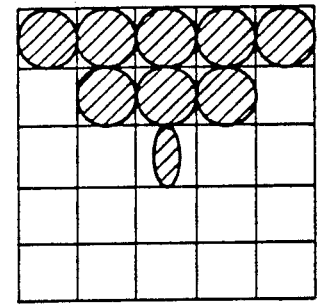
Figure 59C:
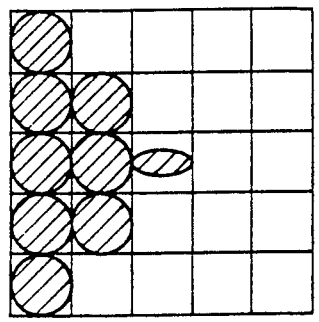
Figure 59D:
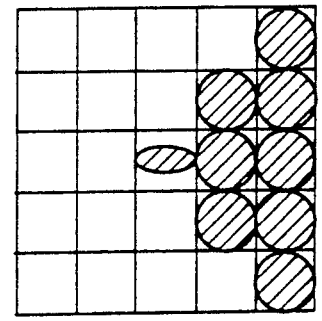

The basic pattern stored in the storing section 806c and the antialiasing data will be described with reference to FIGS. 58A-58D and 59A-59D. The basic patterns are generally classified into five kinds, i.e., patterns for determining that an extracted pattern is a right edge, patterns for determining that it is a left edge, patterns for determining that it is an upper edge, patterns for determining that it is a lower edge, and patterns for determining that it contains an apex. Regarding antialiasing data, for a right edge, for example, having a great inclination, data which selects pulse width modulation and specifies a position is stored. In this case, as shown in FIG. 58A, a dot is formed in a position shifted to the left so as to make the jaggedness inconspicuous. For a left edge having a great inclination, data which selects pulse witdth modulations and specifies a position is stored, i.e., a dot is formed in a position shifted to the right for the same purpose. Further, for an upper edge and a lower edge, data which selects power modulation are stored, i.e., such an edge is also formed with a minimum of jaggedness, as shown in FIG. 58C or 58D. Assume that the extracted pattern coincides with a basic pattern containing an apex. For an apex oriented upward as shown in FIG. 59A or downward as shown in FIG. 58B, data which selects pulse width modulation is stored. For an apex oriented to the right as shown in FIG. 59C or to the left as shown in FIG. 59D, data which selects power modulation is stored. Moreover, as shown in FIG. 60, for an apex oriented upward or downward and to be outputed by pulse width modulation, data which controls the output position by specifying a position on the basis of a relation between the apex (i.e. center pixel) and pixels adjoing it is stored.

Figure 61:
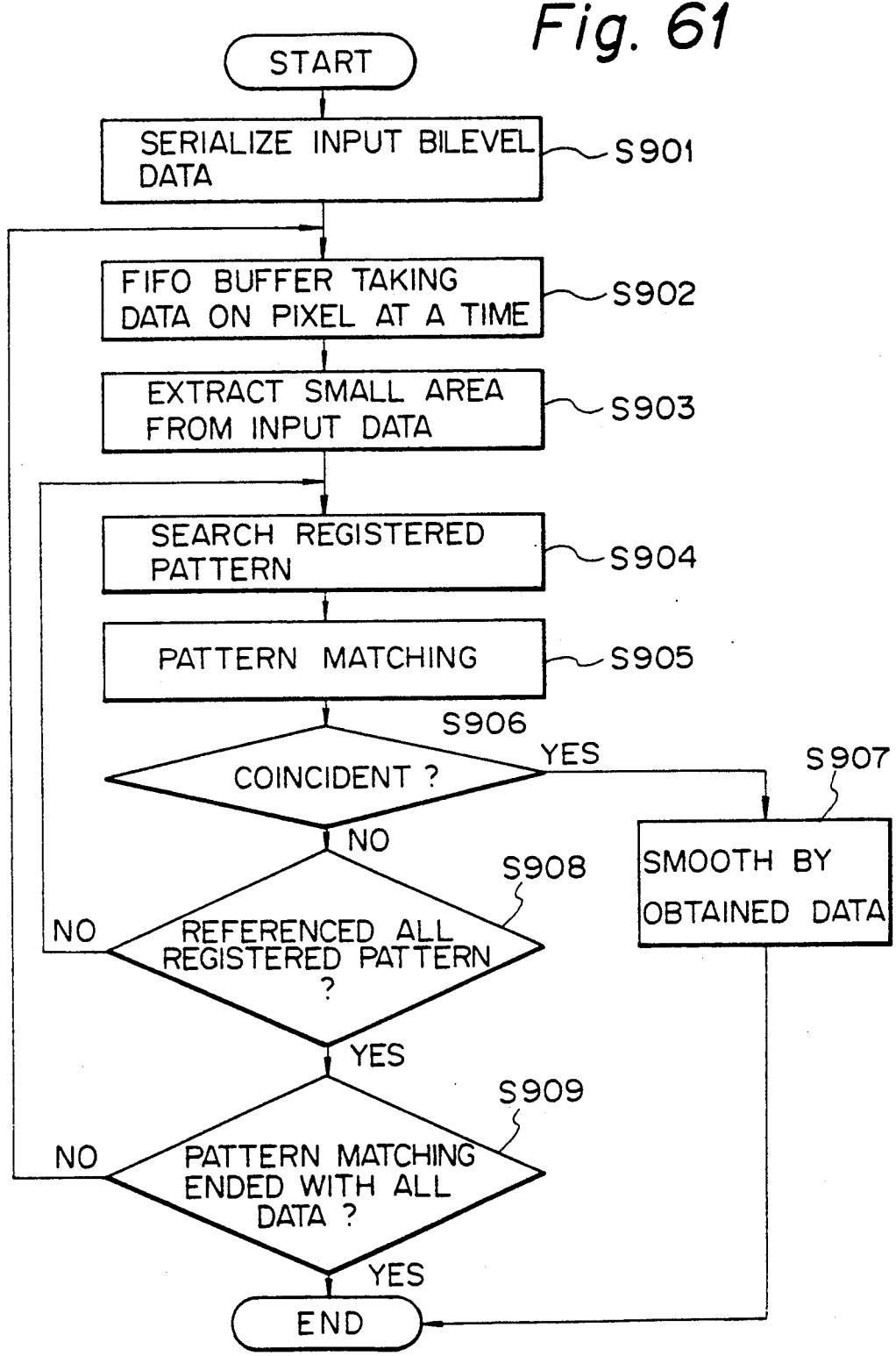
FIG. 61 is a flowchart demonstrating a specific operation of the fourth embodiment.

The operation of this embodiment will be described with reference to FIG. 61. Bilvel data from, for example, a personal computer is received by the data input section 801 and written to the frame memory 805 serially (S901). At this instant, the character code data stored in the font data memory 802 is transformed to bit map font data (bilevel) by the character generator 604 and, at the same time, written to a predetermined address location of the frame memory 805. Subsequently, the data stored in the frame memory 805 is sequentially transferred to the FIFO buffer 806a, the leading data being first (S902). The pattern extracting section 806 extracts a small area or pattern from the input data (S903). Then, the pattern comparing section 906d compares the extracted pattern with the basic patterns stored in the basic pattern storing section 806c by searching the latter to see if the former coincides with any one of the latter (S904, S905 and S906). When the extracted pattern coincides with one of the basic patterns, the correct signal generating section 906e generates a correct signal on the basis of the antialiasing data matching the coincident basic pattern. The image output section 807 outputs pixels of interest in response to the correct signal (pulse width data mm, pulse position data xx, and power data nn) (S907). If the extracted pattern does not coincide with the basic patterns, the steps S904–S906 are repeated until all the basic patterns registered have been referenced (S908). After all the patterns registered have been referenced, such pattern matching is executed with all the other data in the same manner (S909). If none of the reference patterns registered is coincident with the extracted pattern as determined in the step S908, the data of the center pixel of the extracted pattern is fed to the image output section 807 without being corrected.

Figure 62:
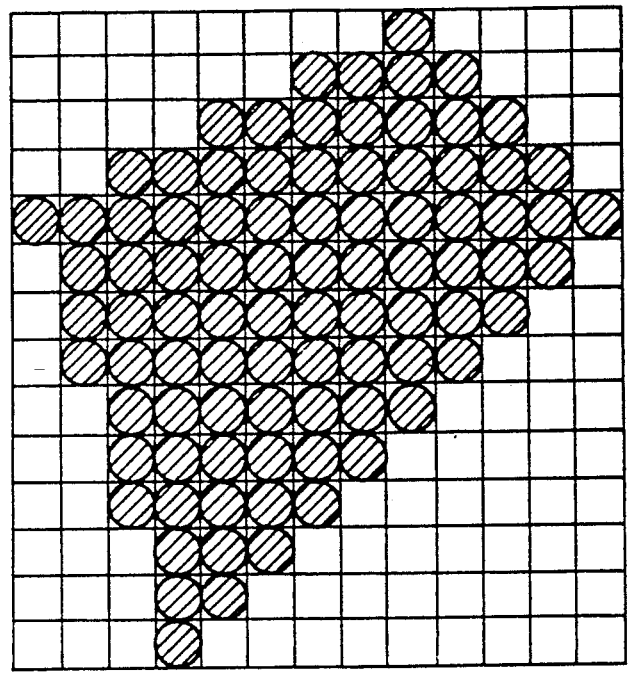
FIG. 62 shows an example of data including upper, lower, right and left apexes.
Figure 63:
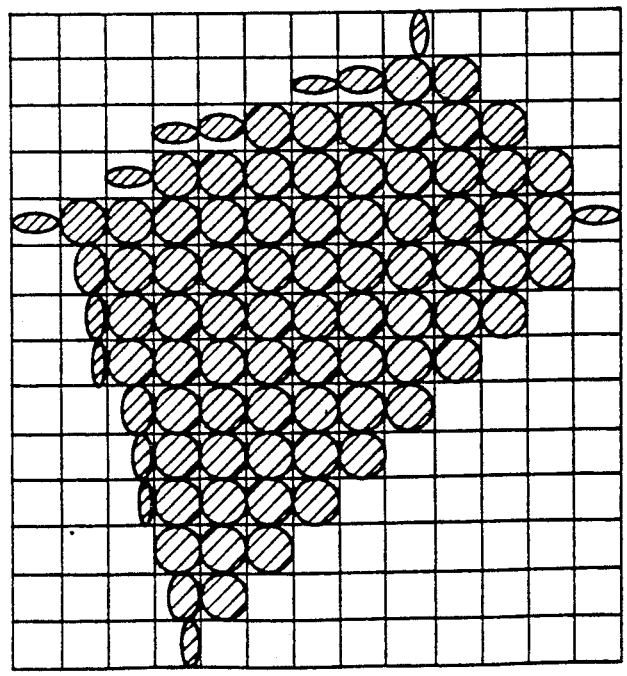
FIG. 63 shows a specific image which the fourth embodiment outputs by processing the data of FIG. 62.
Figure 64:
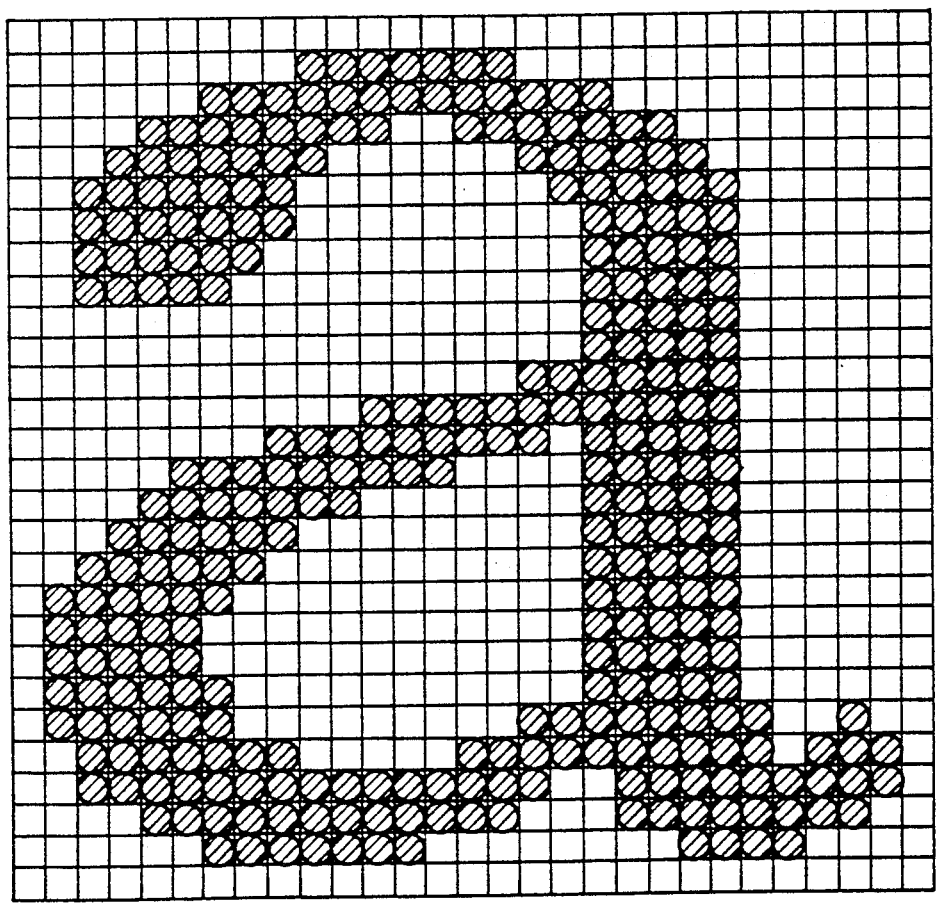
FIG. 64 shows a specific image not undergone correction.
Figure 65:
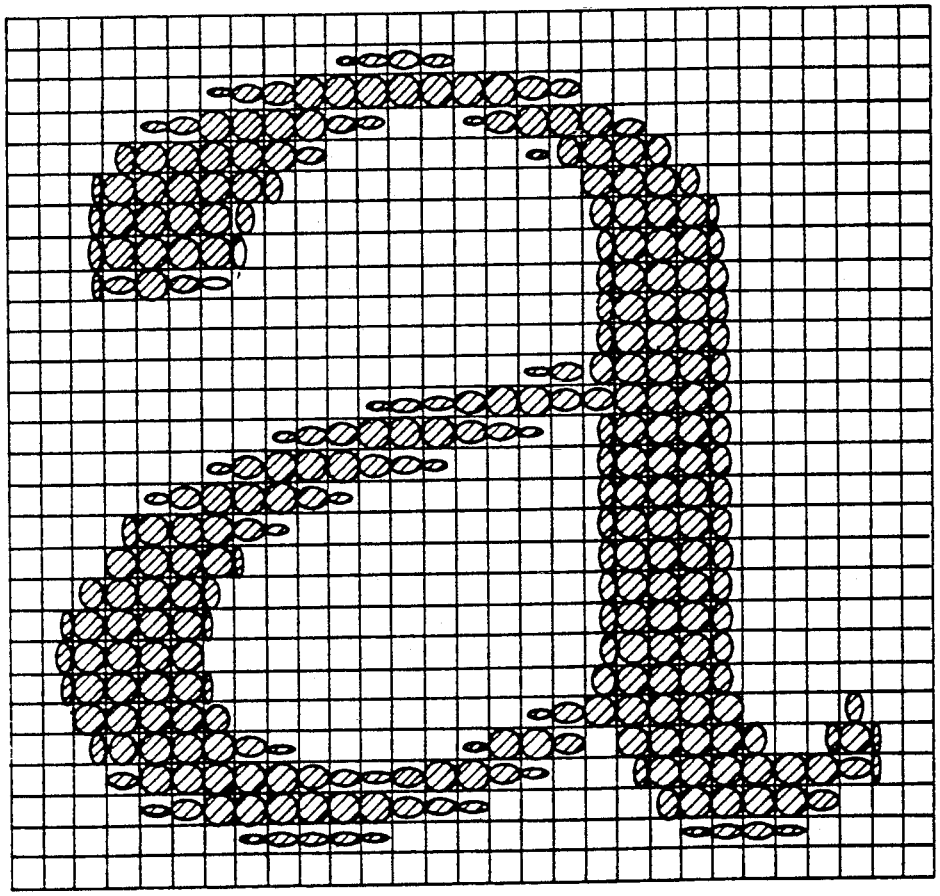
FIG. 65 shows a specific image which the fourth embodiment outputs by correcting the data of FIG. 64 ideally.

FIG. 62 shows specific image data including upper, lower, right and left apexes. Such image data will be outputted as shown in FIG. 63, when subjected to the above-stated processing. As FIG. 63 indicates, the output image has sharp apexes and smooth edges. FIG. 64 shows a specific image which is not corrected while FIG. 65 shows a corresponding image which is ideally corrected by the correction shown and described. When bilevel image determine is outputted, the image quality can be readily improved by referencing a pixel pattern including pixels surrounding a pixel of interest, i.e., a center pixel, executing the control over power modulation, pulse width modulation and position designation independently of one another, and thereby adequately correcting the shape of a dot.

In summary, it will be seen that the present invention provides a graphic output device capable of insuring the continuity of an image and enhancing the advantage of antialiasing processing.

Various modifications will become possible for those skilled in the art after receiving the teachings of the present disclosure without departing from the scope thereof.

What is claimed is:

1. A graphic input device, comprising:

a) antialiasing processing means for smoothing a vector image's edge;
b) image output means for converting to multilevel image data, image data subjected to antialiasing processing by the antialiasing processing means, and for outputting the multilevel image data, the image output means including:
   1) a pulse width modulation (PWM) writing section; and
   2) a power modulation (PM) writing section;
c) first decision means for determining whether the vector's inclination is representative of a vertical line or representative of a horizontal line;
d) second decision means for determining, when the vector's inclination is determined to be representative of a vertical line, whether an edge to be processed is a right edge or a left edge; and
e) designating means, including:
   1) means for selecting the PWM writing section and for designating an output pulse starting location, when the edge to be processed is determined to be a left edge; and
   2) means for selecting the PM writing section when the vector's inclination is determined to be representative of a horizontal line.

2. The device of claim 1, wherein:
the first decision means includes means for discriminating a vertical line and a horizontal line, by determining whether the vector's inclination is greater than 45 degrees or less than 45 degrees.

3. A graphic input device, comprising:

a) antialiasing processing means for smoothing a vector image's edge;
b) image output means for converting to multilevel image data, image data subjected to antialiasing processing by the antialiasing processing means, and for outputting the multilevel image data, the image output means including:
   1) a pulse width modulation (PWM) writing section; and
   2) a power modulation (PM) writing section;
c) first decision means for determining whether the vector's inclination is representative of a vertical line or representative of a horizontal line;
d) second decision means for determining, when the vector's inclination is determined to be representative of a vertical line, whether an edge to be processed is a right edge or a left edge; and
e) designating means, including:
   1) means for selecting the PWM writing section and for designating an output pulse starting location, when the edge to be processed is determined to be a left edge;
   2) means for selecting the PWM writing section when the edge to be processed is determined to be a right edge; and
   3) means for selecting the PM writing section when the vector's inclination is determined to be representative of a horizontal line.

4. A graphic input device, comprising:

a) antialiasing processing means for smoothing a vector image's edge;
b) first decision means for determining whether the vector's inclination is representative of a vertical line or representative of a horizontal line;
c) image output means for outputting image data subjected to antialiasing processing by the antialiasing processing means:

1) by power modulation (PM) when the vector's inclination is determined to be representative of a horizontal line; or
2) by pulse width modulation (PWM) when the vector's inclination is determined to be representative of a vertical line;

d) second decision means for determining, when the vector's inclination is determined to be representative of a vertical line, whether an edge to be processed is a right edge or a left edge; and e) designating means, including:
   1) means for designating an output pulse starting location, when the edge to be processed is determined to be a left edge;

f) recognizing means for recognizing a minimum pixel density when the vector's inclination is determined to be representative of a horizontal line;

g) third decision means for determining whether the horizontal line's edge is an upper edge or a lower edge;

h) control means for controlling the image output means so that, when a pixel of a horizontal line has been modulated to a luminance which is below the minimum pixel density:
   1) the pixel is not printed out;
   2) an underlying pixel is increased in density when the edge is determined to be an upper edge; and
   3) an overlying pixel is increased in density when the edge is determined to be a lower edge.

5. The device of claim 4, wherein:
the first decision means includes means for determining that the vector's inclination is representative of a horizontal line if the vector's inclination is less than 45 degrees, and that the vector's inclination is representative of a vertical line if the vector's inclination is greater than 45 degrees.

6. A graphic input device, comprising:
a) antialiasing processing means for smoothing a vector image's edge;
b) image output means for converting to multilevel image data, image data subjected to antialiasing processing by the antialiasing processing means, and for outputting the multilevel image data, the image output means including:
   1) a pulse width modulation (PWM) writing section; and
   2) a power modulation (PM) writing section;
c) designating means for designating an output pulse starting location for the PWM writing section;
d) apex detecting means for detecting an apex;
e) apex position determining means for determining a position of an apex detected by the apex detecting means; and
f) control means for selectively using the PWM writing section or the PM writing section, based on the position of the apex.

7. A graphic input device, comprising:
a) antialiasing processing means for smoothing a vector image's edge;
b) image output means for converting to multilevel image data, image data subjected to antialiasing processing by the antialiasing processing means, and for outputting the multilevel image data, the image output means including:
   1) a pulse width modulation (PWM) writing section; and
   2) a power modulation (PM) writing section;
c) apex detecting means for detecting an apex;

d) apex position determining means for determining whether an apex detected by the apex determining means is oriented in an up-and-down direction or in a right-and-left direction;

e) designating means for designating an output pulse starting location when the apex position determining means determines that the apex is oriented in the up-and-down direction; and f) control means, the control means including:
   1) means for executing a PWM process associated with the PWM writing section based on the output pulse starting location from the designating means when the apex position determining means determines that the apex is oriented in the up-and-down direction; and
   2) means for executing a PM process associated with the PM writing section when the apex position determining means determines that the apex is oriented in the right-and-left direction.

8. A graphic output device for receiving bi-level image data in a dot matrix format, for recognizing a pattern by dividing the bi-level image data into areas, for executing antialiasing processing, and for forming an image, the device comprising:
a) image storing means for storing image element patterns for antialiasing processing, including bi-level pixels and antialiasing data;
b) pattern extracting means for extracting, from the image storing means, an area pattern having a same size and a same shape as at least one of the image element patterns;
c) pattern comparing means for comparing (1) the area pattern extracted by the pattern extracting means, with (2) the image element patterns stored in the image storing means;
d) correction signal generating means for generating a dot correction signal for correcting a dot shape associated with a center pixel of the area pattern based on corresponding antialiasing data, when the extracted pattern coincides with one of the image element patterns; and
e) image forming means for forming an image using a power modulation (PM) system and a pulse width modulation (PWM) system, in response to the dot correction signal.

9. The device of claim 8, wherein the image element patterns include:
a pattern for determining that the extracted area pattern is a right edge;
a pattern for determining that the extracted area pattern is a left edge;
a pattern for determining the extracted area is an upper edge;
a pattern for determining the extracted area is a lower edge; and
a pattern for determining that the extracted area pattern includes an apex.

10. A graphic input device, comprising:
a) antialiasing processing means for smoothing a vector image's edge;
b) image output means for converting to multi-level image data, image data subjected to antialiasing processing by the antialiasing processing means, and for outputting the multilevel image data, the image output means including:
   1) a pulse width modulation (PWM) writing section; and
   2) a power modulation (PM) writing section;

c) first decision means for determining whether the vector's inclination is representative of a vertical line or representative of a horizontal line;
d) second decision means for determining, when the vector's inclination is determined to be representative of a vertical line, whether an edge to be processed is a right edge or a left edge; and
e) designating means, including:

1) means for selecting the PWM writing section and for designating an output pulse starting location, when the edge to be processed is determined to be a left edge.

11. The of claim 10, wherein the designating means further includes:

2) means for selecting the PM writing section when the vector's inclination is determined to be representative of a horizontal line.

* * * * *